(12) United States Patent
Schulz et al.

(10) Patent No.: US 7,805,327 B1
(45) Date of Patent: *Sep. 28, 2010

(54) TRANSFORMATIONS BETWEEN COMBINED AND INDIVIDUAL WORKFLOWS

(75) Inventors: Karsten Schulz, Middle Park (AU); Maria E. Orlowska, Brookfield (AU)

(73) Assignee: SAP Aktiengesellschaft, Walldorf (DE)

( * ) Notice: Subject to any disclaimer, the term of this patent is extended or adjusted under 35 U.S.C. 154(b) by 1522 days.

This patent is subject to a terminal disclaimer.

(21) Appl. No.: 10/628,561

(22) Filed: Jul. 29, 2003

Related U.S. Application Data

(60) Provisional application No. 60/399,455, filed on Jul. 31, 2002.

(51) Int. Cl.
  *G06F 9/46* (2006.01)
(52) U.S. Cl. .............................................. 705/9; 705/7
(58) Field of Classification Search ...................... 705/9, 705/7
  See application file for complete search history.

(56) References Cited

U.S. PATENT DOCUMENTS

| | | | | |
|---|---|---|---|---|
| 5,630,069 | A | * | 5/1997 | Flores et al. .................... 705/7 |
| 5,826,020 | A | | 10/1998 | Randell |
| 5,960,404 | A | | 9/1999 | Chaar et al. |
| 5,987,422 | A | | 11/1999 | Buzsaki |
| 6,006,193 | A | * | 12/1999 | Gibson et al. ................... 705/8 |
| 6,028,997 | A | | 2/2000 | Leymann et al. |
| 6,041,306 | A | * | 3/2000 | Du et al. ......................... 705/8 |
| 6,052,684 | A | | 4/2000 | Du |
| 6,073,109 | A | | 6/2000 | Flores et al. |
| 6,349,238 | B1 | | 2/2002 | Gabbita et al. |
| 6,415,297 | B1 | * | 7/2002 | Leymann et al. ............ 707/201 |

(Continued)

FOREIGN PATENT DOCUMENTS

EP  1 003 114  5/2000

(Continued)

OTHER PUBLICATIONS

Kang et al, "Access Control Mechanisms for Inter-Organizational Workflow", SACMAT '01, May 3-4, 2001, Chantilly, Virginia ACM 1-58113-350-2/01/0005.*

(Continued)

*Primary Examiner*—Beth V. Boswell
*Assistant Examiner*—Thomas Mansfield
(74) *Attorney, Agent, or Firm*—Fish & Richardson P.C.

(57) ABSTRACT

Techniques for making transformations between combined and individual workflows are described. For example, a first party, such as a first enterprise, may have a pre-determined workflow designed to implement a plurality of tasks. Similarly, a second party may have its own pre-determined workflow designed to implement a separate plurality of tasks. All of the tasks associated with the first workflow and the second workflow may be combined into a combined workflow having a task order that, when executed, provides a desired result of a business collaboration between the first party and the second party. Ordering tasks operable to implement the order of the combined workflow also may be added to achieve the desired result. Conversely, a workflow, such as a combined workflow associated with the first party and the second party, may be split into separate workflows that are individually associated with the first party and the second party, to thereby better allocate resources for completion of the combined workflow.

22 Claims, 51 Drawing Sheets

U.S. PATENT DOCUMENTS

| | | | |
|---|---|---|---|
| 6,920,456 B2 | 7/2005 | Lee et al. | |
| 7,039,597 B1* | 5/2006 | Notani et al. | 705/9 |
| 7,184,966 B1* | 2/2007 | Parsonnet et al. | 705/8 |
| 2002/0161823 A1 | 10/2002 | Casati et al. | |
| 2002/0184070 A1* | 12/2002 | Chen et al. | 705/9 |
| 2003/0078820 A1* | 4/2003 | Ouchi | 705/7 |

FOREIGN PATENT DOCUMENTS

| | | |
|---|---|---|
| WO | 01/61596 | 8/2001 |

OTHER PUBLICATIONS

Grefen et al, "Global transaction support for workflow management systems: form formal specification to practical implementation", The VLDB Jounral 10: 316-333 (2001).* van der Aalst, "Process-Oriented Architectures for Electronic Commerce and Interorganizational Workflow", Information Systems vol. 24, No. 8, pp. 639-671, 1999.*

Schulz et al., "Architecting Cross-Organisational B2B Interactions", IEEE, 2000.*

Shen et al., "Coordinating Interorganizational Workflows Based on Process-Views", Springer-Verlag Berlin Heidelberg, 2001.*

Aissi, S. et al, "E-Business Process Modeling: The Next Big Step," IEEE Computer Journal, vol. 35, No. 5, May 2002, pp. 55-62.

Arkin, A., "Business Process Modeling Language (BPML) 1.0 Last Working Draft," BPMLorg Technical Report, 2002, 98 pgs.

Arkin, A. et al, "Web Service Choreography Interface (WSCI) 1.0 Specification," http://wwws.sun.com/software/xml/developers/wsci/, Sun Microsystems Technical Report, 2002.

Arnold, D. et al, "Discourse with Disposable Computers: How and Why You Will Talk to Your Tomatoes," Usenix Workshop on Embedded Systems, Cambridge, Massachusetts, 1999, 15 pgs.

Arsenault et al, "Internet x.509 Public Key Infrastructure: Roadmap," IETF Technical Report, 2002.

Atkinson, B. et al, "Web Services Security (WS-Security) 1.0," Technical Report, IBM, Verisign, Microsoft, 2002.

Becker, J. et al, "Towards a Classification Framework for Application Granularity in Workflow Management Systems," Proceedings of the Eleventh International Conference on Advanced Information Systems Engineering, Heidelberg, Germany, 1999, pp. 411-416.

BPMI.org, BPML XML Schema, http://www.bpmi.org/2001/3/BPML.xsd, Technical Report, 2001.

Casati, F. et al, "Eflow: a Platform for Developing and Managing Composite E-Services," http://www.hpl.hp.com/techreports/2000/HPL-2000-36.pdf, Hewlett Packard Technical Report, 2000, 8 pgs.

Chen, Q., "Inter-Enterprise Collaborative Business Process Management," http://www.hpl.hp.com/techreports/2000/HPL-2000-107.pdf, HP Labs Palo Alto Technical Report, 2000, 18 pgs.

Cisco, "White Paper IPSEC—Executive Summary," Technical Report, 2000.

Curbera, F. et al, "Business Process Execution Language for Web Services, Version 1.0," Technical Report, IBM, BEA Systems, Microsoft, 2002.

DSTC Pty Ltd., "UML Profile for Enterprise Distributed Object Computing (EDOC)," ftp://ftp.omg.org/pub/docs/ad/99-10-07.af, Technical Report, 1999, 92 pgs.

ebXML, "ebXML Technical Architecture Specification v1.0.4," Technical Report, 2001, 39 pgs.

ebXML, "Requirements Specification Version 1.0," Technical Report, 2000, 31 pgs.

Klingemann, J. et al, "Adaptive Outsourcing in Cross-Organizational Workflows," Proceedings of the Eleventh International Conference on Advanced Information Systems Engineering, Heidelberg, Germany, 1999, pp. 417-421.

Klingemann, J. et al, "Deriving Service Models in Cross-Organizational Workflows," Proceedings of the Ninth International Workshop on Research Issues in Data Engineering—IT for Virtual Enterprises, 1999, pp. 100-107.

Leymann, F. et al, "Web Services Flow Language (WSFL) 1.0," IBM Technical Report, 2001, 107 pgs.

Object Management Group, "CORBA/SOAP Interworking—Request for Proposal," Technical Report orbos/00-09-07, 2000, 23 pgs.

Object Management Group, "Final Report of the Workflow Management Facility Revision Task Force 1.2," Technical Report dtc/99-07-04, 1999, 58 pgs.

Object Management Group, "Naming Service Specification," Technical Report, 2001.

Object Management Group, "Trading Object Service Specification, Version 1.0," Technical Report, 2000.

Object Management Group, "A UML Profile for Enterprise Distributed Object Computing," Technical Report ad/2001-06-09, 2001, 445 pgs.

Segall, B. et al, "Content Based Routing with Elvin4," Proceedings AUUG2k, Canberra, Australia, 2000.

Sladek, A. et al, "Modeling Inter-Organisational Workflows," Proceedings of the International Symposium on Applied Corporate Computing, 1996, pp. 13-22.

Steinmann, R. et al, "Demonstration of Virtual LSE Enterprise—Vega 5th Review Demonstration," Technical Report, ESPRIT Vega EP 20408, 1999, 34 pgs.

Steinmann, R. et al, "Virtual Enterprises Using Groupware Tools and Distributed Architectures—Public Final Report," http://cic.sop.cstbr.fr/ILC/ecprojec/, Technical Report PFR-01, ESPRIT Vega EP 20408, 1999, 56 pgs.

UDDI.org, "UDDI Programmer's API Specification," Technical Report, 2000, 60 pgs.

UDDI.org, "UDDI Technical Whitepaper," Technical Report, 2000, 12 pgs.

W3C, "Simple Object Access Protocol (SOAP) 1.1," Technical Report, 2000.

W3C, "Web Services Description Language (WSDL) 1.1," http://www.w3.org/TR/wsdl, Technical Report, 2001.

Workflow Management Coalition, "Interface 1: Process Definition Interchange Process Model Specification, Version 1.1," Technical Report WFMC-TC-1016, 1999, 103 pgs.

Workflow Management Coalition, "Successful Demonstration of Workflow Interoperability a Major Milestone," http://www.aiim.org/wfmc/pr/pr11996-07-09.htm, 1996.

Workplace Management Coalition, "The Workflow Reference Model," Technical Report WFMC-TC-1003, 1995, 55 pgs.

Workflow Management Coalition, "Workflow Standard—Interoperability—Abstract Specification, Version 1.0," Technical Report WFMC-TC-1012, 1996, 68 pgs.

Workflow Management Coalition, "Workflow Standard—Interoperability—WFXML Binding Version 1.1," Technical Report WFMC-TC-1023, 2001, 57 pgs.

Hayes et al., "Workplace Interoperability Standards for the Internet," *IEEE Internet Computing*, 2000, pp. 37-45.

Basu et al., "A formal approach to workflow analysis," Information Systems Research, 2000, 11(1): 17-36.

Gal et al., "Inter-enterprise workflow management systems," Proceedings of the 10th International Workshop on Database & Expert Systems Applications, 1999, 5 pgs.

Grefen et al., "CrossFlow: cross-organizational workflow management in dynamic virtual enterprises," *Computer Systems Science & Engineering*, 2000, 15(5): 277-290.

Gronemann et al., "Supporting cross-organizational engineering processes by distributed collaborative workflow management—The MOKASSIN Approach," International Proceedings of the 2nd Symposium on Concurrent Multidisciplinary Engineering, 1999.

Kafeza et al., "View-based contracts in an E-service cross-organizational workflow environment," Proceedings of the 2nd International Workshop on Technologies for E-services, 2001, pp. 74-88.

Kang et al., "Access control mechanisms for Inter-Organizational Workflow," Proceedings of the 6th ACM Symposium on Access Control Models and Technologies, 2001, pp. 66-74.

Klingemann et al., "Deriving service models in cross-organizational workflows," Proceedings of the 9th International Workshop on Research Issues on Data Engineering: Information Technology for Virtual Enterprises, 1999, 8 pgs.

Meng et al., "Achieving dynamic inter-organizational workflow management by integrating business processes, events and rules," Proceedings of the 35th Annual Hawaii International Conference on System Sciences, 2002, p. 10 pgs.

Schulz et al., "Architecting cross-organisational B2B interactions," Proceedings of the 4th International Conference on Enterprise Distributed Object Computing, 2000, pp. 92-101.

Schulz et al., "Architectural issues for cross-organisational B2B interactions," International Conference on Distributed Computing Systems Workshop, 2001, pp. 79-87.

van der Aalst, "Inheritance of interorganizational workflows to enable business-to-business e-commerce," Electronic Commerce Research, 2002, 2(3): 195-231.

van der Aalst, "Interorganizational workflows: An approach based on message sequence charts and petri nets," System Analysis—Modelling & Simulation, 1999, 34(3): 335-367.

van der Aalst, et al., "The P2P approach to interorganizational workflows," Proceedings of the 13th International Conference on Advances Information Systems Engineering, 2001, pp. 140-156.

Office Action from U.S. Appl. No. 10/628,565, dated Nov. 29, 2007, 14 pages; Final Office Action dated May 20, 2008, 16 pages; Advisory Action dated Aug. 18, 2008, 3 pages; Office Action dated Nov. 20, 2008, 13 pages; and Final Office Action dated May 13, 2009, 16 pages.

Office Action from U.S. Appl. No. 10/628,564, dated Jul. 27, 2006, 8 pages; Notice of Allowance dated Jan. 9, 2007, 7 pages; and Corrected Notice of Allowance dated May 10, 2007, 7 pages.

Office Action from U.S. Appl. No. 10/628,560, dated Feb. 22, 2007, 8 pages; Office Action dated Jul. 27, 2007, 6 pages; and Notice of Allowance dated Oct. 19, 2007, 7 pages.

* cited by examiner

FIG. 12

| Row-Index (i) \ Column-Index (j) | 1 | 2 | ... | l | ... | m-1 | m | m+1 | ... | m+n-1 | m+n |
|---|---|---|---|---|---|---|---|---|---|---|---|
| 1 | $m_{1,1}$ | $m_{1,2}$ | $m_{1,...}$ | $m_{1,l}$ | $m_{1,...}$ | $m_{1,m-1}$ | $m_{1,m}$ | $m_{1,l}$ | 0 | 0 | 0 |
| 2 | $m_{2,1}$ | $m_{2,2}$ | $m_{2,...}$ | $m_{2,l}$ | $m_{2,...}$ | $m_{2,m-1}$ | $m_{2,m}$ | $m_{2,l}$ | 0 | 0 | 0 |
| ... | $m_{...,1}$ | $m_{...,2}$ | $m_{...,...}$ | $m_{...,l}$ | $m_{...,...}$ | $m_{...,m-1}$ | $m_{...,m}$ | $m_{...,l}$ | 0 | 0 | 0 |
| l | $m_{l,1}$ | $m_{l,2}$ | $m_{l,...}$ | $m_{l,l}$ | $m_{l,...}$ | $m_{l,m-1}$ | $m_{l,m}$ | $m_{l,l}$ | 0 | 0 | 0 |
| ... | $m_{...,1}$ | $m_{...,2}$ | $m_{...,...}$ | $m_{...,l}$ | $m_{...,...}$ | $m_{...,m-1}$ | $m_{...,m}$ | $m_{...,l}$ | 0 | 0 | 0 |
| m-1 | $m_{m-1,1}$ | $m_{m-1,2}$ | $m_{m-1,...}$ | $m_{m-1,l}$ | $m_{m-1,...}$ | $m_{m-1,m-1}$ | $m_{m-1,m}$ | $m_{m-1,l}$ | 0 | 0 | 0 |
| m | $m_{m,1}$ | $m_{m,2}$ | $m_{m,...}$ | $m_{m,l}$ | $m_{m,...}$ | $m_{m,m-1}$ | $m_{m,m}$ | $m_{m,l}$ | 0 | 0 | 0 |
| m+1 | 0 | 0 | 0 | 0 | 0 | 0 | 0 | $n_{1,1}$ | $n_{1,...}$ | $n_{1,n-1}$ | $n_{1,n}$ |
| ... | 0 | 0 | 0 | 0 | 0 | 0 | 0 | $n_{...,1}$ | $n_{...,...}$ | $n_{...,n-1}$ | $n_{...,n}$ |
| m+n-1 | 0 | 0 | 0 | 0 | 0 | 0 | 0 | $n_{n-1,1}$ | $n_{n-1,...}$ | $n_{n-1,n-1}$ | $n_{n-1,n}$ |
| m+n | 0 | 0 | 0 | $m_{l,l}$ | $m_{l,...}$ | $m_{l,m-1}$ | $m_{l,m}$ | $n_{n,1}$ | $n_{n,...}$ | $n_{n,n-1}$ | $n_{n,n}$ |

FIG. 13

| Row-Index (i) \ Column-Index (j) | 1 | 2 | ... | k-1 | k | k+1 | ... | m |
|---|---|---|---|---|---|---|---|---|
| 1 | $m_{1,1}$ | $m_{1,2}$ | ... | $m_{1,k-1}$ | $m_{1,k}$ | $m_{1,k+1}$ | ... | $m_{1,m}$ |
| 2 | $m_{2,1}$ | $m_{2,2}$ | ... | $m_{2,k-1}$ | $m_{2,k}$ | $m_{2,k+1}$ | ... | $m_{2,m}$ |
| ... | ... | ... | ... | ... | ... | ... | ... | ... |
| k-1 | $m_{k-1,1}$ | $m_{k-1,2}$ | ... | $m_{k-1,k-1}$ | $m_{k-1,k}$ | $m_{k-1,l+1}$ | ... | $m_{k-1,m}$ |
| k | $m_{l,1}$ | $m_{l,2}$ | ... | $m_{l,k-1}$ | 0 | $m_{l,l+1}$ | ... | $m_{l,m}$ |
| k+1 | $m_{l+1,1}$ | $m_{l+1,2}$ | ... | $m_{l+1,k-1}$ | $m_{l+1,k}$ | $m_{l+1,l+1}$ | ... | $m_{l+1,m}$ |
| ... | ... | ... | ... | ... | ... | ... | ... | ... |
| r | $m_{m,1}$ | $m_{m,2}$ | ... | $m_{m,k-1}$ | $m_{m,k}$ | $m_{m,l+1}$ | ... | $m_{m,m}$ |

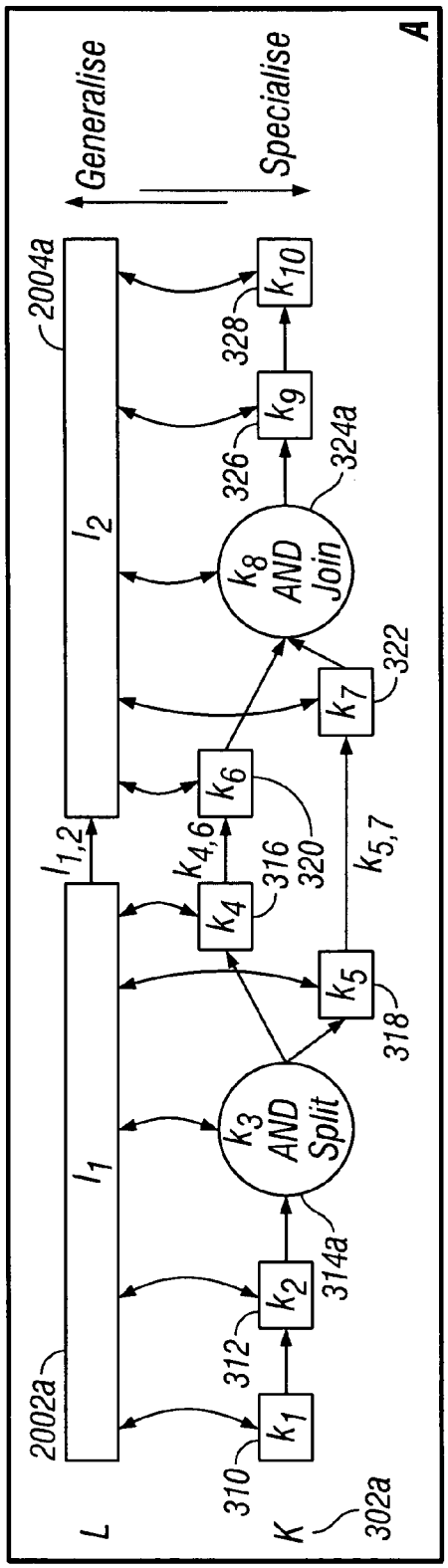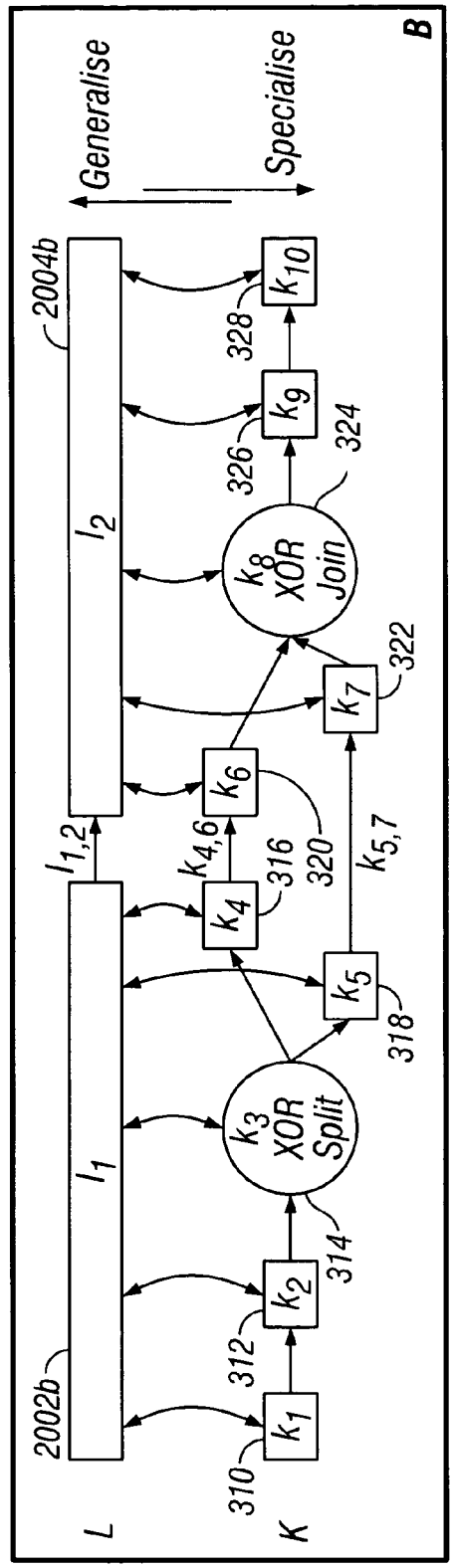
FIG. 20A
FIG. 20B

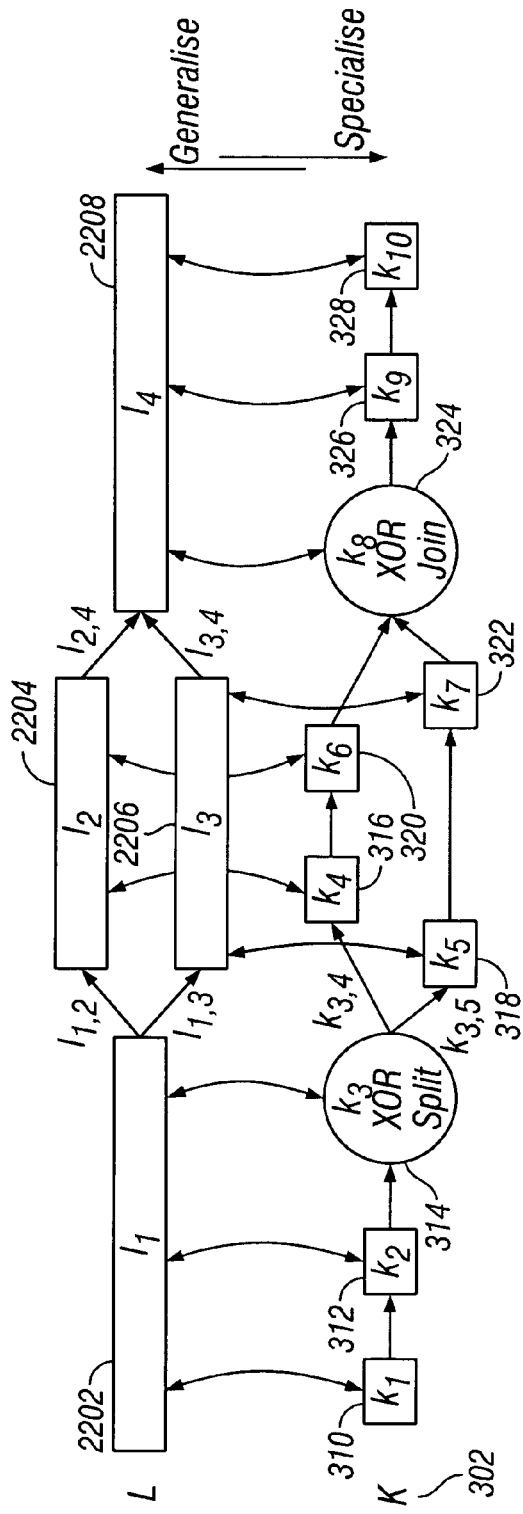
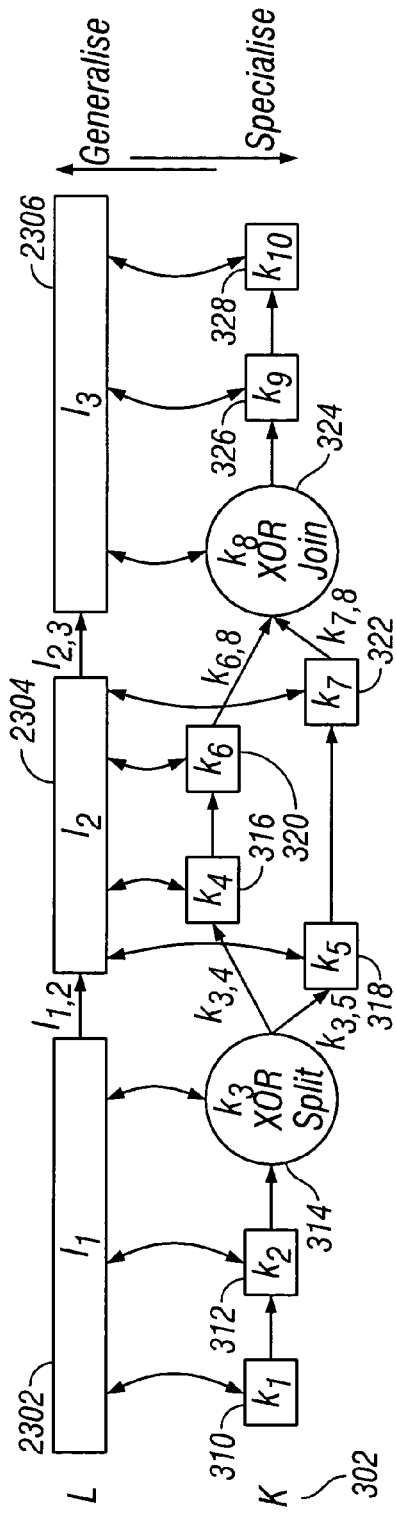
FIG. 22
FIG. 23

| $v_k$ | $Siavs_e(v_k)$ |
|---|---|
| $s_1$ | $\{s_1,s_2,s_3,s_4,s_5,s_6,s_7,s_8,s_9,s_{10},s_{11},s_{12}\}$ |
| $s_2$ | $\{s_2,s_3,s_4,s_5,s_6,s_7,s_8,s_9,s_{10},s_{11},s_{12}\}$ |
| $s_3$ | $\{s_2,s_3,s_4,s_5,s_6,s_7,s_8,s_9,s_{10},s_{11},s_{12}\}$ |
| $s_4$ | $\{s_2,s_3,s_4,s_5,s_6,s_7,s_8,s_9,s_{10},s_{11},s_{12}\}$ |
| $s_5$ | $\{s_2,s_3,s_4,s_5,s_6,s_7,s_8,s_9,s_{10},s_{11},s_{12}\}$ |
| $s_6$ | $\{s_2,s_3,s_4,s_5,s_6,s_7,s_8,s_9,s_{10},s_{11},s_{12}\}$ |
| $s_7$ | $\{s_2,s_3,s_4,s_5,s_6,s_7,s_8,s_9,s_{10},s_{11},s_{12}\}$ |
| $s_8$ | $\{s_2,s_3,s_4,s_5,s_6,s_7,s_8,s_9,s_{10},s_{11},s_{12}\}$ |
| $s_9$ | $\{s_2,s_3,s_4,s_5,s_6,s_7,s_8,s_9,s_{10},s_{11},s_{12}\}$ |
| $s_{10}$ | $\{s_2,s_3,s_4,s_5,s_6,s_7,s_8,s_9,s_{10},s_{11},s_{12}\}$ |
| $s_{11}$ | $\{s_2,s_3,s_4,s_5,s_6,s_7,s_8,s_9,s_{10},s_{11},s_{12}\}$ |
| $s_{12}$ | $\{s_2,s_3,s_4,s_5,s_6,s_7,s_8,s_9,s_{10},s_{11},s_{12}\}$ |
| $s_{13}$ | $\{s_2,s_3,s_4,s_5,s_6,s_7,s_8,s_9,s_{10},s_{11},s_{12},s_{13}\}$ |

*FIG. 27B*

| $v_k$ | $Siavs_e(v_k)$ |
|---|---|
| $S_1$ | $\{S_1,S_2,S_3,S_4,S_5,S_6,S_7,S_8,S_9,S_{12},S_{13},S_{14},S_{15},S_{16},S_{17},S_{18},S_{19},S_{20},S_{21},S_{22}\}$ |
| $S_2$ | $\{S_2,S_3,S_4,S_5,S_6,S_7,S_8\}$ |
| $S_3$ | $\{S_3,S_6\}$ |
| $S_4$ | $\{S_4,S_7\}$ |
| $S_5$ | $\{S_2,S_3,S_4,S_5,S_6,S_7,S_8\}$ |
| $S_6$ | $\{S_3,S_6\}$ |
| $S_7$ | $\{S_4,S_7\}$ |
| $S_8$ | $\{S_2,S_3,S_4,S_5,S_6,S_7,S_8,S_9,S_{12},S_{13},S_{14},S_{15},S_{16},S_{17},S_{18},S_{19},S_{20},S_{21},S_{22}\}$ |
| $S_9$ | $\{S_1,S_2,S_3,S_4,S_5,S_6,S_7,S_8,S_9,S_{12},S_{13},S_{14},S_{15},S_{16},S_{17},S_{18},S_{19},S_{20},S_{21},S_{22}\}$ |
| $S_{10}$ | $\{S_{10},S_{11}\}$ |
| $S_{11}$ | $\{S_{10},S_{11}\}$ |
| $S_{12}$ | $\{S_{12},S_{13},S_{14},S_{15}\}$ |
| $S_{13}$ | $\{S_{12},S_{13},S_{14},S_{15}\}$ |
| $S_{14}$ | $\{S_{12},S_{13},S_{14},S_{15}\}$ |
| $S_{15}$ | $\{S_{12},S_{13},S_{14},S_{15}\}$ |
| $S_{16}$ | $\{S_{16},S_{17},S_{18},S_{19}\}$ |
| $S_{17}$ | $\{S_{16},S_{17},S_{18},S_{19}\}$ |
| $S_{18}$ | $\{S_{16},S_{17},S_{18},S_{19}\}$ |
| $S_{19}$ | $\{S_{16},S_{17},S_{18},S_{19}\}$ |
| $S_{20}$ | $\{S_{20},S_{21}\}$ |
| $S_{21}$ | $\{S_{20},S_{21}\},\{S_{21},S_{22}\}$ |
| $S_{22}$ | $\{S_{21},S_{22}\}$ |

*FIG. 28B*

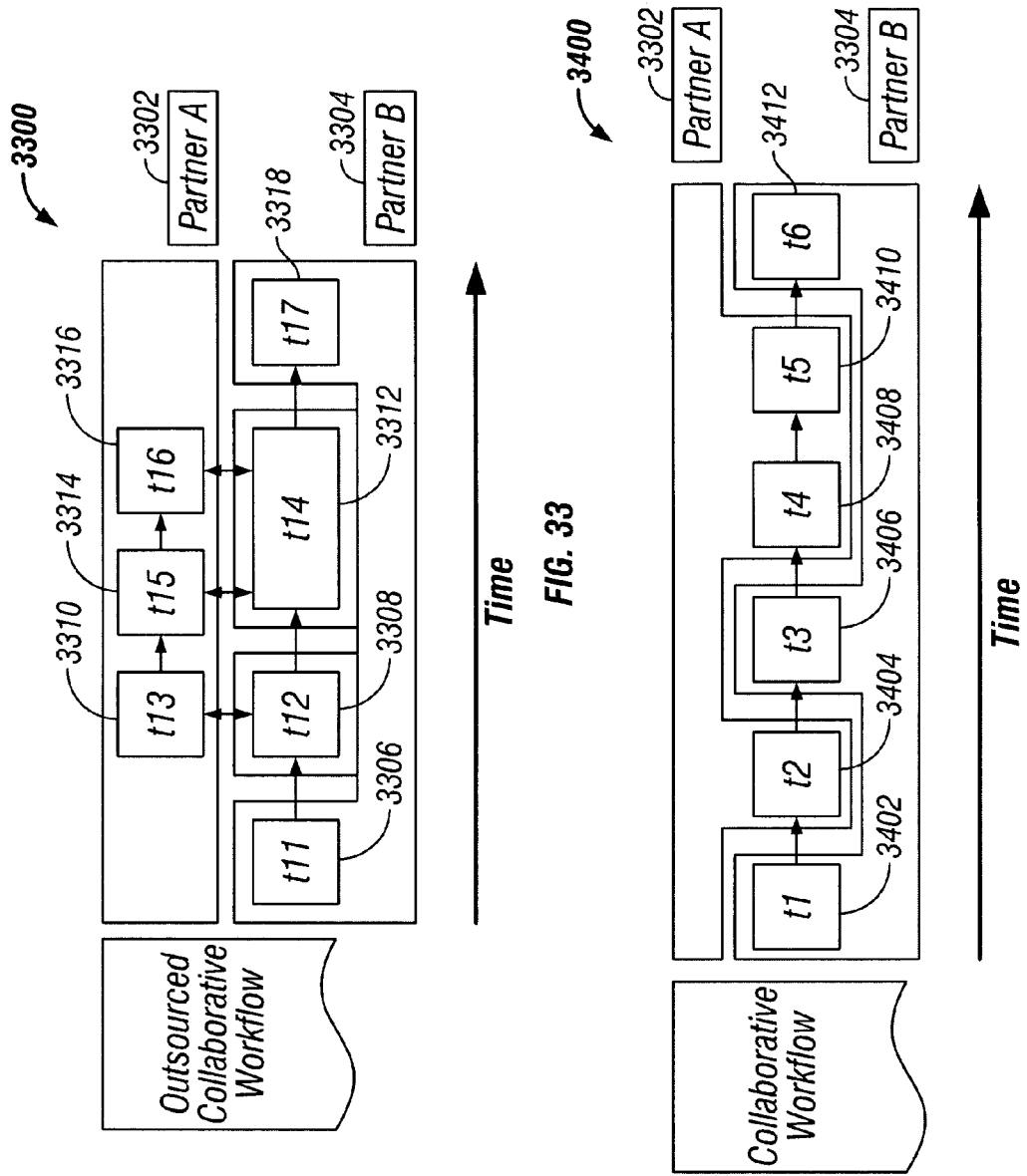

| Row-Index (i) \ Column-Index (j) | 1 | 2 | ... | k | ... | m | r |
|---|---|---|---|---|---|---|---|
| 1 | $m_{1,1}$ | $m_{1,2}$ | ... | $m_{1,k}$ | ... | $m_{1,m}$ | 0 |
| 2 | $m_{2,1}$ | $m_{2,2}$ | ... | $m_{2,k}$ | ... | $m_{2,m}$ | 0 |
| ... | ... | ... | ... | ... | ... | ... | 0 |
| k | 0 | 0 | 0 | 0 | 0 | 0 | 1 |
| ... | ... | ... | ... | ... | ... | ... | 0 |
| m | $m_{m,1}$ | $m_{m,2}$ | ... | $m_{m,k}$ | ... | $m_{m,m}$ | 0 |
| r | $m_{k,1}$ | $m_{k,2}$ | ... | $m_{k,k}$ | ... | $m_{k,m}$ | 0 |

| Row-Index (i) \ Column-Index (j) | 1 | 2 | ... | k-1 | k | k+1 | k+2 | ... | r |
|---|---|---|---|---|---|---|---|---|---|
| 1 | $m_{1,1}$ | $m_{1,2}$ | ... | $m_{1,k-1}$ | $m_{1,k}$ | $m_{1,k+1}$ | $m_{1,k+2}$ | ... | $m_{1,m}$ |
| 2 | $m_{2,1}$ | $m_{2,2}$ | ... | $m_{2,k-1}$ | $m_{2,k}$ | $m_{2,k+1}$ | $m_{2,k+2}$ | ... | $m_{2,m}$ |
| ... | ... | ... | ... | ... | ... | ... | ... | ... | ... |
| k-1 | $m_{k-1,1}$ | $m_{k-1,2}$ | ... | $m_{k-1,k-1}$ | $m_{k-1,k}$ | $m_{k-1,k+1}$ | $m_{k-1,k+2}$ | ... | $m_{k-1,m}$ |
| k | $m_{k+1,1}$ | $m_{k+1,2}$ | ... | $m_{k+1,k-1}$ | $m_{k+1,k}$ | $m_{k+1,k+1}$ | $m_{k+1,k+2}$ | ... | $m_{k+1,m}$ |
| k+1 | $m_{k+2,1}$ | $m_{k+2,2}$ | ... | $m_{k+2,k-1}$ | $m_{k+2,k}$ | $m_{k+2,k+1}$ | $m_{k+2,k+2}$ | ... | $m_{k+2,m}$ |
| ... | ... | ... | ... | ... | ... | ... | ... | ... | ... |
| r | $m_{m,1}$ | $m_{m,2}$ | ... | $m_{m,k-1}$ | $m_{m,k}$ | $m_{m,k+1}$ | $m_{m,k+2}$ | ... | $m_{m,m}$ |

TRANSFORMATIONS BETWEEN COMBINED AND INDIVIDUAL WORKFLOWS

CROSS-REFERENCE TO RELATED APPLICATION

This application claims priority to U.S. Provisional Application Ser. No. 60/399,455, filed on Jul. 31, 2002, and titled FLEXIBLE WORKFLOW MANAGEMENT IN CROSS-ORGANIZATIONAL ENVIRONMENTS.

TECHNICAL FIELD

This description relates to workflow management systems.

BACKGROUND

Conventional workflow systems exist which allow enterprises to formalize the processes by which the enterprises achieve their business objectives. Such workflow systems provide step-by-step descriptions of tasks which must or should be performed as part of the workflow, so that individuals or groups within the enterprise can be assigned individual (or groups of) tasks. The tasks may be dependent upon one another; for example, a task may only be begun upon completion of a prior task(s), or tasks may be included in iterative task loops. Additionally, the tasks may have more complex dependencies, requiring application of extensive logic rules to ensure proper completion of the workflow.

Examples of such conventional workflows can be found explicitly or implicitly in almost any enterprise. For example, a manufacturing plant may have a workflow for producing a particular type of good. As another example, an organization selling goods may have a workflow for obtaining the goods, inputting orders and/or payments for the goods, selecting a shipper for shipping the goods, and updating an inventory record based on the sale.

Given that individual enterprises often have and use their individual workflow(s) as just described, it may be problematic for one enterprise to interact with another enterprise, while still maintaining the use of their respective workflows as part of the interaction(s). For example, a workflow associated with a first enterprise may have its own nomenclature and/or semantics, which may be incompatible with the workflow of a second enterprise. This is particularly true, given that such workflows are often formulated completely independently of one another. Another difficulty facing enterprises desiring to work together is that workflows are often private or confidential in nature, and the business(es) may be hesitant to share some or all of their private workflows with an external party.

As a result of these and other difficulties associated with sharing workflows between enterprises, collaborations between enterprises are often limited. For example, the enterprises may only be able to interact in relatively simplistic manners, so that interactions between the enterprises are limited in quantity and complexity. As another example, the enterprises may have to resort to formulating a new workflow to describe some or all of the tasks that are to be performed as part of the enterprises' collaboration.

SUMMARY

According to one general aspect, a combined workflow is built. a first workflow comprising a first plurality of tasks and associated with a first party is accepted, a second workflow comprising a second plurality of tasks and associated with a second party is accepted, the first plurality of tasks and the second plurality of tasks are ordered into a combined workflow having a task order that, when executed, provides a desired result of a business collaboration between the first party and the second party, and ordering tasks are added that are operable to implement the order of the combined workflow and thereby achieve the desired result.

Implementations may include one or more of the following features. For example, in adding ordering tasks, a sequential flow may be formed which interleaves implementation of the first plurality of tasks and the second plurality of tasks, or a parallel flow of a first task within the first plurality of tasks and a second task within the second plurality of tasks may be formed, or at least one of a conjunctive splitting and joining tasks which specify the task order may be added.

Also in adding ordering tasks, at least one of alternative splitting and joining tasks may be added which specify the task order, or a first splitting task may be added which designates that a first task within the first workflow is followed by a first following task and a second following task. In the latter case, the first following task may be added as a second task within the second workflow, or the first following task may be added as a first joining task, the first joining task designating a second task within the second workflow as following the first joining task and the first splitting task.

In the latter case, a second splitting task may be added following the second task within the second workflow, the second splitting task designating that the second task is followed by a third following task and a fourth following task. In this case, the third following task may be added as the second following task, the second following task being a second joining task within the first workflow that designates that a third task within the first workflow follows the second following task. Further in adding ordering tasks, the fourth following task may be added as a third joining task within the second workflow, the third joining task designating that a fourth task within the second workflow follows the third joining task and the third task within the first workflow. Still further, the second ordering task may be a joining task which designates a fourth task within the second workflow, the fourth task following the second task within the combined workflow.

In adding ordering tasks, a third task within the first workflow may be added as the second following task, and a second joining task may be added within the first workflow as the third following task, the second joining task designating that a fourth task within the first workflow follows the third following task.

Ordering the first plurality of tasks may include inputting the task order from an operator, in which case, adding ordering tasks may include representing the first workflow as a first matrix in which the first plurality of tasks are each represented as first vertices, where values of the first vertices within the first matrix are determined by first dependencies between the first plurality of tasks, and representing the second workflow as a second matrix wherein each of the second plurality of tasks are represented as second vertices, where values of the second vertices within the second matrix are determined by second dependencies between the second plurality of tasks. In the latter case, adding ordering tasks may include inserting the first matrix and the second matrix into a third matrix, modifying a selected value within the third matrix, thereby reflecting a construction or removal of a selected dependency between two vertices within the first plurality of tasks, consistent with the task order, adding a fourth vertex before a first of the two vertices, the fourth vertex having a first chosen value reflecting a first new dependency between the fourth vertex and the first of the two vertices, and adding a fifth vertex after the first of the two vertices, the fifth vertex having a second chosen value reflecting a second new dependency between the fifth vertex and the first of the two vertices.

The first workflow may be an abstracted workflow associated with a first actual workflow of the first party, and further wherein a confidential nature of the first actual workflow may be protected by use of the abstracted workflow in constructing the combined workflow.

Also, a subset of the combined workflow may be selected for execution by the first party. In this case, it may be determined that the subset includes a third plurality of tasks, each consecutive pair of the third plurality of tasks connected by a dependency, or that a last task within the third plurality of tasks precedes at most one subsequent task within the combined workflow. In the latter case, it may be determined that no internal task within the third plurality of tasks, exclusive of the last task, immediately precedes an external task that is not included within the third plurality of tasks, or that no internal task within the third plurality of tasks, exclusive of a first task of the third plurality of tasks, immediately succeeds an external task that is not included within the third plurality of tasks.

According to another general aspect, an apparatus includes a storage medium having instructions stored thereon. The instructions include a first code segment for accepting a first workflow comprising a first plurality of tasks and associated with a first party, a second code segment for accepting a second workflow comprising a second plurality of tasks and associated with a second party, a third code segment for accepting a task order for forming the first plurality of tasks and the second plurality of tasks into a combined workflow, wherein the combined workflow, when executed, provides a desired result of a business collaboration between the first party and the second party, and a fourth code segment for adding ordering tasks operable to implement the order of the combined workflow and thereby achieve the desired result.

Implementations may include one or more of the following features. For example, the fourth code segment may include a fifth code segment for forming a sequential flow which interleaves implementation of the first plurality of tasks and the second plurality of tasks, or a fifth code segment for forming a parallel flow of a first task within the first plurality of tasks and a second task within the second plurality of tasks.

The fourth code segment may include a fifth code segment for adding at least one of conjunctive splitting and joining tasks which specify the task order, or for adding at least one of alternative splitting and joining tasks which specify the task order.

The third code segment may include a fifth code segment for inputting the task order from an operator. In this case, the fourth code segment may include a fifth code segment for representing the first workflow as a first matrix in which the first plurality of tasks are each represented as first vertices, where values of the first vertices within the first matrix are determined by first dependencies between the first plurality of tasks, and a sixth code segment for representing the second workflow as a second matrix wherein each of the second plurality of tasks are represented as second vertices, where values of the second vertices within the second matrix are determined by second dependencies between the second plurality of tasks.

Further in this case, the fourth code segment may include a seventh code segment for inserting the first matrix and the second matrix into a third matrix, an eighth code segment for modifying a selected value within the third matrix, thereby reflecting a construction or removal of a selected dependency between two vertices within the first plurality of tasks, consistent with the task order, a ninth code segment for adding a fourth vertex before a first of the two vertices, the fourth vertex having a first chosen value reflecting a first new dependency between the fourth vertex and the first of the two vertices, and a tenth code segment for adding a fifth vertex after the first of the two vertices, the fifth vertex having a second chosen value reflecting a second new dependency between the fifth vertex and the first of the two vertices.

The first workflow may be an abstracted workflow associated with a first actual workflow of the first party, and further wherein a confidential nature of the first actual workflow may be protected by use of the abstracted workflow in constructing the combined workflow.

The apparatus may include a fifth code segment for selecting a subset of the combined workflow for execution by the first party. In this case, the fifth code segment may include a sixth code segment for determining that the subset includes a third plurality of tasks, each consecutive pair of the third plurality of tasks connected by a dependency. Alternatively, the fifth code segment may include a sixth code segment for determining that a last task within the third plurality of tasks precedes at most one subsequent task within the combined workflow.

In the latter case, the sixth code segment may include a seventh code segment for determining that no internal task within the third plurality of tasks, exclusive of the last task, immediately precedes an external task that is not included within the third plurality of tasks, or for determining that no internal task within the third plurality of tasks, exclusive of a first task of the third plurality of tasks, immediately succeeds an external task that is not included within the third plurality of tasks.

The details of one or more implementations are set forth in the accompanying drawings and the description below. Other features will be apparent from the description and drawings, and from the claims.

DESCRIPTION OF DRAWINGS

FIG. 12 is an illustration of a matrix used as a specialization operator.

FIG. 13 is a matrix illustrating an algorithm for computing specialization.

FIG. 14 is an illustration of a matrix used as a generalization operator.

FIG. 16 is an illustration of a matrix used as a verticalization operator.

FIGS. 18-23 provide further examples of how a workflow can be verticalized (generalized).

FIG. 27B is a table listing adjacent v-structures for each vertex (node) of the digraph of FIG. 27A.

FIG. 28B is a table listing adjacent v-structures for each vertex (node) of the digraph of FIG. 28A.

FIG. 33 is a block diagram of an outsourced workflow.

FIG. 34 is a block diagram of a distributed workflow.

FIG. 39 is an example of a second matrix resulting from a second expansion operation.

FIG. 40 is an example of a third matrix resulting from a third expansion operation.

FIG. 41 is an example of a fourth matrix resulting from a fourth expansion operation.

FIG. 43 is a matrix that is an example of a reduction operator.

DETAILED DESCRIPTION

In the following description, Section I describes a three-level model for allowing enterprises to fully and easily collaborate with one another, while still taking advantage of the enterprises' individual, existing workflows and ensuring confidentiality of tasks within the workflows on an as-needed basis. The three-level or three-tier model involves, on the first level, a first private workflow associated with a first enterprise, and a second private workflow associated with a second enterprise. On the second level, each of the private workflows is abstracted, such that a first virtual workflow having a first set of virtual tasks is generated which corresponds to the first private workflow, while a second virtual workflow having a second set of virtual tasks is generated which corresponds to the second private workflow. Finally, at the third level, a collaboration workflow is generated from the two virtual workflows. The virtual workflows have state dependencies with respect to their respective private workflows, such that a completion of a virtual task definitively corresponds to a completion of a corresponding actual task(s) within the private workflow.

Section II describes techniques for determining whether an abstraction level of a workflow can be legitimately altered in a desired manner, and for, if allowed, actually performing the alteration. For example, a private task or group of tasks within an enterprise's existing workflow may be abstracted, or generalized, into one or more virtual tasks. Conversely, a virtual task may have its abstraction level reduced, or specialized, into one or more private tasks. These techniques for determining a feasibility of altering an abstraction level of a workflow, and for performing the alterations, can be utilized for various purposes, including implementation of the three-tier collaborative workflow model described in Section I.

Section III describes techniques for combining, or expanding, multiple workflows into a single workflow, while maintaining a validity of both the individual and joined workflows. Conversely, techniques are also described for dividing, or reducing, a single workflow into a plurality of individual workflows, where the individual workflows may be performed by individual parties or enterprises. These techniques can be used for a variety of purposes, including implementation of the three-tier workflow model of Section I.

Section IV describes why the three-tier model is necessary and/or useful for performing collaborative workflows, along with examples of such collaborative workflows.

Section V describes techniques for executing the three-tier model within, or in association with, a workflow engine. More specifically, Section V describes techniques for effectively supporting concurrent execution of an actual workflow and its associated workflow view.

Section I

Figure 1:
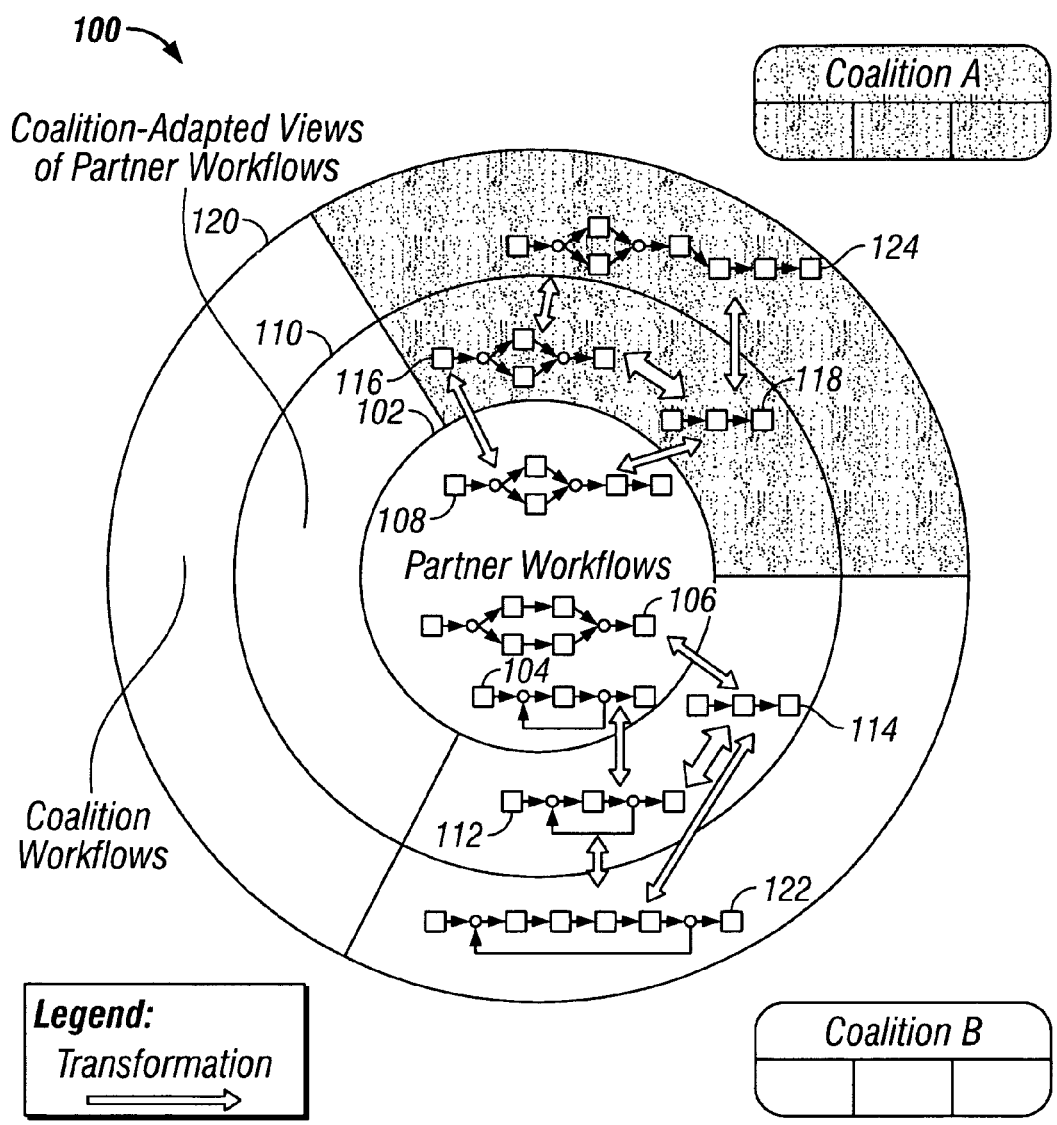
FIG. 1 is an illustration of a three-tiered workflow model.

FIG. 1 is an illustration of a three-tiered workflow model 100. In FIG. 1, a first tier of the three-tiered workflow model is a partner or private tier 102. Private tier 102 includes a first private workflow 104 associated with a first entity such as an enterprise, a second private workflow 106 associated with a second entity, and a third private workflow 108 associated with a third entity. In FIG. 1, each workflow (e.g., 104, 106, 108) includes various tasks having various dependencies therebetween, and each of the tasks represents an actual task to be performed by, for example, an employee of the appropriate entity.

A second tier of the three-tiered workflow model is an abstracted or virtual or "workflow view" tier 110. Workflow view tier 110 includes abstracted versions of the private workflows 104, 106, and 108. More particularly, the workflow view tier 110 includes a workflow view 112 abstracted from the private workflow 104, another workflow view 114 abstracted from the private workflow 106, another workflow view 116 that is also abstracted from the private workflow 106, and a final workflow view 118 which is abstracted from private workflow 108. As explained in more detail below, a given private workflow may have a plurality of abstractions or workflow views which can be generated therefrom, as shown by the example of workflow views 114 and 116, which, although different, are both generated from the same private workflow 106. This allows different partners to have different views of the same underlying workflow.

Specific techniques for generating the abstracted workflow views 112, 114, 116, and 118 (and for (re-)obtaining the private or partner workflows 104, 106, and 108 therefrom) are discussed in more detail in Section II. For the purposes of this section, however, it is assumed only that the workflow views are generated by some technique, which may be fully or partially automated, or may be simply performed by trial-and-error.

The third tier of the workflow model of FIG. 1 includes a coalition workflow tier 120. The coalition workflow tier 120 includes, in FIG. 1, two coalition workflows which represent the combination of particular workflow views. More specifically, the coalition workflow tier 120 includes a first coalition workflow 122 (also identified as "Coalition B" in FIG. 1) which represents a combination of the workflow view 112 and the workflow view 114. Similarly, the coalition workflow tier 120 also includes another coalition workflow 124 (also identified as "Coalition A" in FIG. 1), which represents a combination of the workflow views 116 and 118.

Specific techniques for combining the various workflow views into their corresponding coalition workflows (and for (re-)obtaining the individual workflow views from the coalition workflows) are discussed below in Section III. For the purposes of this Section, however, it is assumed only that the coalition workflows are generated by some technique, which may be fully or partially automated, or which may merely include trial-and-error.

The three-tiered approach of FIG. 1 is essentially a logical integration of all data and workflows needed by an application into one logical workflow management system, which may also be referred to as the "unified approach." It implies the existence of a unified meta-model which is able to map different existing models. Such integration creates the illusion of a single workflow management system, and hides from the user and the application the intricacies of different workflow management systems and different access methods. It provides users and applications with uniform access to workflows contained in various workflow management systems without migrating the workflows to a new workflow management system, without requiring the users and applications to know either the location or the characteristics of different workflow management systems.

Figure 2:
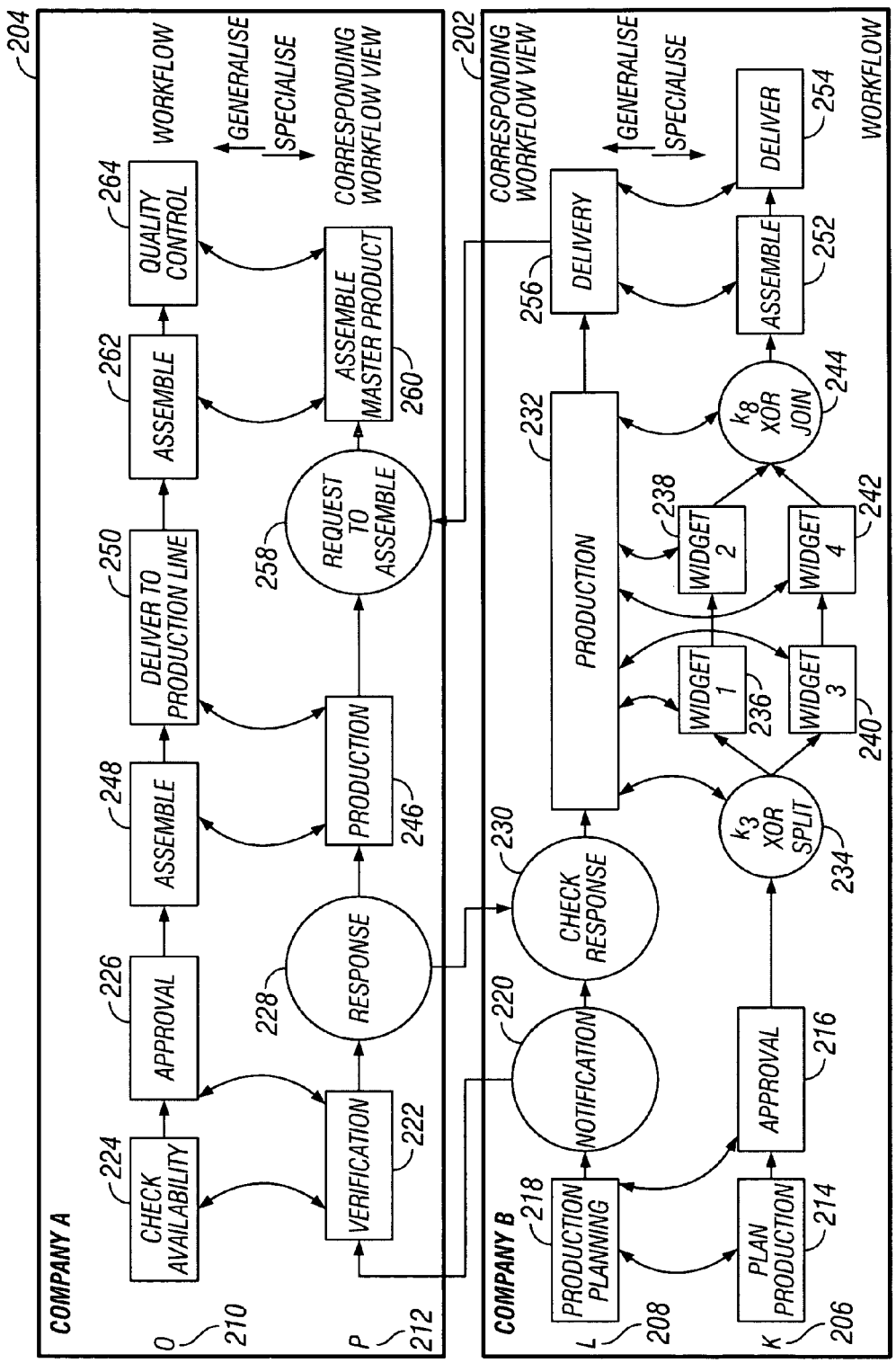
FIG. 2 is an illustration of an example of the three-tiered workflow model of FIG. 1 for implementing a manufacturing process.

FIG. 2 is an illustration of an example of the three-tiered workflow model of FIG. 1 for implementing a manufacturing process. In FIG. 2, a company B 202 confirms their upcoming production of a good with a company A 204. Company B 202 is responsible to produce a particular set of widgets (widgets 1, 2, 3, and 4) that are required in a production process of company A 204. Company B 202 has an internal (or private or partner) workflow K 206, which corresponds in concept to one of the partner workflows 104, 106, or 108 of FIG. 1. The partner workflow K 206 has a corresponding workflow view L 208, which corresponds in concept to one of the workflow views 112, 114, 116, or 118 of FIG. 1. Similarly, an internal workflow O 210 of company A 204 is abstracted as a workflow view P 212.

In the production process of FIG. 2, then, a collaboration of workflow view L 208 and workflow view P 212 provide a collaboration workflow corresponding in concept to coalition workflows 122 and 124 of FIG. 1. In FIG. 2, this collaboration occurs in a peer-to-peer manner, and the coalition workflow is not explicitly shown as a separate workflow, as discussed in more detail with respect to FIG. 3 below.

In FIG. 2, the company B 202 starts its workflow K 206 with a plan production task 214 according to its routine schedule. Once management has verified the availability of resources in an approval task 216, then an abstracted view of the two tasks 214 and 216, i.e., a production planning virtual task 218 within workflow L 208, is also considered to be completed.

At this point, a notification 220 is sent to company A 204, which starts a verification task 222, which actually involves company A 204 checking an availability of its production line in task 224, and generating an approval for company B 202 in approval task 226.

Company A 204 then sends a response to company B 202 in response task 228, which is received by company B 202 in a check response task 230. At this point, company B begins a virtual production task 232, which includes a splitting task 234 which conditionally splits the production process into a first widget-producing task 236 and a second widget-producing task 238, or into a third-widget producing task 240 and a fourth widget-producing task 242. Completion of a joining task 244 for joining the widgets then completes the virtual production task 232.

At the same time that company B 202 is performing the production task 232, company A 204 begins its own production task 246, which includes an assembly task 248 and a delivery task 250 for delivery to a different production line inside company A 204.

Once company B 202 finishes its production task 232, it assembles the widgets that have been produced in an assembly task 252, and delivers them in a delivery task 254, which completes a workflow view delivery task 256. Company A 204 then performs a workflow view task 258, and assembles the master product in an assembly task 260, which corresponds to an actual assembly task 262 and an actual quality control task 264.

Figure 3:
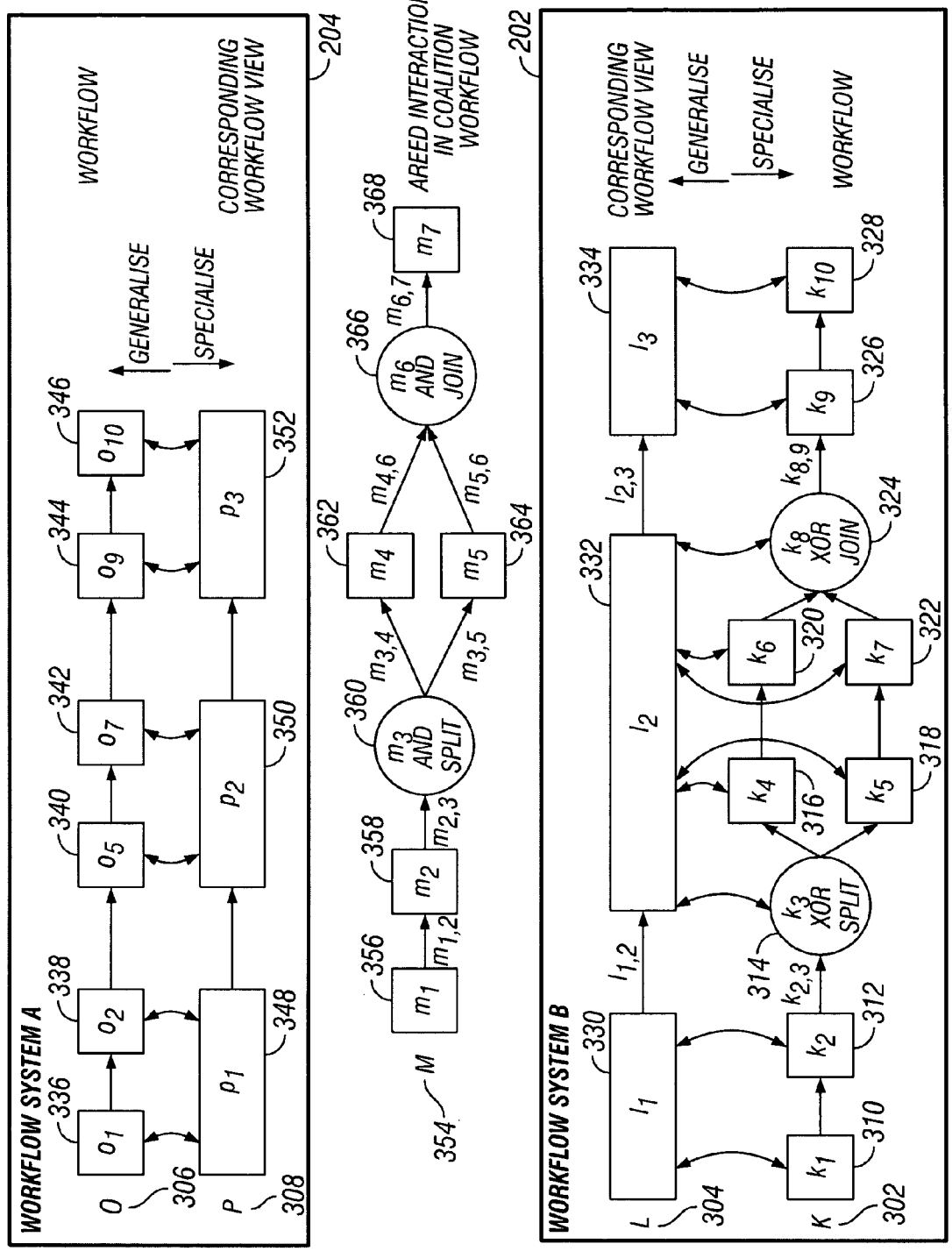
FIG. 3 is an illustration of a more generic example of the three-tiered workflow model of FIG. 2.

FIG. 3 is an illustration of a more generic example of the three-tiered workflow model of FIG. 2. In FIG. 3, as in FIG. 2, company B 202 has a private workflow K 302 and a corresponding workflow view L 304. Similarly, company A 204 has a private workflow O 306 and a workflow view P 308.

Private workflow K 302 includes a first task 310, a second task 312, a third task 314, a fourth task 316, a fifth task 318, a sixth task 320, a seventh task 322, an eighth task 324, a ninth task 326, and a tenth task 328. The first task 310 and the second task 312 are grouped into a first abstracted task 330 within workflow L 304. The third-eighth (314-324) tasks are grouped into a second abstracted task 332 within workflow L 304, and the ninth task 326 and the tenth task 328 are grouped into a third abstracted task 334 within workflow L 304.

Private workflow O 306 includes a first task 336, a second task 338, a third task 340, a fourth task 342, a fifth task 344, and a sixth task 346. The first task 336 and the second task 338 are grouped into a first abstracted task 348 within workflow P 308. The third task 340 and the fourth task 342 are grouped into a second abstracted task 350 within workflow P 308, and the fifth task 344 and the sixth task 346 are grouped into a third abstracted task 352 within workflow P 308.

In FIG. 3, the various workflows may be similar in operation to those shown in FIG. 2. In FIG. 3, however, it is shown explicitly that a collaboration of companies B 202 and A 204 may be expressed as a coalition workflow M 354. In FIG. 3, coalition workflow M 354 is shown to contain a first collaborative task 356, a second collaborative task 358, a fourth collaborative task 360 (a splitting task), a fourth collaborative task 362, a fifth collaborative task 364, a sixth collaborative task 366 (a joining task), and a seventh collaborative task 368. Workflow M 310 may be implemented in a peer-to-peer manner as in FIG. 2, or may be implemented by, or with the help of, a mediating party, as discussed in more detail below.

Thus, In FIG. 3, there are six view-activities 330, 332, 334 (in workflow view L 304), and 348, 350, and 352 (in workflow view P 308). The rules for describing how the workflow view activities are to interact are expressed though the coalition workflow M 354, with its activities 356, 358, 362, 364, and 368. The reason that there are a total of six view-activities and only five coalition activities is that one view activity is only intended for monitoring purposes.

As shown in FIGS. 2 and 3, each workflow view task in a workflow view corresponds to one or more actual tasks in a partner workflow. Thus, the workflow view(s) provide for monitoring of their corresponding partner view(s), and an assurance that the partner views are in fact being executed. As discussed in more detail below, this ability may be advantageous over an approach of merely indicating that an interaction between workflows has occurred, or will occur.

An analogous way of considering the correlation(s) between workflow views and their corresponding private workflows is to consider the tasks of each in terms of their execution states. In general terms, state changes in one of the actual tasks are required to be made visible to the corresponding virtual task, and vice-versa, as discussed in more detail below.

Figure 4:
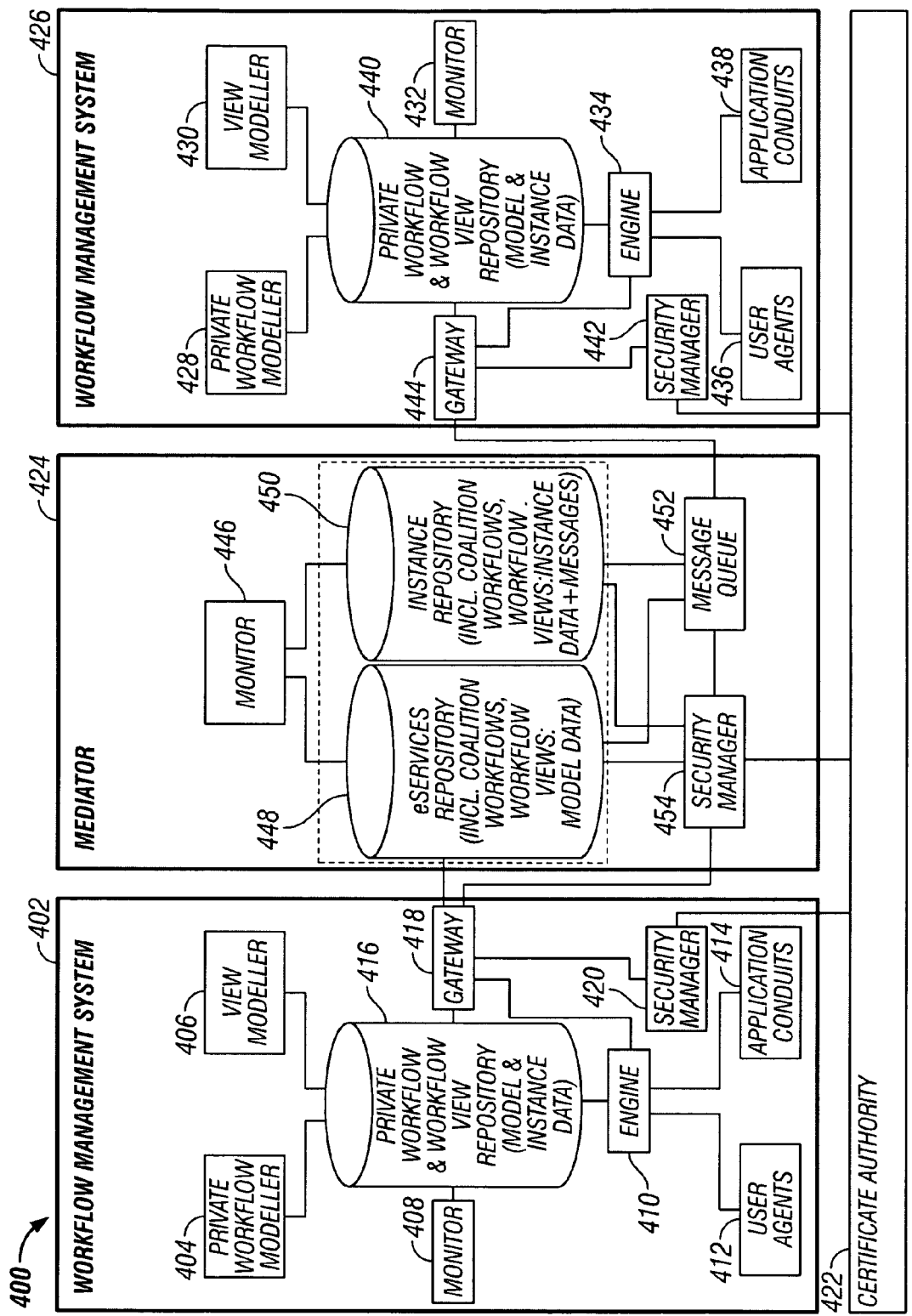
FIG. 4 is a diagram of an architecture for implementing a three-tier workflow model.

FIG. 4 is a diagram of a computer architecture 400 for implementing a three-tier workflow model. In FIG. 4, a first workflow management computer system 402 includes a variety of elements (e.g., a computer-readable medium tangibly encoded with a computer program including instructions that, when executed, operate to cause one or more computer processors to perform operations, or one or more computer processors and a computer-readable medium coupled to the one or more computers and having instructions tangibly stored thereon which, when executed by the one or more computer processors, cause the one or more computer processors to perform operations) designed to perform at least the following tasks:

implementation of an actual (private) workflow, generation of workflow views (i.e., abstracted or virtual workflows) from the private workflows, and collaboration with an external party such as another workflow management system or workflow mediator to securely implement a coalition workflow.

More specifically, the first workflow management system 402 includes a private workflow modeler 404, which supports the lifecycle of private workflow models implemented by the workflow management system 402, such as workflows 206, 210, 302, and 306 in FIGS. 2 and 3.

A view modeler 406 is utilized to generate and manipulate workflow views that are abstracted or virtual versions of the actual workflows, such as workflow views 208, 212, 304, and 308 in FIGS. 2 and 3. The view modeler 406 may operate automatically, based on available data, and/or through interaction with a user. Specific techniques for implementing the view modeler 406 are discussed below in Sections II and III.

A monitor 408 assists in tracking the execution of private workflows, workflow views, and coalition workflows with respect to one another. Functionality of the monitor 408 is discussed in more detail below.

A workflow engine 410 is operable to actually execute the private workflows modeled by the private workflow modeler 404, and to map workflow view states to private workflow states and/or workflow data, as discussed in more detail below. The workflow engine 410 provides relevant information and allows access to workflow views, such that the views can interact with entities outside of the workflow management system 402 as described below. In other words, the workflow engine 410 executes private workflows internally, and also virtually executes workflow views and ensures the appropriate interdependencies between the two types of workflows.

A user agent 412 is a human user's interface to the workflow system 402. The user agent 412 can be, for example, a task list. An application conduit 414 allows the workflow management system 402 to interface with external applications, such as back-office applications like customer relationship management systems, supply chain management, and vending machines, as well as front-office applications, such as a word processor or spreadsheets. Application Conduits 414, generally speaking, extend the reach of workflow management systems to collect and disseminate relevant data.

A private workflow and workflow view repository 416 stores and manages workflow and workflow view models and instances, as well as the relationships between the private workflows/workflow views and models/instances of models.

A gateway 418 provides a company's process interface to the outside world. It redirects all ingoing and outgoing process requests, serving as a proxy. It hides internal systems from the outer world, and allows the participation of non process-oriented systems in business processes. The gateway 418 also serves as a firewall against unwanted intrusions, and provides transparent routing services to external parties with respect to the workflow management system 402. The gateway 418 may also be used to convert outgoing message objects from a format used by the internal system 402 to a format that can be understood by an external recipient. The gateway 418 can provide a full log of all services that have been invoked on the systems of an organization.

A security manager 420 handles all security-related aspects of communication for the workflow management system 402. It decrypts incoming messages, and verifies the sender's identity in cooperation with a Certificate Authority 422, using a security technique such as Public Key Infrastructure ("PKI"). In the case of implementing PKI, the security manager 420 may also encrypt outgoing messages with the recipient's public key.

In FIG. 4, a mediator 424 interacts with the first workflow management system 402 and a second workflow management system 426 to implement a coalition workflow. However, as discussed above with respect to FIGS. 2 and 3, and discussed in more detail below, the workflow management system 402 and 426 may also interact directly, in a peer-to-peer environment. In the second workflow management system 426, it should be understood that the elements associated therewith, i.e., a private workflow modeler 428, a view modeler 430, a monitor 432, an engine 434, a user agent 436, an application conduit(s) 438, a private workflow and workflow view repository 440, a security manager 442, and a gateway 444 all provide functionality corresponding to their similarly-named elements within the first workflow management system 402.

In the mediator 424, a monitor 446 is available for interacting with the monitor 408 and the monitor 432. It should be understood that an availability of monitoring functionality for a particular workflow layer within the three-tier model is determined by the availability of information from the relevant workflow engine. Thus, a workflow monitor (such as monitor 446) that belongs to a coalition will be able to track workflows on the public (coalition) and workflow view layer, whilst a workflow monitor (such as monitor 408 or 432) inside a partner company will, in addition, track the company's respective private workflows and their state transitions.

An eServices Repository 448 is an entity of the mediator 424. It is a catalogue of available eServices and their particular characteristics that are available to the mediator. Generally speaking, eServices are services that can be provided to customers by providers who specialize in those particular services. Such eService are discussed in more detail below, and are particularly useful in the architecture of FIG. 4, in which a particular service may be repetitively required by one or more companies within the coalition workflow.

An instance repository 450 persistently stores information about a current state of execution of coalition workflows. This functionality allows monitoring and exception handling; for example, when one of the communication partners has not received a message and the message needs to be re-sent.

In a mediated environment such as that of FIG. 4, the workflow monitor 446 will be able to query state information about other workflow view instances from the instance repository 450. In a non-mediated environment, in contrast, the workflow monitor 446 is required to collect workflow view instance data from the partners' workflow management systems in order to represent the state of coalition workflow instance.

A message queue 452 can be considered to be a mailbox that acts in close cooperation with the instance repository 450. Specifically, it stores messages for communication partners, thereby supporting offline scenarios.

Finally with respect to the mediator 446, a security manager 454 interacts with the security managers 420 and 442, and the certificate authority 422, to ensure secure communications between the mediator 424 and the workflow management systems 402 and 426.

The architecture 400 of FIG. 4 does not reference or require a particular communication protocol or technology. It may be advantageous, however, to utilize a protocol that is sufficiently expressive to allow for the modelling of messages that result in creation of workflow instances from existing workflow models, and support interaction of workflow instances during their lifecycles. These requirements are being supported by, for example, a workflow Extensible Mark-up Language ("XML") specification developed by the Workflow Management Coalition ("WFMC") and described in the WFMC Technical Report WFMC-TC-1023, "Workflow standard-interoperability-wf-xml binding version 1.1," 2001.

Exemplary techniques for utilizing the architecture 400 of FIG. 4 involve the partners in a coalition agreeing on a particular goal to achieve for modeling in a coalition workflow. Partners may choose those tasks of the coalition workflow that they want to implement by their private systems 402 and 426. Each partner will apply a method such as the method of reduction, discussed in Section III, to the coalition workflow, in order to understand the required relationships of the partner's tasks in the context of the coalition.

Each partner may then either develop new private workflows, using the method of specialization (discussed in Section II), or re-use existing workflows and connect them with their workflow views through generalization (also discussed in Section II). Once each partner has built their respective workflow views, they may apply the method of expansion (discussed in Section III) on the basis of the coalition workflow definition, in order to add the required synchronizing tasks (e.g., AND-splits and ANDjoins) to their workflow views. These modifications are then propagated back to the view's definition in the private workflow & workflow view repository 416 and 440.

The instantiation of a collaborative workflow may be triggered by either an external event to a workflow view or by the request of one of the partners to their private workflow management system 402, 426. Through the execution, state dependencies between workflow view and corresponding private workflow are updated when changes to states occur, as discussed in more detail below with respect to FIGS. 5-7. Eventually, one private engine, such as engine 410, will start executing a private workflow. Once communication with a partner is required, the gateway 418 will request the security manager 420 to encrypt the message and send it off to the recipient. In a mediated environment such as in FIG. 4, the mediator 424 will decrypt the message with the mediator's private key, encrypt it with the recipient's public key, store it and put it in the message queue 452, and inform the appropriate participant about the new message.

Once the recipient has pulled the message from the message queue 452, the recipient decrypts the message with their own private key and sends the message to the engine 434. The engine 434 takes appropriate action by, for example, starting a new private workflow, or forwarding the message to an already running instance.

The communication partners should be able to identify already-instantiated workflow views in a target workflow management system. For example, a token may be passed along the communication chain that identifies the instance and the type of a coalition workflow. The involved workflow management systems 402, 426 are thus able to instantiate their private workflow objects, and assign them to workflow view objects that participate in the coalition workflow. The coalition workflow instance identifier is assigned to these objects.

Thus, the architecture 400 for implementing the three-tiered workflow model of FIGS. 1-3 provides for flexible, robust and secure interactions between the coalition partners. Workflow views are exposed as interaction points, which can be used to form a collaborative workflow. The inter-enterprise coordination thus builds on a distributed business process model where every partner manages their own part of the overall business process.

Returning to FIGS. 2 and 3, the discussion below describes techniques for joining workflow views into a collaboration workflow using "control flow dependencies," and for joining private workflows to workflow views using "state dependencies." In the following discussion, it is assumed that the private workflows 302 and 306 should remain private and confidential, and remain unchanged.

A control flow dependency, generally speaking, expresses how two or more workflows can interact, through the introduction of synchronizing tasks and/or dependencies. In this approach, a closed-state of a preceding task is connected to an open-state of the following tasks. Route tasks, such as joins and splits, coordinate the control flows of the involved workflows to ensure order preservation of the overall workflow that results from the interaction of the individual workflows.

For example, an "AND-split" task splits a process flow into two flows, where each of the flows must be performed before they can be rejoined at an "AND-join" task. Similarly, an exclusive "OR-split" task splits a process flow into two flows, where only one of the flows must be performed before the flows are rejoined at an exclusive "OR-join" task and allows to proceed.

Control flow dependencies provide a loose coupling between workflows, because they merely pass on a state and workflow-relevant data from one workflow to another once it closes. FIG. 2 provides examples of control flow dependencies, specifically, tasks 220 and 228 can be considered to be "splitting tasks" (i.e., AND splits) while tasks 230 and 258 can be considered to be "joining tasks" (i.e., AND joins). These tasks, as shown in FIG. 2, augment the workflow view tasks 218, 232, 256, 222, 246, and 260.

State dependencies, in contrast to control flow dependencies, provide a very tight coupling between tasks. For example, state dependencies between a workflow view and its associated workflow tasks assure that the workflow view always accurately represents the state of its corresponding private workflow tasks, and that any valid messages that are sent to the workflow view by a third entity are forwarded to the appropriate task in the corresponding private workflow.

Figure 5:
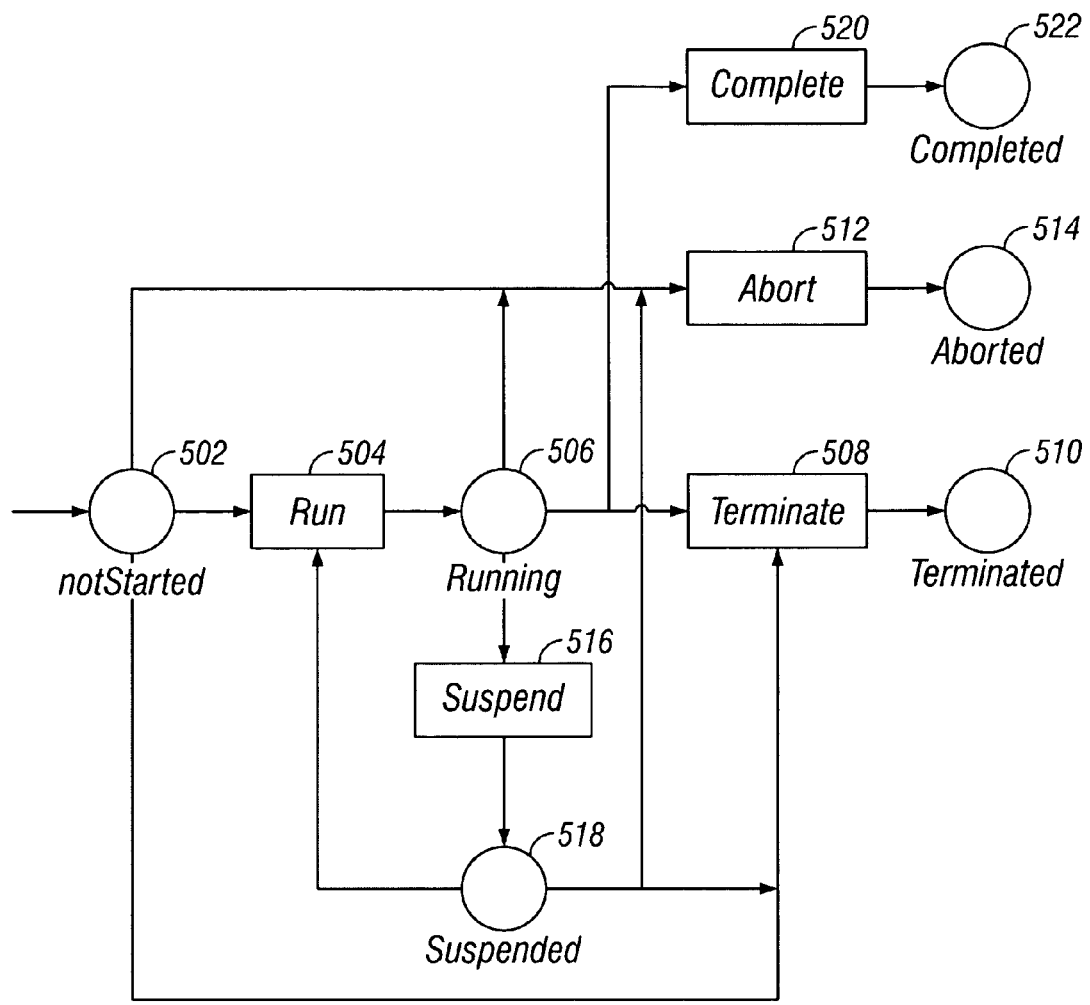
FIG. 5 is a Petri-Net representation of state and event information related to a workflow task.

FIG. 5 is a Petri-Net representation of state and event information related to a workflow task. In FIG. 5, a circle represents state, while a square represents an event.

In FIG. 5, there is shown an open.notRunning.notStarted ("not_started") state 502, indicating that the task has been created, but was not started yet. This state may lead to a run event (command) 504, which in turn may lead to an open.running ("running") state 506, in which the task is executing.

The not_started state 502 may also lead to a terminate event 508, in which a user commands termination of enactment of the task, which leads to closed.terminated ("terminated") state 510, in which enactment of the task is actually terminated. Somewhat similarly, The not_started state 502 may also lead to an abort event 512, in which an application is aborted, which leads to closed.aborted ("aborted") state 514, in which enactment of the task is actually aborted.

The running state 506 may lead to a suspend event 516, which leads to a state of temporary suspension of execution referred to as open.notRunning.suspended ("suspended") 518. The running state 506 may also lead to a completion event ("complete") 520, which in turn leads to a completed state 522.

In FIG. 5, every state of a task belongs to one of the following groups: (1) open: the task is being enacted, where the state "open" has subgroups (1a) running: the task is being executed, and (1b) notRunning: the task is temporarily not executing, and the state "notRunning" has the further subgroups (1bI) notStarted: the task has not been started yet, and (1bII) suspended: the task is temporarily not being executed; and (2) closed: enactment of the task has been finished, where the state "closed" has the subgroups (2a) aborted: enactment of the task has been aborted by a user, (2b) completed: enactment of the task has completed normally, and (2c) terminated: the task has been aborted by the system.

In the following discussion, the function "change-state" ("cs") is a function of a task t, and requests t to change from its current state $s_0$ into a new state $s_1$, denoted as: $cs(s_1)t$. The state transition from $s_0$ to $s_1$ is denoted as $s_0 \rightarrow s_1$.

Considering FIG. 3, the workflow K 302 includes the first task k1 310 and the second task k2 312. The workflow view (virtual or abstracted workflow) L 304 has corresponding task 330. In the discussion below, tasks k 310, 312 within workflow K 302 generically represent private workflow tasks within a private workflow, and task l1 330 generically represents workflow view tasks within a workflow view.

Thus, when task l1 requests $cs(s_1)k1$, task k1 310 performs the following assessment. First, task k1 310 determines whether the state transition $s_0 \rightarrow s_1$ is valid, i.e. whether it is reflected by the adjacent state transition model (as depicted in FIG. 5) of task k1 310. If so, then task k1 310 determines whether all operational resources are available; i.e., whether all required private dependencies are active (or, in the case where task k1 310 is the first task in workflow K 302, whether the local workflow engine 410, 434 is ready to instantiate workflow K 302). If so, task k1 310 performs the state transition $s_0 \rightarrow s_1$. In this case, $s_1$ is now the state of task k1 310.

Similarly, task l1 330 performs the following assessment upon receiving from task k1 310 a request for $cs(s_1)l1$. First, task l1 330 determines whether the state transition $s_0 \rightarrow s_1$ is valid. If so, task l1 330 determines whether all operational resources are available; i.e., whether all required virtual dependencies are active (unless task l1 330 is the first task in workflow view L 304). If so, task l1 330 performs the state transition $s_0 \rightarrow s_1$, so that $s_1$ becomes the state of l1.

One approach to performing state mapping is to map between states of task(s) to the state of the corresponding virtual task, and vice versa, as shown in Table 1:

TABLE 1

| Virtual Task | Tasks |
| --- | --- |
| open.running | one open.running AND none (closed.aborted OR closed.terminated) |
| one.notRunning | one open.notRunning AND none closed |
| open.notRunning.notStarted | first task open.notRunning.notStarted |
| open.notRunning.suspended | one open.notRunning. suspended AND none (open.running OR closed.aborted OR closed.terminated) |
| closed.aborted | one closed.aborted |
| closed.terminated | one closed.terminated |
| closed.completed | last task and all others that have been instantiated have been closed.completed |

However, such an approach may be unable to capture all the semantics of a workflow. For example, there may be a situation in which two tasks are being executed in parallel (e.g., task k4 316 and task 318 k5 in FIG. 3 if task k3 314 was AND-split and task k8 324 was an AND-join), and one of them aborts (i.e., enters the state closed.aborted 514). In this case, aborting one task does not mean that its corresponding virtual task must abort as well. This is in contradiction to when a virtual task receives a request to enter into a particular state, particularly open.notRunning.suspended, closed.aborted, or closed.terminated. In these cases, all corresponding private task instances have to enter the respective states of: open.notRunning.suspended, closed.aborted, and closed.terminated, according to the individual state transition model.

Therefore, another approach to state mapping is to explicitly and individually model relationships between virtual and private task states, while also providing a default in the case of absence of an explicit correlation as suggested in Table 1. This approach adds a layer of flexibility and practicality for dealing with real-world workflows, and allows accurate messaging between a private task and its workflow view task, including when the message(s) originate from an external party (i.e., a member of the coalition).

Figure 6:
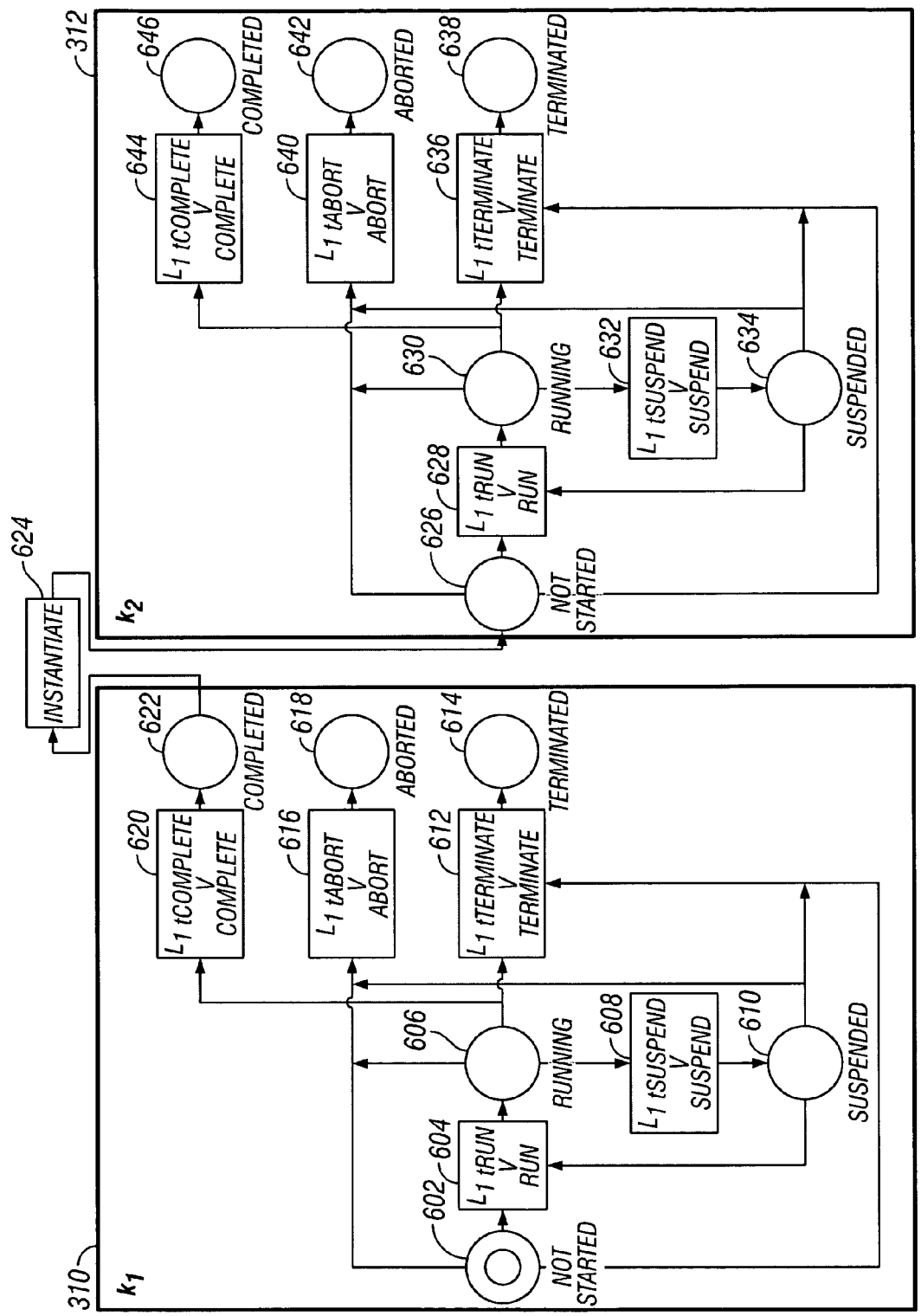
FIG. 6 is a Petri-Net representation illustrating state and event information for two successive tasks in a workflow, relative to their workflow view task.

FIG. 6 is a Petri-Net representation illustrating state and event information for two successive tasks in a workflow, relative to their workflow view task. The workflow might be, for example, the workflow K 302 in FIG. 3, and the tasks might be task k1 310 and task k2 312. The workflow view (virtual or abstracted) task would then be task l1 330 within workflow view L 304.

Figure 7:
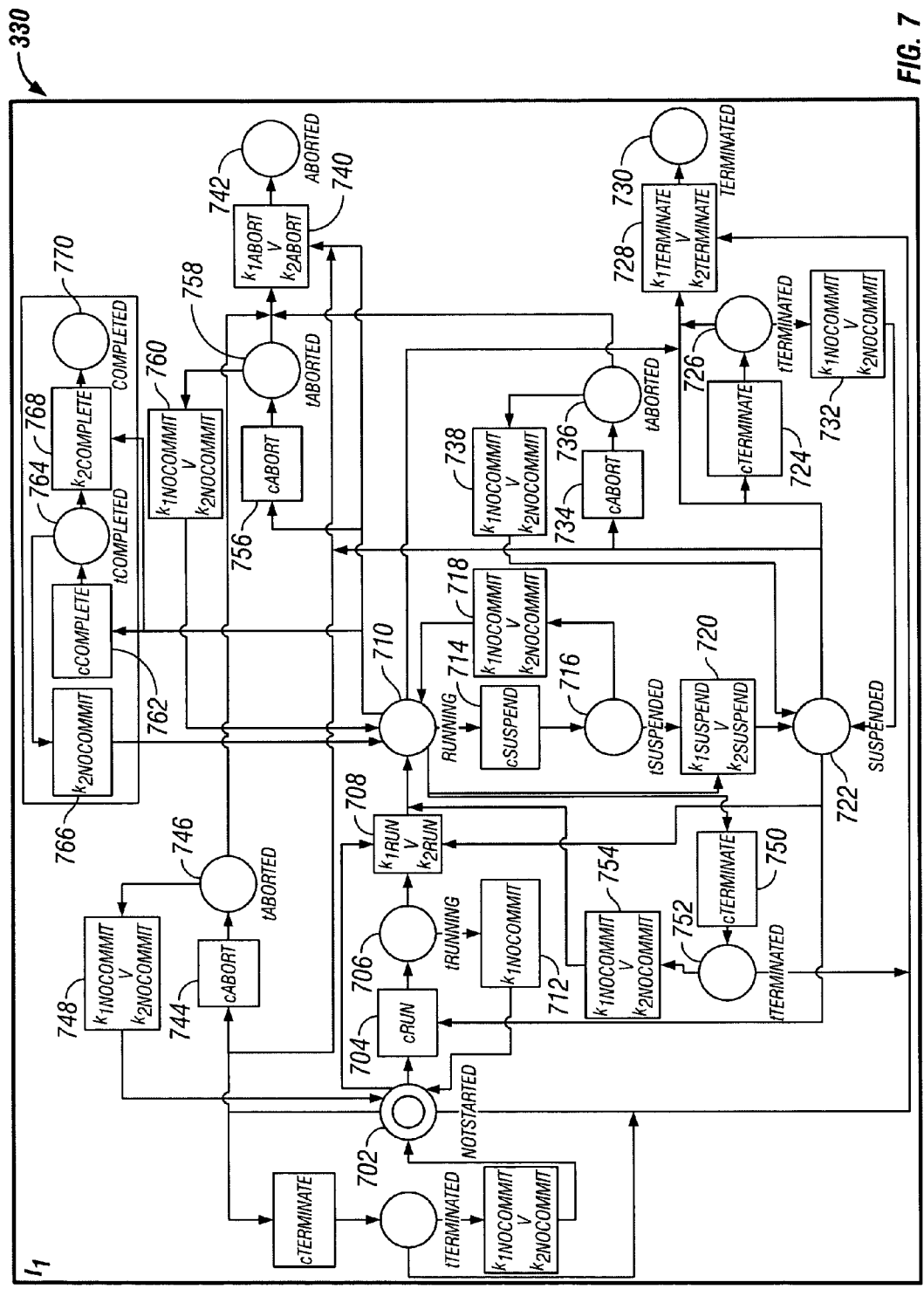
FIG. 7 is a Petri-Net representation illustrating state and event information for a workflow view task in a workflow view, relative to its private tasks.

FIG. 7 is a Petri-Net representation illustrating state and event information for a workflow view task in a workflow view, relative to its private tasks. For example, the workflow view task might be task l1 330, and the private tasks might be task k1 310 and task k2 312.

Generally speaking, as described above, state dependencies express that individual tasks in workflow K 302 and workflow view L 304 should not change their state(s), unless such a state change satisfies rules that describe how states in the two workflows relate.

In FIG. 6, when task k1 310 or task k2 312 enters a state, it notifies task l1 330, and vice versa. Also, each state in workflow view L 304 has a corresponding "tentative state," denoted in FIGS. 6 and 7 as "tstate," such as, for example, "task l1 tRun." These tentative states allow task l1 330 to revert to the original state in which it was before it received an event, in case task k1 310 and/or task k2 312 are unable to execute a particular state change request.

In FIGS. 6 and 7, it is assumed that task k1 310 and task l1 330 are initially in a state not_Started 602 and 702, respectively. Also, messages that originate from task l1 330 are prefixed with "l1" when referred to in task k1 310 and task k2 312, whereas messages that originate from task k1 310 or task k2 312 are prefixed with "k1" or "k2," respectively. Events originating from the coalition are prefixed with "c," e.g., "cRun," while events without any prefix originate from the entity where they are used.

In FIG. 7, task l1 330 receives an event cRun 704 from the coalition, and enters a tentative state tRunning 706. Task l1 330 then passes on an event $l_{1\,tRun}$ 604 to task k1 310, and task k1 310 then enters a state running 606, and sends an event $k_{1\,run}$ 708 to task l1 330. Task l1 330 then enters a state running 710. If task k1 310 sends a noCommit event 712 instead, indicating that it was not able to perform the request, then task l1 330 returns to its original not_Started state 702.

If the workflow K 302 is instantiated without coalition request by its own workflow engine 410, then the following exchange of events takes place. First, task k1 310 enters the state running 606 using a request to its workflow engine 410, and sends the event $k_{1\,run}$ 708 to task l1 330. Task l1 330 then enters the state running 710.

A remainder of states and events in FIGS. 6 and 7 mirror the discussion of FIG. 5 above, in the context of task k1 310, task k2 312, and task l1 330. For example, while running, task k1 310 might receive a suspend command 608 from task l1 330, and enter into a suspended state 610. This state might lead to a terminate message 612 from task l1 330, and thereby a terminated state 614, or to an abort message 616, and thereby to an aborted state 618. Of course, the not_Started state 602 could also lead to either the terminated state 614 or the aborted state 618, as well.

The running state 606 might also lead to a complete event 620, which in turn leads to the completed state 622. In this case, task k1 310 is instantiated as complete in event 624, and task k2 312 enters into an open_not_Started state 626. Task k2 312 proceeds as just described with respect to task k1 310, with a run event 628, a running state 630, a suspend event 632 and a suspended state 634, a terminate event 636 and a terminated state 638, an abort event 640 and an aborted state 642, and a complete event 644 and a completed state 646.

In FIG. 7, the running state 710 may lead to a cSuspend event 714 (i.e., a suspend command from the coalition), which leads to a tSuspended state 716. The tSuspended state may lead to a "no commit" event 718 from either task k1 310 or task k2 312, which would return task l1 330 to the running state 710. The tSuspended state 716 might also lead to a suspend command 720 (which could also stem directly from the running state 710) for task k1 310 or task k2 312, which would lead task l1 330 into a suspended state 722.

The suspended state 722 might lead to a cTerminate event 724, and thereby to a tTerminated state 726. The tTerminated state 726 leads to either an actual termination event 728 from task k1 310 or task k2 312, and thereby to a terminated state 730, or to a "no commit" event 732 from task k1 310 or task k2 312, and thereby back to the suspended state 722.

The suspended state 722 may also lead to a cAbort event 734, and thereby to a tAborted state 736, which in turn leads to either a "no commit" event 738 (and thereby back to the suspended state 722) or to an actual abort event 740 for task k1 310 or task k2 312, with an associated aborted state 742. The suspended state 722 might also lead to a cAbort event 744 and following tAborted state 746, which leads either back to the abort event 740 or to a "no commit" event 748 with respect to task k1 310 or task k2 312 (which in turn leads back to the not_Started state 702. Finally with respect to the suspended state 722, it may also lead back to the cRun event 704.

The running state 710 also leads to a cTerminate event 750, and then to a tTerminated state 752, which leads to either a "no commit" event 754 (and then back to the running state 710) or to a k1 310 or a k2 312 terminate event 728 that leads to the terminate state 730. The running state 710 also leads to a cAbort event 756, which results in a tAborted state 758. The tAborted state 758 either leads further to the abort event 740, or to a "no commit" event 760 (and thereby back to the running state 710).

Finally with respect to FIG. 7, the running state 710 may lead to a cComplete event 762, which in turn leads to a tCompleted state 764. The tCompleted state 764 leads to either a "no commit" event 766 from task k2 312 (and thereby back to the running state 710), or to a complete event 768 (which may also follow directly from the running state 710, without requiring a message from the coalition), and thus to a final completed state 770.

Although task k1 310 and task k2 312 execute in series in FIGS. 6 and 7, a general structure of the Petri-Net of task l1 330 (i.e., FIG. 7) would remain unchanged in the situation where task k1 310 and task k2 312 in parallel. However, the events from the private tasks would be correlated differently. For example, task l1 330 could only complete if both of tasks k1 310 and k2 312 completed.

As discussed above, control flow dependencies may be advantageously used to connect workflow view tasks from multiple entities into a single, collaborative workflow. Control flow dependencies allow for a way to connect a closed state of one task to an open state of the next task, in a flexible and autonomous way. In contrast, state dependencies may be more suited to connect a particular workflow view task to its underlying actual workflow task(s), since state dependencies provide for accurate and timely interchanges between tasks and workflow view tasks regarding their respective state changes.

In performing the various messaging functionalities between the parties involved in a collaborative workflow, content-based messaging may be used, in which messages are routed on the basis of their content. Additionally, dedicated communications channels can be used for messaging. Messaging may be made persistent by the use of elements such as the message queue 452 in FIG. 4, or similar elements, which need not necessarily be implemented in the context of a mediator.

Messages may have various dependencies on (i.e., correlations with) one another, derived from the content of messages or from meta-information external to the message itself, such as the timeframe in which messages have been created or received. There may also be ordering dependencies between messages. These ordering dependencies may express that message 1 must be processed before message 2. For example, an "order confirmation" has to be processed before the shipment notification can be processed. There may also be causal dependencies between messages. A change order depends on its corresponding order. Messages can be invalidated. Subsequent change order messages invalidate previous change order messages and other causal dependent messages, such as the original order or the shipment notification. Such correlation information may be derived from private workflow(s), and be made visible in a work-flow view. Once workflow views are combined into coalition workflows, it can be validated that correlation requirements in the coalition workflow can be satisfied. In this case, "correlators" may be used in place of, or in addition to, the "AND-join" tasks discussed in detail herein. In this case, workflow data flow on an instance level should be considered, along with issues related to data formatting and semantic understanding of data that is to be correlated.

Figure 8:
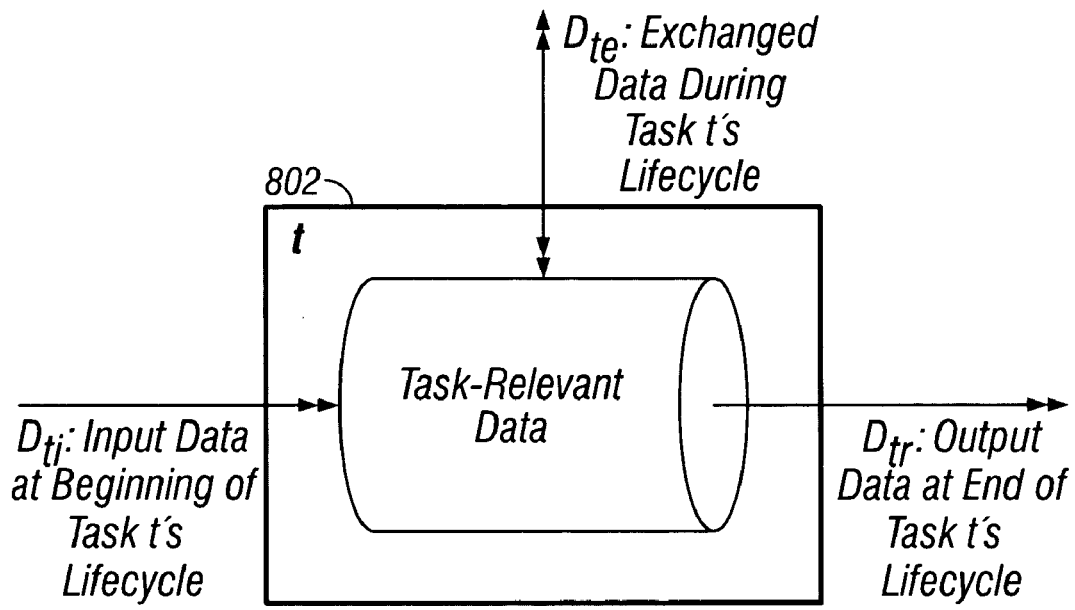
FIG. 8 is a block diagram of a task illustrating the task inputs and outputs types of relevant data.

FIG. 8 is a block diagram of a task illustrating the task inputs and outputs types of relevant data. In FIG. 8, a task t 802 manipulates data, where the data reflects real-world information about implementation of the task. For the task t 802, Dti represents input data of task t 802 that task t 802 requires to enter the state running, i.e. to commence operations. Dte represents data that task t 802 exchanges while it is in a state open.running, i.e., while task t 802 is operating to achieve its business objective(s), and Dtr represents output data of task t 802 to some other task when it enters the state closed, i.e., when t ends its operation. The union of task-relevant data from all tasks of a workflow form workflow-relevant data.

The term "union of data," for example in a database context, generally refers to a combination of results of two or more queries into a single result set consisting of all the rows belonging to all queries in the union. The union of data concept can be usefully applied in the present context as well.

For example, in FIG. 3, considering task k1 310 and task k2 312 in relation to task l1 330, input data of task l1 330 is a subset of, or equal to, the input data of task k1 310, and output data of task l1 330 is a subset of, or equal to, the output data of task k2 312. Thus, exchange data of task l1 330 is a subset of, or equal to, the union of exchange data of task k1 310 or task k2 312. More generically, exchange data of any abstracted task "l" will be a subset of, or equal to, the union of exchange data of tasks "k" associated with the abstracted task.

In the context of collaborative workflows as described above with respect to FIGS. 1-7, the union of exchange data of tasks "k" should be modeled with consciousness of the fact that once a view task "l" is a view task of many tasks "k" that require interaction with the coalition, coalition partners would not be aware in which order they have to exchange data with task "l." Thus, there should be a maximum of one task "k" within a workflow K such as workflow K 302 that requires data exchange with the coalition through view task "l." Of course, tasks "k" would still be capable of exchanging data within their own organisation, assuming workflow K is a private workflow in which details are all known to its owning entity.

Also in the context of collaborative workflows as described above with respect to FIGS. 1-7, interchanges between workflows can be achieved by at least the following two techniques: (1) a commonly-adopted process definition language (meta-model), or (2) commonly-agreed interfaces/message formats. The latter is a partial solution, as it enables invocation semantics (interaction at the business process execution level), while the former allows full interoperability because it enables business processes to interact at the level of any modelling element—as if it were a single organizational business process.

Common process definitions or a common meta-model would require adoption of a common process definition language by workflow vendors, and would allow true interoperability of business processes supported by different workflow engines. However, this goal may not always be easily achievable.

On the other hand, process interoperability standards at an interface layer are more widely and easily supported by industry and workflow vendors. Generally speaking, communication-interoperability between workflow management systems can be realized by, for example, direct interaction of workflow management systems via a set of standardized functions, message-passing between the systems, use of shared data stores (e.g. commonly accessible repositories) by the systems, or bridging of systems using gateways to connect different protocols and formats (as discussed in more detail with respect to gateways 418 and 444 in FIG. 4). These four approaches to communication-interoperability are not necessarily exclusive of one another.

In a mediated environment such as that just described, there is one central participant that is able to route information to the communication partners, which do not have to know each other. Prior knowledge about the mediator is sufficient. All or some communication is routed through the mediator, which decouples the sender and receiver of information and sets the number of individual communication paths at 2n, where n is the number of participants.

In contrast, in a peer-to-peer (P2P) environment, all communication partners directly know about each other. They may still be using Internet services, such as the eServices repository 448 or the certificate authority 422. However, all communications are direct between the communication partners. This requires that all the participants agree on a method of interaction. Also, the number of individual communication paths between participants is higher than in a mediated environment, and equal to (n2−n).

Mediation has at least two facets: (1) stateless, in which the mediator passes messages from sender to receiver, and (2) stateful mediation, which may be either passive or active. Stateful mediation allows the matching of request and respond messages, and assignment of the messages to the right participant, particularly in scenarios where the participants do not want to know about each other.

In passive stateful mediation, the characteristics of stateless mediation are included, along with the ability to log the interaction(s) in a persistent storage, thereby facilitating monitoring and error handling. In active stateful mediation, the aspects of passive stateful mediation are included, along with an ability to actively drive the partners' interaction by executing a coalition workflow and invoking the communication partner's IT systems to perform their work.

It is possible for a central workflow engine to mediate the interaction of the partners' workflow systems. In this case, the coalition workflow is physically instantiated, which provides the advantage of facilitating monitoring. Specifically, the coalition workflow reflects the states of the involved workflow views, which reflect the states of their corresponding private workflows. A monitoring tool can directly display the coalition's workflow status information, and there is no need to collect monitoring data from the involved work-flow views.

A stateful mediation also may be achieved through stateless mediation plus a set of supporting services, such as a central monitoring service, as opposed to a central workflow engine. In this case, there is no real need for a central state machine to run a coalition workflow, because there are already the individual state machines that execute their respective private workflows.

In a mixed approach, stateless and stateful mediation services are used where required by the communication partners. In such cases, mediation is used for monitoring, persistence of messages and for offline-support, while other information is exchanged directly been the communication partners.

The remainder of Section I is devoted to a discussion of eServices, such as those implemented in the eService repository 448 in FIG. 4. Generally speaking, as referred to above, eServices are abstractions of business tasks and entire business processes and describe their capabilities and requirements. Therefore, eServices (also known as Web Services) may be well-suited to assist in hiding enterprise-internal systems details from the outside world, while preserving or enabling the systems' capabilities to participate in inter-organizational business processes.

Figure 9:
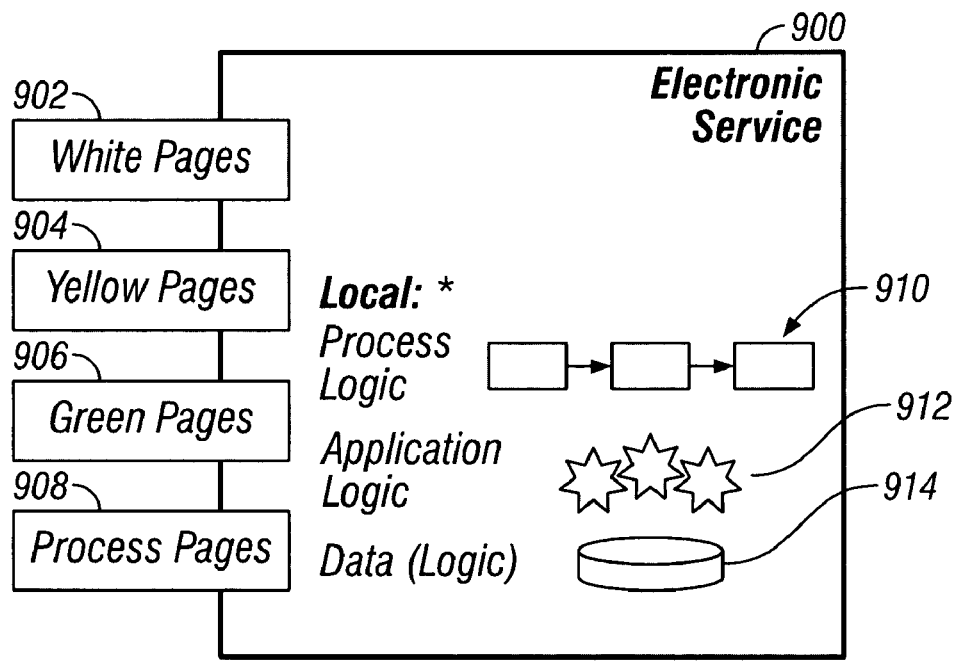
FIG. 9 is a block diagram of an eService.

FIG. 9 is a block diagram of an eService 900. In FIG. 9, eService 900 is an entity that provides information on itself through white pages 902, its owning entity through yellow pages 904, its technical requirements, such as invocation parameters and protocols through green pages 906, and a description of how to perform complex business transactions step-by-step through process pages 908. Also in eService 900, local information including process logic 910, application logic 912, and data in a database 914 allow the eService to implement its services for consumers.

The following discussion describes relevant metadata required to express eServices, without regard to their provided service and their industrial domain. An eService specification generally allows for human- and machine readability of eServices information.

White pages 902 provide the specifics about an eService in terms of which purpose it serves, based on standard taxonomies. The white pages 902 may include, for example, a human-readable name and description of the eService (with industry-specific terminology), an identifier of the eService, availability information about the eService, and price/payment information about the eService.

Yellow pages 904 provide general information about a provider of eSservices. They generally include, for example, the name and address of the business, and a contact person within the business.

Green pages 906 provide information about the specifics of technical interaction with an eService. This information might include, for example, interaction information (e.g., contact information), and an input/output ("I/O") description.

Process pages 908 assist in describing interaction behavior (including technical information) of the eServices, and are thus related in function to the green pages 906. More specifically, simple eServices are instantiated with a set of input attributes, and (at the end of their instance life cycle) deliver an output set of attributes. Complex services are able to interact as, for example, a workflow is able to communicate with its outside world to require further input data or to deliver intermediate results. To be able to correctly integrate an eService, it is therefore necessary to describe both the needed interactions and an order in which the interactions are required, and process pages 908 assist in this functionality.

In describing relevant metadata required to express eServices, various entity-types and attributes may be included in a cross-organizational workflow meta-model. Such a model is sufficient for querying, monitoring and verifying global and local processes, and serves as a blueprint for their evolution and maintenance. The meta-model identifies a common set of attributes that are required for cross-organisational workflows to interact efficiently in cooperation with the above white pages 902, yellow pages 904, and green pages 906.

A first entity in the meta-model, and the most general, is the coalition. The coalition may represent, for example, a virtual enterprise, extended enterprise, or virtual organization. It is formed by a number of members that have agreed to cooperate for a particular period of time towards a common goal. A default method of interactions may be used to describe the technical interaction(s) preferred in the coalition, while security rights describe the partners' rights to add, modify, view, and delete workflows. Table 2 provides information about the coalition entity.

TABLE 2

Coalition

| Attribute | Description |
| --- | --- |
| List of Members | Members that form the coalition |
| Validity | The time of the coalition's existence, expressed as start and end date and time |
| Default Method of Interaction | Technical interaction preferred in the coalition. Can be overwritten by the workflow or activity |
| Security Rights | Rights to add, modify, delete, and view workflows |

Workflow is an entity that represents private partner workflows, workflow views and coalition workflows, thus providing a protocol to interact with tasks within these various workflows. Table 3 characterizes information about the workflow entity.

TABLE 3

Workflow

| Attribute | Description |
| --- | --- |
| Type | {Partner, View, Coalition} |
| Relationship to other workflow entities | Is view of partner workflow/Is element of coalition workflow |
| Process start and termination conditions | Conditions under which workflow starts and closes |
| Security, audit, control data | Permission to start/interact with a workflow |
| Specification language | Required to interpret the flows, decisions, etc. resolving the semantic integration issues. |
| Coalitions | Back-reference to the coalitions that this workflow belongs to |
| Owner | Owner of the workflow |
| Supporting WfMS | WfMSs that are able to execute this workflow. Dependencies: specification language, underlying organizational model, available resources |
| Location | Location of the Engine: geographical data. |
| Activities | List of activities |
| Default Method of Interaction | Technical interaction preferred in the coalition. Can be overwritten by the workflow or activity |
| Transition Conditions | Transitions between the workflows activities and subworkflows |

An activity entity type represents the tasks in a workflow. Besides activity I/O data for an activity, communication requirements, i.e. the messages to be interchanged with the environment during execution time, should also be considered. It should be noted that, even though an activity may be atomic, the underlying implementation may require executing several steps to perform the activity. Table 4 characterizes information about the activity entity.

TABLE 4

Activity

| Attribute | Description |
| --- | --- |
| Type | subflow, atomic flow, etc. |
| Pre- and post-conditions | Conditions for activity to commence/finish |
| Other scheduling constraints | Such as temporal dependencies |
| Performing Wf-Engine | All engines that are involved in executing this workflow. Required for distributed workflows. |
| Activity share-ability | (exportable, private/internal only) |
| Activity input data | Data required by activity at the start of its lifecycle |
| Activity output data | Data produced by activity at the end of its lifecycle |
| Activity communication | Emitted and consumed messages with the outside world during the activity's lifecycle. Required to realize more complex protocol interactions. |
| Ownership | Ownership of the activity |
| Default Method of Interaction | Technical interaction preferred in the activity. Usually identical to the workflow's default method of interaction. Can be overwritten if activity is performed by external application, or a human |
| Role | The role that performs the activity |

A transition condition describes the paths among workflows and activities. The information about them is useful in forming workflow views. With the introduction of the coalition entity above, there can be "coalition-transitions" connecting publicly visible work-flows/activities and internal-transitions within the private workflow of the organizations. If there is the need to expose an internal-transition to the coalition because it is part of a coalition-wide JOIN/SPLIT-condition, then this may be made visible by setting a transition share-ability attribute. Table 5 characterizes information about transition conditions.

TABLE 5

Transition Conditions

| Attribute | Description |
| --- | --- |
| Flow condition | Edge been information source and information sink |
| Transition share-ability | Exportable/private/internal only |

The implementation entity describes an implementation of an activity. A separation between activity entity type and implementation entity type is particularly sensible when coalition participants dynamically implement activities, such as in an eMarketplace, where the cross-organisational workflow should stay unchanged, but the binding to a particular implementation should be modified. Table 6 characterizes information about the implementation entity.

TABLE 6

Implementation

| Attribute | Description |
| --- | --- |
| Execution parameters | Parameters required to execute the implementation |
| Location or access path | Execution semantics |
| Workflow | The workflow that implements this implementation |
| Activity | The activity that implements this implementation |

A workflow relevant data entity is used by the workflow itself, and influences the transitions between the views. There is no clean separation between application data and workflow relevant data, as the results of the application operation influence the workflow's transitions. A role is the entity in the model that describes the performer of an activity. It reflects an entity in an organization and provides information how to possibly contact the role implementer.

When a service consumer requests an eService from a service provider, the service consumer generally specifies required attributes and their values, and launches a query in an eService repository. The query delivers back to the service consumer a set of services that match the query, and the service consumer then refines the query and selects one or more services.

The services are then bound to the service consumer's business task. When there is a strong requirement on an availability of the eService, then a set of similar eServices would be tentatively bound to a business task as well, so that, at runtime, one of them could be selected according to its availability. The business task of the service consumer can be atomic, or can be part of a business process that can be represented by a workflow.

At this point, the eServices are invoked, and data is sent from the service consumer to the service provider. Interaction may then occur with the services, and data is interchanged between the consumer and the provider. Once the eServices report their completion, the provider sends required data to the consumer. In this interaction model, a provider may invoke further eServices from another provider, thus becoming a service consumer.

In the description above, steps can be carried through prior to the start of the service consumer's business process (early binding), or during its execution (late binding of eServices). The binding of an eService to a corresponding business task of the service consumer may be done manually or automatically.

Section II

Section I above discusses described implementations of cross-organizational, collaborative workflows, in which private workflows, each associated with an individual organization, are represented as abstracted "workflow views." The workflow views are joined together with their respective workflows using state dependencies, and are joined within the collaborative workflows, using control flow dependencies.

In constructing workflow views from workflows (and vice versa), it would be advantageous to have techniques for doing so in a manner which maintains the state dependencies just referred to, and which does not allow for any inconsistencies between an operation of the workflow view and its underlying workflow. For example, in a case where two parallel tasks in a workflow must both be completed for the workflow to proceed, it would be inconsistent to have the tasks associated with, respectively, two workflow view tasks in series with one another. Such a situation might result in the case where one of the parallel workflow tasks finishes before the other, thereby authorizing a completion of the first workflow view task and a corresponding starting of the second workflow view task, even though the second actual task is not yet finished (indeed, may not even be started).

Similarly, it would be advantageous to have techniques for quickly, easily, and reliably adding the control flow dependencies between and among the workflow view tasks within the collaborative workflows.

Figure 10:
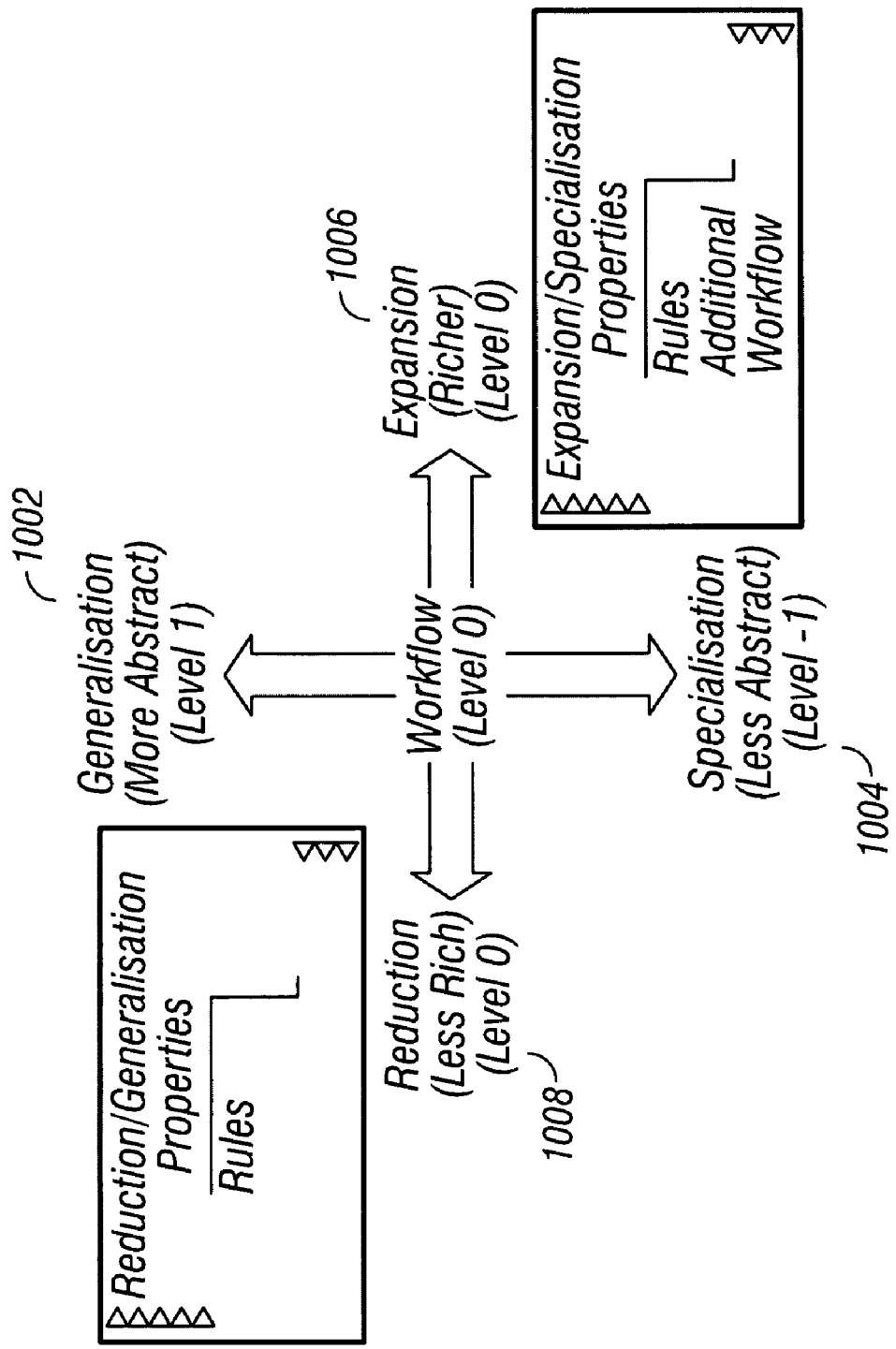
FIG. 10 is a diagram illustrating operations for modifying one or more workflows.

FIG. 10 is a diagram illustrating operations for modifying one or more workflows. In FIG. 10, a first operation 1002 is generalization, in which a workflow is made more abstract (e.g., when a workflow is converted into a workflow view). A second operation 1004, which is the inverse of generalization, is specialization, in which a workflow is made less abstract, or more specific (e.g., when a workflow view is converted into a workflow).

A third operation 1006 is expansion, in which a workflow is joined with another workflow by an addition of, for example, control flow dependencies including routing and synchronizing tasks. Finally, a fourth operation 1008 is reduction, which is the inverse of expansion and which removes or reduces a collaborative workflow of some type into two or more individual-workflows. Expansion and reduction are discussed in more detail in Section III.

The following discussion of Section II thus describes techniques for transforming an abstraction level of a workflow, i.e., making it more or less abstract, while maintaining state dependencies between the original workflow and the transformed workflow. These techniques may be used in the collaborative workflows discussed above in Section I, but may also be used on their own. For example, a company may want to maintain privacy of its workflow by generating an associated workflow view, even if that workflow view is not necessarily going to be used in a collaborative workflow.

In discussing these and related concepts, the following terminology is used. Workflow W is considered to be a set of tasks t having dependencies d between the tasks, where T is a nonempty set of tasks within the workflow and D is a nonempty set of dependencies between tasks in t. A task t represents the work to be done to achieve some given objectives within a workflow, and can represent both automated and manual tasks. Tasks are performed by assigned processing entities.

Tasks are further classified into three types: activity (A), sub-workflow (SW), and route (R). An activity is atomic and is an implementation of a task. A sub-workflow is a composite task that is a placeholder for another workflow. A route task permits the expression of dependency conditions, and includes the AND-split (AS), AND join (AJ), XOR-split (XS), and XOR-join (XJ), the functions of which are discussed in more detail below.

A dependency d defines the execution dependency between two objects in a workflow model. By connecting tasks through dependencies, the dependencies may represent the edges of an adjacent digraph, while tasks represent vertices. More specifically, a directed graph or digraph D, is a finite, nonempty set $V(D)=\{v1, v2, \ldots vn\}$ of vertices and a possibly empty set E(D) of ordered pairs of distinct vertices. The elements of $E(D)=\{e1, e2, \ldots em\}$ are called arcs. The underlying graph of a digraph D is that Graph G obtained from D by replacing all arcs (u, v) or (v, u) by the edge uv. The number of vertices in a digraph D is called its order, which is denoted as p=order(D) and the number of arcs in D is its size, denoted as q=size(D). A digraph of order p and size q is called a (p,q) digraph. If (u, v) is an arc of D, then u is said to be adjacent to v and v is adjacent from u. Further, the arc (u, v) is incident from u and incident to v. The outdegree od(v) of a vertex v in a digraph D is the number of vertices adjacent from v and the indegree id(v) of v is the number of vertices adjacent to v. The degree deg(v) of a vertex v in D is defined by deg(v)=od(v)+id(v).

If D is a digraph of order p and size q, with $V(D)=\{v1, v2, \ldots, vp\}$. Then $$\sum_{i=1}^{p} od(v_i) = \sum_{i=1}^{p} id(v_i) = q \qquad \text{Eq. (1)}$$

A walk in D is an alternating sequence W: $v0, e_1, v_1, e_2, v_2, \ldots, v_{n-1}, e_n, v_n$ ($n \geq 0$) of vertices and arcs beginning and ending with a vertex such that $e_i=(v_{i-1}, v_i)$ for each i with $1 \leq i \leq n$. The walk W is a v0-vn walk of length n. A trail is a walk in which no edge is repeated and a path is a walk in which no vertex is repeated. Thus, a path is a trail, but not every trail is a path.

Two vertices u and v in D are connected if D contains a u-v walk. For a vertex v of D, its neighborhood N(v) (or NG(v)) is defined by:

$$N(v)=\{u \in V(D) | (v,u) \in E(D) \vee (u,v) \in E(D)\} \qquad \text{Eq. (2)}$$

The adjacency matrix $D_{p \times p}=[d_{ij}]$ of a (p,q) digraph D is the (p, p) matrix defined by:

$$d_{i,j} = \begin{cases} 1, & \text{if } (v_i, v_j) \in E(D) \\ 0, & \text{otherwise} \end{cases} \qquad \text{Eq. (3)}$$

The number of components in a digraph is denoted as k(D). In a connected graph, k(D)=1. A structure S is a subset of a digraph D. It is: $V(S) \subseteq V(D)$ and $E(S) \subseteq E(D)$. An exchange of elements in a matrix D is represented with:

$$d_{i,j} \Leftrightarrow d_{k,l} | i,j,k,l \in N^+ \wedge 1 \leq i,j,k,l \leq d \qquad \text{Eq. (4)}$$

Figure 11:
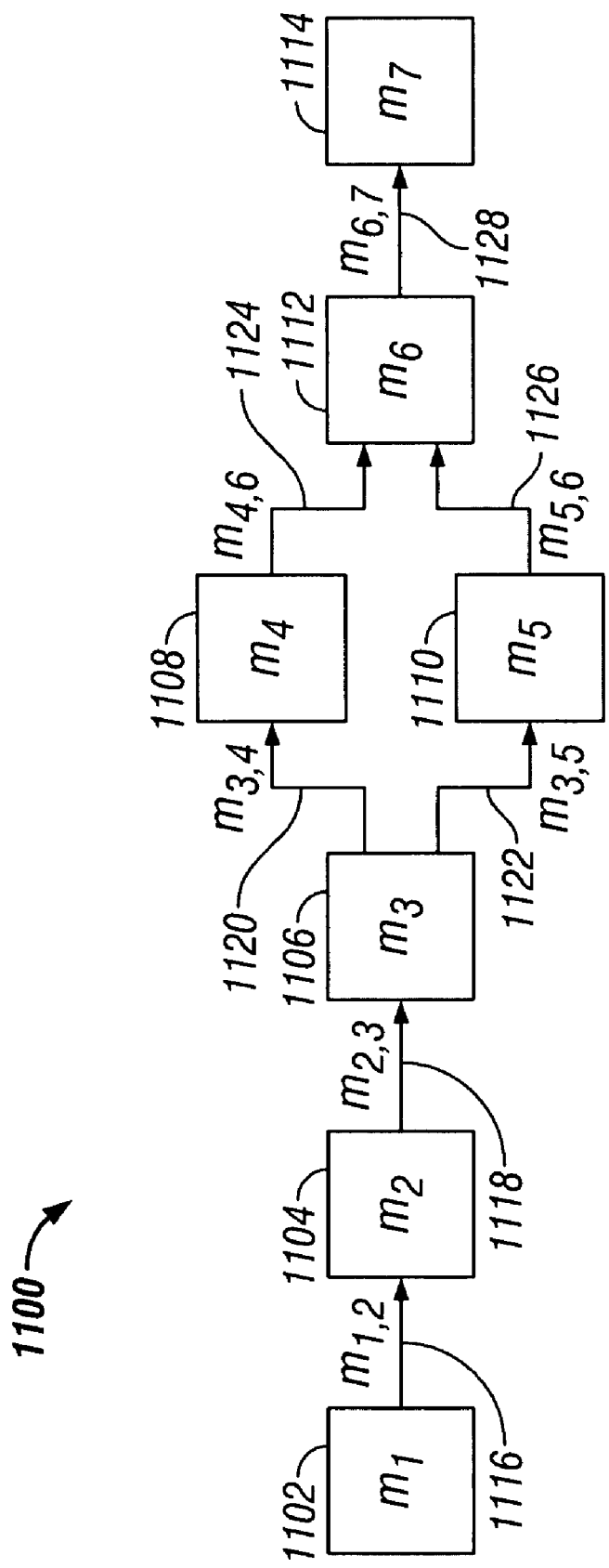
FIG. 11 is a digraph representing a workflow.

FIG. 11 shows a digraph 1100. In FIG. 11, there is a task m1 1102, a task m2 1104, a task m3 1106, a task m4 1108, a task m5 1110, a task m6 1112, and a task m7 1114. Pairs of the tasks are joined by dependences, including a dependency m1,2 1116 joining task m1 1102 to task m2 1104, a dependency m2,3 1118 joining task m2 1104 to task m3 1106, a dependency m3,4 1120 joining task m3 1106 to task m4 1108, a dependency m3,5 1122 joining task m3 1106 to task m5 1110, a dependency m4,6 1124 joining task m4 1108 to task m6 1112, a dependency m5,6 joining task m5 1110 to task m6 1112, and a dependency m6,7 1128 joining task m6 1112 to task m7 1114.

Using the techniques and notations described above, the digraph 1100 can be represented as an adjacency matrix, as shown in Eq. (5):

$$M = \begin{bmatrix} 0 & 1 & 0 & 0 & 0 & 0 & 0 \\ 0 & 0 & 1 & 0 & 0 & 0 & 0 \\ 0 & 0 & 0 & 1 & 1 & 0 & 0 \\ 0 & 0 & 0 & 0 & 0 & 1 & 0 \\ 0 & 0 & 0 & 0 & 0 & 1 & 0 \\ 0 & 0 & 0 & 0 & 0 & 0 & 1 \\ 0 & 0 & 0 & 0 & 0 & 0 & 0 \end{bmatrix} \qquad \text{Eq. (5)}$$

As should be understood from the above, the matrix M represents the digraph 1100 in that dependency m1,2 1116 is represented as the "1" in the first row, second column of matrix M. Similarly, dependency m2,3 1118 is represented as the "1" in the second row, third column of matrix M. The third row of matrix M has two "1s," the first, in the third column, representing dependency m3,4 1120, and the second, in the fourth column, representing dependency m3,5 1122. Similar comments apply to dependencies m4,6 1124, m5,6 1126, and m6,7 1128.

A workflow M is well-defined if it satisfies the conditions of workflow, task, and dependency, as defined above, if it includes at least one task, has only one input task and one output task, is connected, and has no task that links to itself. In this case, workflow M can be expressed as in Eq. (6):

$$[M]_{psp} x \begin{bmatrix} m_1 \\ m_2 \\ \vdots \\ m_p \end{bmatrix} \leftarrow \begin{bmatrix} m_1 \\ m_2 \\ \vdots \\ m_p \end{bmatrix}, \text{ where} \quad \text{Eq. (6)}$$

$$m_1, m_2, \ldots m_p \in V(M) \text{ and } p = \text{order } (M)$$

From Eq. (6), the operator ← is referred to herein as "precedes," or "the precedes operator," while x represents a standard matrix multiplication.

In graph terms, the precedes-operator is implies that there is a path from a vertex that is represented by an element in the matrix situated on the right hand side of the operator $$\begin{bmatrix} m_1 \\ m_2 \\ \vdots \\ m_p \end{bmatrix}, \text{ to}$$

a vertex that is represented in the matrix situated on the left hand side of the operator $$\begin{bmatrix} m_1 \\ m_2 \\ \vdots \\ m_p \end{bmatrix}.$$

In FIG. 11, if task m3 1106 is of type AS (AND-split), and task m6 1112 is of type AJ (AND-join), then digraph (workflow) 1100 can be represented as shown in Eq. (7):

$$\begin{bmatrix} 0 & 1 & 0 & 0 & 0 & 0 & 0 \\ 0 & 0 & 1 & 0 & 0 & 0 & 0 \\ 0 & 0 & 0 & 1 & 1 & 0 & 0 \\ 0 & 0 & 0 & 0 & 0 & 1 & 0 \\ 0 & 0 & 0 & 0 & 0 & 1 & 0 \\ 0 & 0 & 0 & 0 & 0 & 0 & 1 \\ 0 & 0 & 0 & 0 & 0 & 0 & 0 \end{bmatrix} x \begin{bmatrix} m_{1A} \\ m_{2A} \\ m_{3AS} \\ m_{4A} \\ m_{5A} \\ m_{6AJ} \\ m_{7A} \end{bmatrix} \leftarrow \begin{bmatrix} m_{1A} \\ m_{2A} \\ m_{3AS} \\ m_{4A} \\ m_{5A} \\ m_{6AJ} \\ m_{7A} \end{bmatrix} \quad \text{Eq. (7)}$$

By carrying through the matrix multiplication, the following set of precedes relationships is obtained, expressed in Eq. (8):

$$m2A \leftarrow m1A \quad \text{Eq. (8)}$$
$$m3AS \leftarrow m2A$$
$$m4A + m5A \leftarrow m3AS$$
$$m6AJ \leftarrow m4A$$
$$m6AJ \leftarrow m5A$$
$$m7A \leftarrow m6AJ$$

The expressions having the same left hand side m6AJ can be combined, and the '+' operator may be interpreted as a conjunction. Its operation is defined by the task-type on the right hand side of the equation. In the above cases of m4A+m5A←m3AS, the '+' operator expresses that m3AS precedes m4A AND m5A. In the second case of m6AJ←m4A and m6AJ←m5A, m4A AND m5A precede m6AJ. This allows simplification of Eq. (8) to Eq. (9):

$$m2A \leftarrow m1A \quad \text{Eq. (9)}$$
$$m3AS \leftarrow m2A$$
$$m4A + m5A \leftarrow m3AS$$
$$m6AJ \leftarrow m4A + m5A$$
$$m7A \leftarrow m6AJ$$

Expressions including XOR-splits and XOR-joins can be treated analogously. For example, in the expression m4A+m5A←m3XS, the '+' operator would be interpreted that m3XS precedes either m4A or m5A. In m6XJ←m4A+m5A, either m4A or m5A precedes m6XJ.

Returning to FIG. 10, the operation 1002 of generalization and the operation 1004 of specialization can be described in terms of the above terminology. For example, generalization, as referred to above, serves to make a workflow more generic (or abstract). This process can be though of as one in which one or more vertices in a workflow are represented by a single vertex in a workflow view. In contrast, specialization makes a workflow more specific, so that at least one vertex in a workflow view is represented by one or more vertices of a workflow.

The following additional terminology is used in the below discussion: g(K) is the generalisation of a workflow K, and s(K) is the specialisation of workflow K. As discussed below, for each specialization of K there exists a generalisation such that g(s(K))=K, and vice versa, s(g(K))=K. In FIG. 3, for example, workflow view L 304 is one possible generalization of workflow K 302, while workflow K 302 is one possible specialization of workflow L 304. In FIG. 3, the relationships between abstract tasks including task l1 330, task l2 332, or task l3 334 to their corresponding specialized tasks in workflow K 302 are represented by curved connectors.

Figure 12:
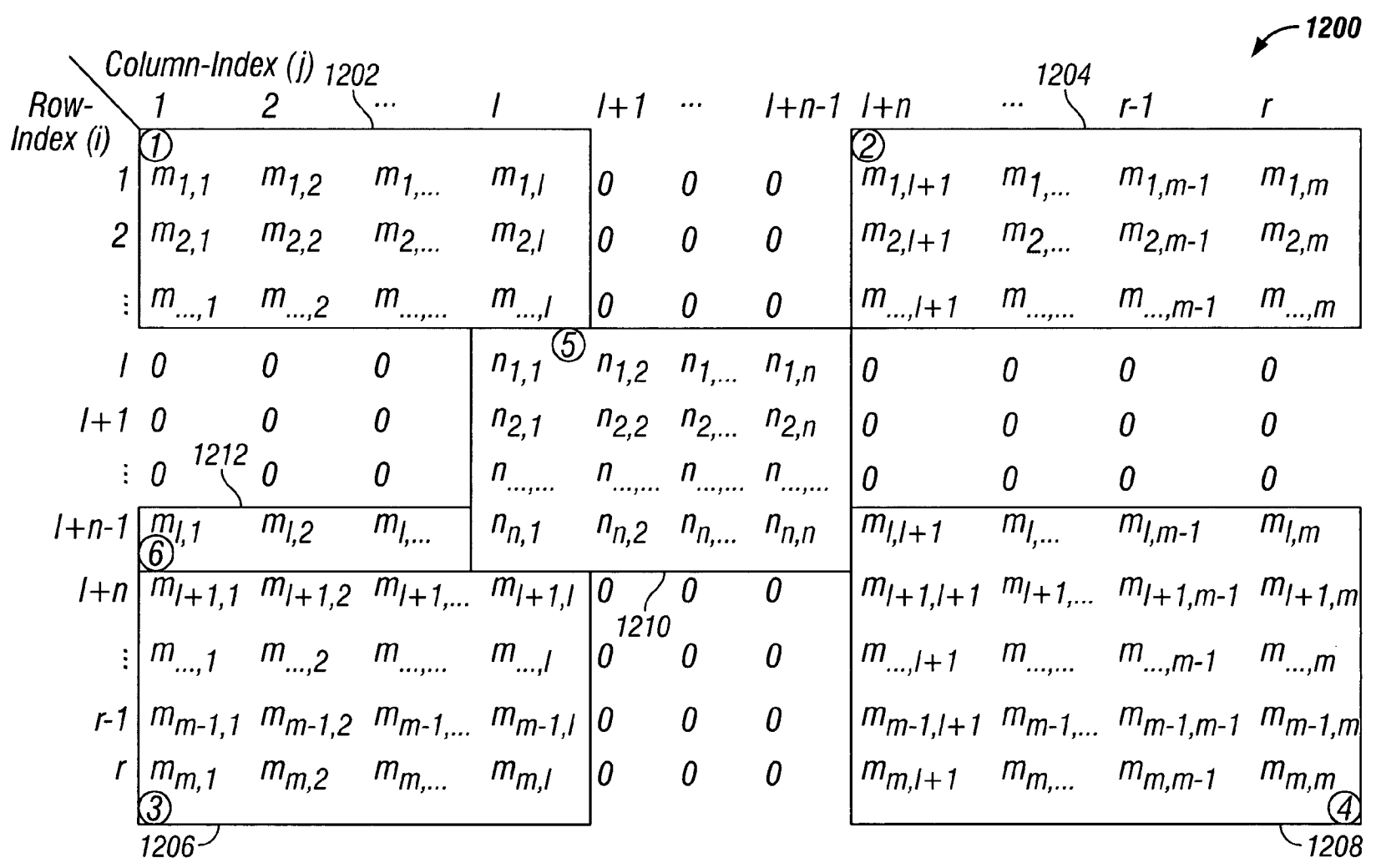

FIG. 12 is an illustration of a specialization operator 1200. More specifically, FIG. 12 illustrates the 1-specialization of M, an (m,m) matrix, and N, an (n,n) matrix, where the 1-specialization is written as Ms(l)N=R, where R is a matrix of size (r, r) with r=m−1+n, such that the $m_1$ column of M and the $m_1$ row of M is replaced with n1, n2, . . . , nn rows and columns of N. The elements of R=Ms(l)N are defined such that i is a row index and j is a column index of R, and i, j∈N+, where N+ is the set of natural positive numbers. Then the elements of R, $r_{ij}$, are defined by Eq. 10:

Eq. (10)

$$r_{i,j} = m_{i,j} \mid (0 < i < 1) \wedge (0 < j < 1) \quad (1)$$
$$m_{i,j,n+1} \mid (0 < i < 1) \wedge (1 + n \leq j \leq r) \quad (2)$$
$$m_{i+1,n,j} \mid (1 + n \leq i \leq r) \wedge (0 < j \leq 1) \quad (3)$$
$$m_{i+1-n,j,n+1} \mid (1 + n \cdot 1 \leq i \leq r) \wedge (1 + n \leq j \leq r) \quad (4)$$
$$n_{i-l+1,j,l+1} \mid (1 \leq i < n+1) \wedge (1 \leq j < n+1) \quad (5)$$
$$m_{l,j} \mid (i = 1 + n \cdot 1) \wedge (1 \leq j \leq 1 \cdot 1) \quad (6)$$
$$0 \mid \text{all other } i, j \quad (7)$$

In Eq. 10, the individual portions labeled (1)-(7) are referred to hereafter as expressions, for example, expression (1) or expression (2).

In FIG. 12, expression (1) is a matrix portion 1202, expression (2) is a matrix portion 1204, expression (3) is a matrix portion 1206, expression (4) is a matrix portion 1208, expression (5) is a matrix portion 1210, expression (6) is a matrix portion 1212, and expression (7) is represented by remaining portions of the specialization operator 1200 being set to the value "0."

Functionally, expressions (1), (2), (3), and (4) serve to copy the matrix M into the matrix R. Expression (5) enters the matrix N as a whole into the matrix R. Expression (6) connects remaining vertices $m_i$, that were adjacent from $m_1$, to $n_{i,1}$.

Thus, the specialization operator 1200 serves to link (i.e., insert the curved lines indicating dependencies, as in FIG. 3) one or more workflow tasks within a workflow view represented by matrix M (analogous to workflow view L 304 in FIG. 3) with one or more tasks within matrix N (analogous to workflow K 302 in FIG. 3). As will be shown in more detail below, such linking, when performed improperly, can lead to inconsistencies between a workflow view and its corresponding workflow, which in turn may lead to failed state dependencies and/or miscommunication between an entity implementing the workflow and other members of a coalition.

FIG. 13 is a matrix 1300 illustrating an algorithm for computing specialization. The algorithm is consistent with Eq. (11), defining an intermediate matrix R*, of size (r*, r*) with r*=m+n, and assuming that i, j∈N+, so that Eq. (11) is:

Eq. (11)

$$r^*_{i,j} = m_{i,j} \mid (0 < i \leq m) \wedge (0 < j \leq m) \quad (1)$$
$$n_{i-m,j-m} \mid (m < i \leq m + n) \wedge (m < j \leq m + n) \quad (2)$$
$$r^*_{i,1} \mid (0 < i \leq m) \wedge (j = m + 1) \quad (3)$$
$$r^*_{1,j} \mid (i = m + 1) \wedge (0 < j \leq m) \quad (4)$$
$$0 \mid \text{all other } i, j \quad (5)$$

In FIG. 13, expression (1) is a matrix portion 1302, expression (2) is a matrix portion 1304, expression (3) is a matrix portion 1306, expression (4) is a matrix portion 1308, and expression (5) is represented by remaining portions of the matrix 1300 being set to the value "0."

Expression (1) and expression (2) serve to expand M by N at row and column number (m+1, m+1). Expression (3) and expression (4) serve to link from M to N appropriately, and expression (5) serves to remove the row 1 and the column 1 from R*. The resulting matrix is P of size (m+n−1, m+n−1).

FIG. 14 is an illustration of a generalization operator 1400. For a matrix M that is a (m,m) matrix, the k,l-generalisation is R=M g(k, l), where Mg(k, l) is a matrix, such that the k, . . . , l columns of M are replaced with a single row and column. The elements of R, wherein R is a (r, r) matrix with r=m+k−l, are defined below in Eq. 12, wherein i is a row index and j is a column index, and i, j∈N+. Then Eq. (12) is:

Eq. (12)

$$r_{i,j} = m_{i,j} \mid (0 < i < k) \wedge (0 < j \leq k) \quad (1)$$
$$m_{i,j-k+1} \mid (0 < i < k) \wedge (k + 1 \leq j \leq r) \quad (2)$$
$$m_{i-k+1,j} \mid (k + 1 \leq i \leq r) \wedge (0 < j \leq k) \quad (3)$$
$$m_{i-k+1,j-k+1} \mid (k \leq i \leq r) \wedge (k + 1 \leq j \leq r) \quad (4)$$
$$0 \mid (i = k) \wedge (j = k) \quad (5)$$
$$m_{1,j} \mid (i = k) \wedge (0 < j \leq k - 1) \quad (6)$$

In FIG. 14, expression (1) is a matrix portion 1402, expression (2) is a matrix portion 1404, expression (3) is a matrix portion 1406, expression (4) is a matrix portion 1408, expression (5) is represented by remaining portions of the generalization operator 1400 being set to the value "0," and expression (6) is a matrix portion 1410.

Functionally, expressions (1) and (3) copy the respective from M into R, and link vertices that were formerly adjacent to $m_{i,k}$ to $r_{i,k}$. Expressions (4) and (6) connect the vertices that were adjacent from m1, j to rk, j. Expression (2) is only concerned with copying mi, j from M into R, and has no influence on the re-linking of the elements in R.

Figure 15:
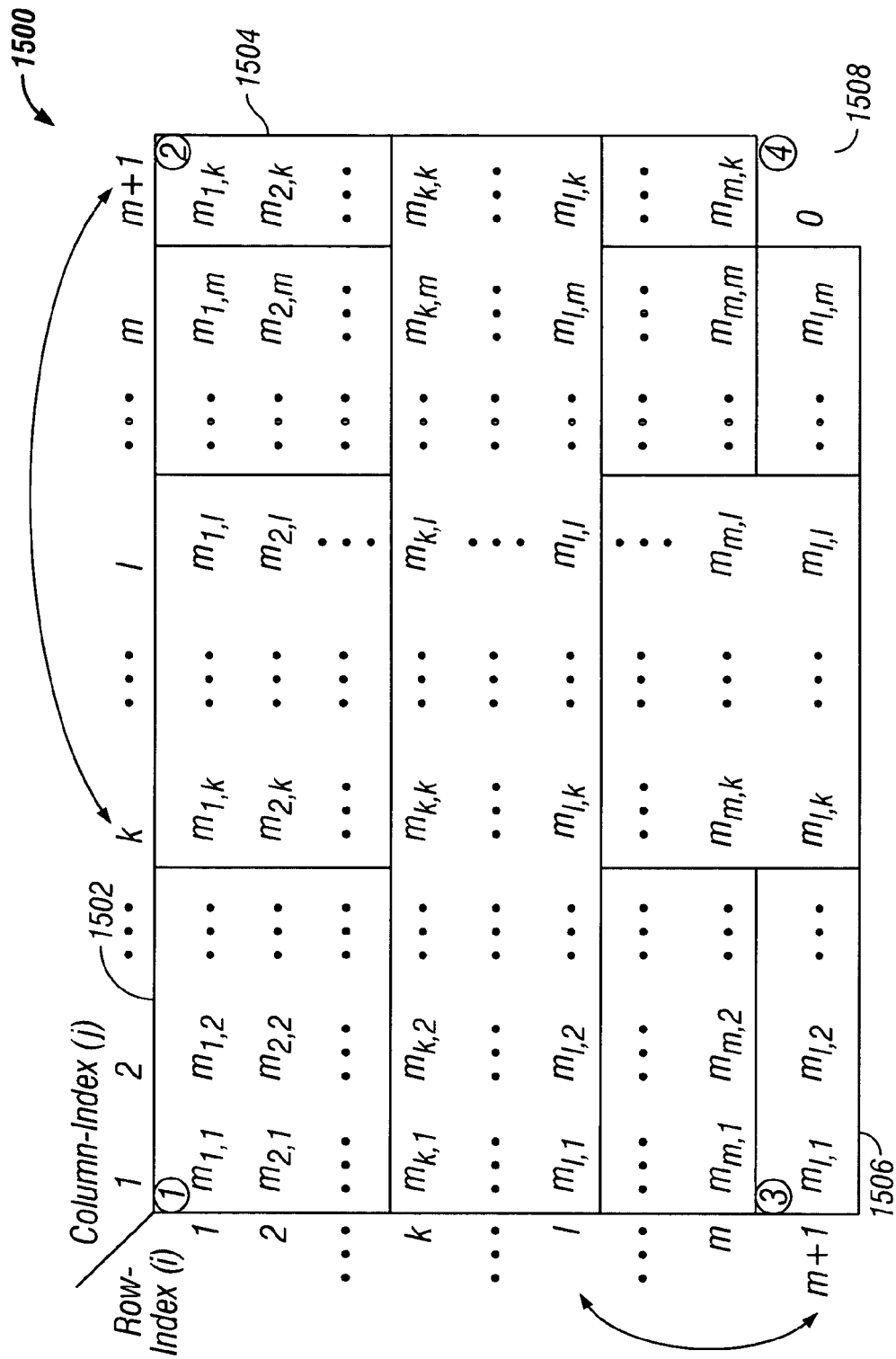
FIG. 15 is a matrix illustrating an algorithm for computing generalization.

FIG. 15 is a matrix 1500 illustrating an algorithm for computing generalization. The algorithm is consistent with Eq. (12), defining an intermediate matrix R*, of size (r*, r*) with r*=m+1, and assuming that i, j∈N+, so that Eq. (13) is:

Eq. (13)

$$r^*i, j = m_{i,j} \mid (0 < i <= m) \wedge (0 < j \leq m) \quad (1)$$
$$m_{i,k} \mid (0 < i \leq m) \wedge (j = m + 1) \quad (2)$$
$$m_{1,j} \mid (i = m + 1) \wedge (0 < j \leq m) \quad (3)$$
$$0 \mid (i = m + 1) \wedge (j = m + 1) \quad (4)$$

In FIG. 15, expression (1) is a matrix portion 1502, expression (2) is a matrix portion 1504, expression (3) is a matrix portion 1506, and expression (4) is represented by remaining portions of the matrix 1500 being set to the value "0."

Analogous to matrix 1300 in FIG. 13, it is possible to expand M by 1 row and 1 column at the index m+1, with expression (2) copying column k to column m+1 and expression (3) copying row 1 to row m+1, and finally removing the rows 1 . . . k and the columns 1 . . . k from R. which represents all computational steps of expressions (1) to (4) in Eq. (13) prior to the removal of appropriate rows and columns in FIG. 15. A final step in the computation is to remove the rows $m_k$ . . . $m_l$ and the columns $m_k$ . . . $m_l$ from R. The resulting matrix is P of size (m+k−l, m+k−l).

As described above, the specialization operator 1200 in FIG. 12 and the generalization operator 1400 in FIG. 14 serve to decrease and increase, respectively, a level of abstraction of a workflow. As pointed out with respect to FIG. 10, these operations are inverses of one another. As discussed below, these inverse operations can be thought of as one combined operation, referred to as "verticalization." Using verticalization, an operator can analyze a workflow and determine all feasible groupings (linkings) of tasks within the workflow to form various workflow views, or, conversely, can examine a workflow view to determine all feasible groupings of tasks into an underlying workflow. Similarly, rather than compute all possible groupings, an operator can select possible groupings only for a particular task (or workflow view task).

In understanding the verticalization operation, it should be understood that the specialization operator 1200 in FIG. 12 replaces one vertex, $v_1$ in a first matrix M with n vertices from a second matrix N. Written above as Ms(1)N, it can thus be written more generically as: Ms(k, l)N with k=1. The generalization operator 1400 in FIG. 14, however, replaces l−k+1 vertices in M with one vertex. To represent a graph of one single vertex in a matrix requires a matrix of size (1,1). Therefore, the generalization operator 1400 could also be denoted as Mg(k,l)N with [N]1×1, i.e., a 1×1 matrix.

Figure 16:
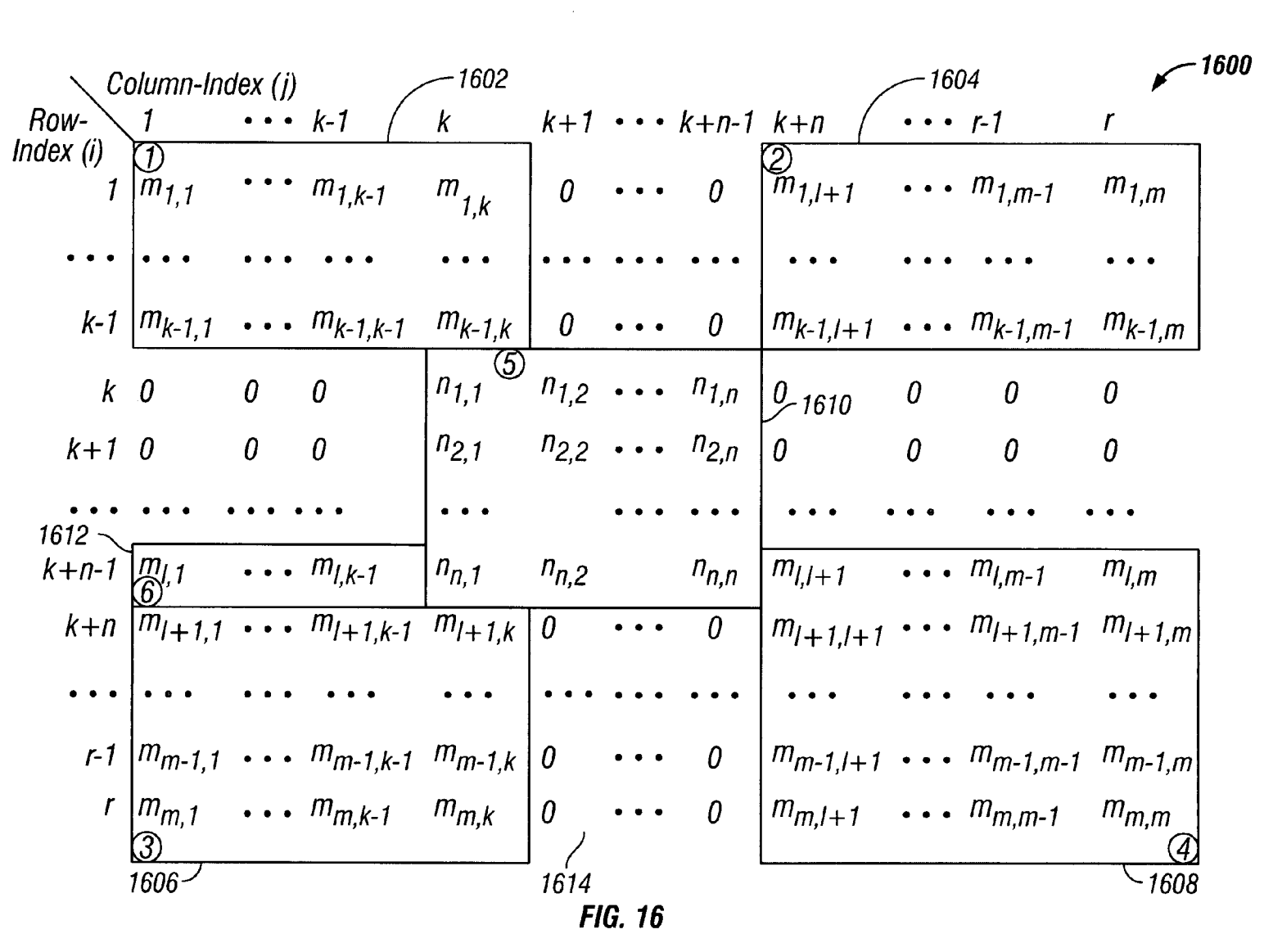

FIG. 16 is an illustration of the verticalization operator 1600. Based one the above similarities between the specialization operator 1200 and the generalization operator 1400, the verticalization operator 1600, or "v," can be written as: Mv(k, l)N. In this case, if k=1 and order(N)>1, then the operator serves to specialize the matrix M, or make M less abstract. For l>k and order(N)=1, the operator serves to generalize M, or make M more abstract.

More formally, if M is an (m,m) matrix, and N is an (n,n) matrix, then the k,l-verticalization of M by N is defined such that Mv(k, l)N is a matrix R of size (m+k−l−1+n, m+k−l−1+n), such that the $m_k, \ldots m_l$ columns of M and the $m_k, \ldots m_l$ rows of M are replaced with n1, n2, ..., $n_n$, rows and columns of N. The elements of R=Mv(k, l)N are defined as follows in Eq. (14):

Eq. (14)

$$r_{i,j} = m_{i,j} \mid (0 < i < k) \wedge (0 < j \leq k) \quad (1)$$

$$m_{i,j+l+1-k-n} \mid (0 < i < k) \wedge (k+n \leq j \leq r) \quad (2)$$

$$m_{i+l+1-k-n,j} \mid (k+n \leq i \leq r) \wedge (0 < j \leq k) \quad (3)$$

$$m_{i+l+1-k-n,j+l+1-k-n} \mid (k+n \cdot 1 \leq i \leq r) \wedge (k+n \leq j \leq r) \quad (4)$$

$$n_{i-k+1,j-k+1} \mid k \leq i < n+k) \wedge (k \leq j < n+k) \quad (5)$$

$$m_{1,j} \mid (i = k+n \cdot 1) \wedge (1 \leq j \leq k \cdot 1) \quad (6)$$

$$0 \mid \text{all other } i, j \quad (7)$$

In FIG. 16, expression (1) is a matrix portion 1602, expression (2) is a matrix portion 1604, expression (3) is a matrix portion 1606, expression (4) is a matrix portion 1608, expression (5) is a matrix portion 1610, expression (6) is a matrix portion 1612, and expression (7) is represented by remaining portions of the verticalization operator 1600 being set to the value "0."

Functionally, expressions (1), (2), (3), and (4) copy M into R. Expression (5) enters N as a whole into R, and expression (6) connects the remaining vertices $m_i$, that were adjacent from $m_1$, to $n_1$.

To derive the specialization operator from v, set k=1. Then, vs can be shown to be equivalent to the specialization operator s, as defined in Eq. (10). Similarly, to derive the generalization operator from v, set n=1 and N=[0]1×1. Then, vg is can be shown to be equivalent to the generalization operator g as defined in Eq. (12).

Returning to FIG. 3, and considering the above description of the verticalization operator 1600, it can be seen that not all sub-groupings of, for example, workflow K 302 are valid results of verticalization. For example, as shown in more detail below, there are only thirteen sub-digraphs (i.e., structures or groupings) in workflow K 302 that are valid to be generalized, and they are (1) {k1, k2} (2) {k1, k2, k3, k4, k5, k6, k7, k8}; (3) {k1, k2, k3, k4, k5, k6, k7, k8, k9}; (4) {k1, k2, k3, k4, k5, k6, k7, k8, k9, k10} (note that this grouping represents all of the tasks of workflow K 302, represented as the grouping "K"; (5) {k2, k3, k4, k5, k6, k7, k8}; (6) {k2, k3, k4, k5, k6, k7, k8, k9}; (7) {k2, k3, k4, k5, k6, k7, k8, k9, k10}; (8) {k3, k4, k5, k6, k7, k8}; (9) {k3, k4, k5, k6, k7, k8, k9}; (10) {k3, k4, k5, k6, k7, k8, k9, k10}; (11) {k4, k6}; (12) {k5, k7}; (13) {k9, k10}; (14)-(23) individual tasks k1-k10 of workflow K 302, which are regarded as trivial structures, where the set of trivial structures of workflow K 302 is denoted, "$T_K$". This operation is denoted as identification of v-structures ("ivs").

Figure 17:
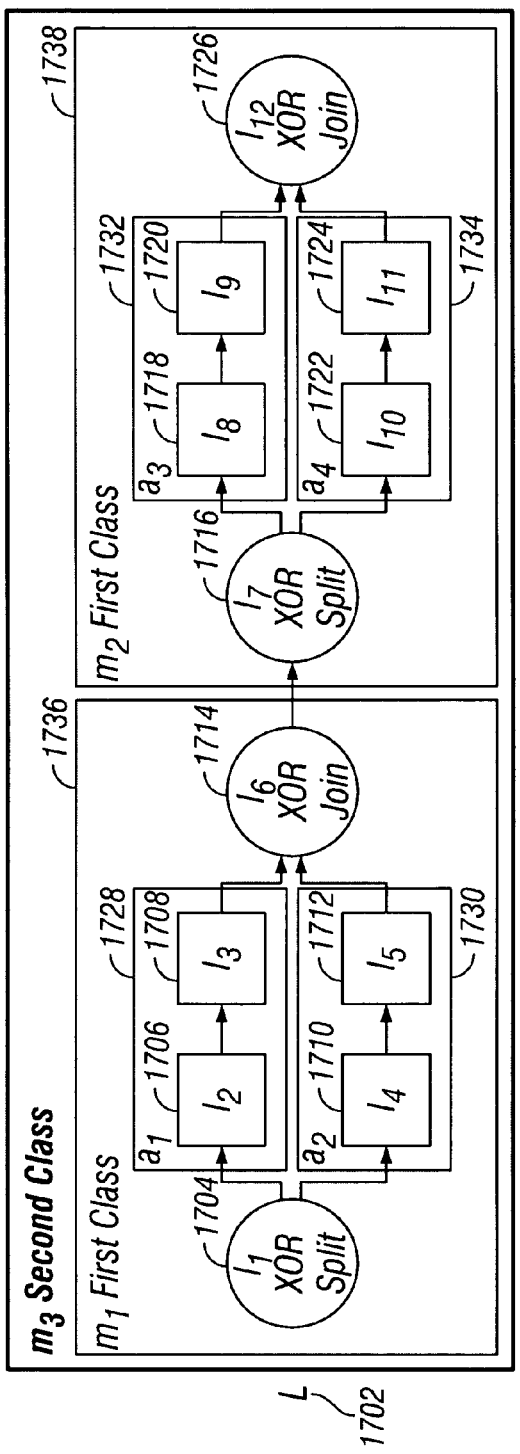
FIG. 17 is a block diagram illustrating a classification scheme for classifying workflow groups.

FIG. 17 is a block diagram illustrating a classification scheme for classifying workflow groups. In FIG. 17, a sample workflow L 1702 includes a first task l1 1704, a second task l2 1706, a third task l3 1708, a fourth task l4 1710, a fifth task l5 1712, a sixth task l6 1714, a seventh task l7 1716, an eighth task l8 1718, a ninth task l9 1720, a tenth task l10 1722, an eleventh task l11 1724, and a twelfth task l12 1726.

In classifying v-structures within a workflow, a structure K is considered to be an "atom" if it consists of at least 2 vertices and ivs(K) results only in $T_K$ and K itself. A structure is considered a "molecule" if it consists of more than two vertices. If a structure is a molecule and ivs(K) results only in atoms and trivial structures, then it is considered as first class molecule; while if ivs(K) results to other molecules, then K is considered to be second class molecule. Thus, in FIG. 17, grouping l2, l3 1728, grouping l4, l5 1730, grouping l8, l9 1732, and grouping l10, l11 1734 are atoms. The grouping 1736 of tasks l1 1704-l6 1714 is a first class molecule, and the grouping 1738 of tasks l7 1716-l12 1726 is also a first class molecule. Finally, the grouping 1740 of all tasks in workflow L 1702 is a second class molecule.

In FIG. 3, the vertices {k3, . . . , k8}, i.e., tasks 314-324 in workflow K 302, are represented by one vertex l2 332 in workflow L 304. This corresponds to grouping (8) in the above listing of verticalizable structures of FIG. 3. The XOR-split (task k3 314) and join (task k8 324) and its embraced tasks ({k4, . . . , k7}, 316-322) are encapsulated.

FIGS. 18-23 provide further examples of how workflow k 302 can be verticalized (generalized). Some of the examples are valid examples of verticalization, while others are invalid, as discussed individually below.

Figure 18:
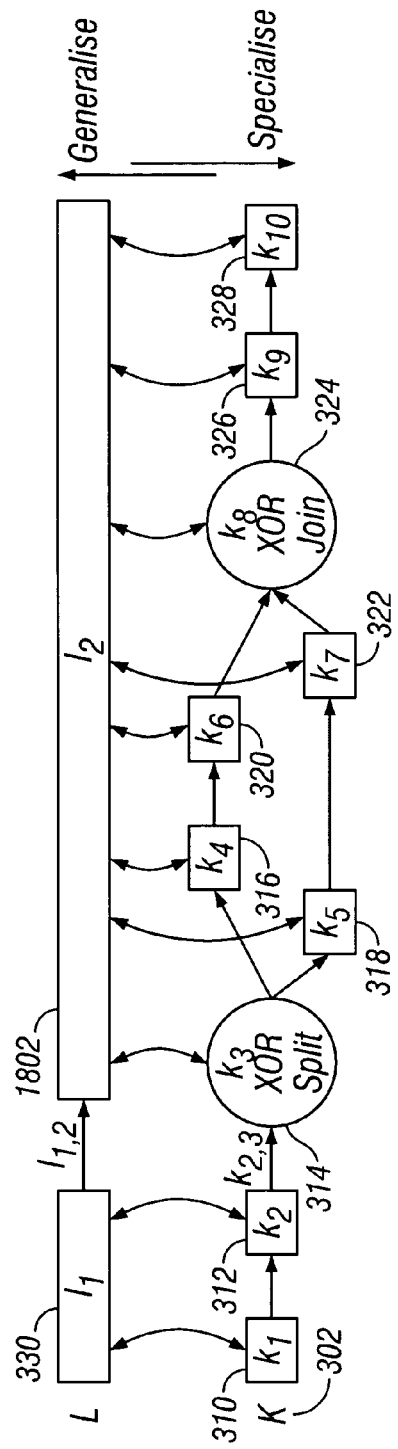
Figure 19:
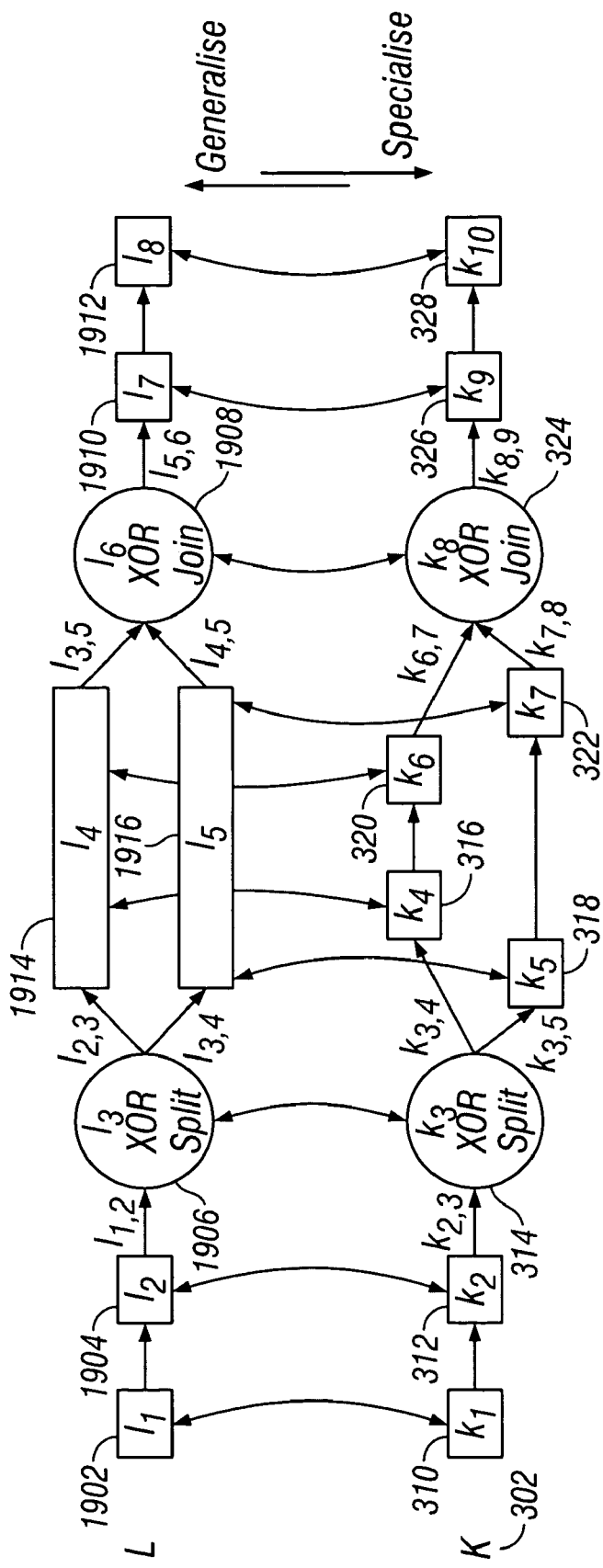

In. FIG. 18, vertices {k3, . . . k10}, i.e., tasks 314-328 in workflow K 302 are represented by one vertex l2 1802, which is grouping 10 in the above listing of verticalizable structures. In FIG. 19, tasks 310, 312, 314, 324, 326, and 328 are represented by corresponding individual tasks 1902, 1904, 1906, 1908, 1910, and 1912, respectively. Tasks 316 and 320, are represented by one single vertex, 1914 (grouping l1 above), and tasks 318 and 322 are represented by task 1916 (grouping l2 above).

In FIG. 20A, tasks 310, 312, 314a (which is an AND-split, rather than the XOR split 314 of FIG. 3), 316, and 318 are grouped into one task l1 2002a. Similarly, tasks 320, 322, 324a (which is an AND join, as opposed to the XOR join 324 in FIG. 3), 326, and 328 are grouped into one task l2 2004a.

In FIG. 20A, the task l1 2002a is ambiguous, because, with regards to the execution of workflow K 302, it would be possible for task k7 322 to start while task k4 316 and, due to their dependency task l1 2002a, are still in progress, or even aborted. Since task k7 322 is represented by task l2 2004a, task l2 2004a would start before task l1 2002a is completed. This course of events contradicts the "AND" nature of split 314a, and violates fundamental rules in workflow, and is therefore invalid.

In FIG. 20B, tasks 310, 312, 314, 316, and 318 are grouped into one task l1 2002b. Similarly, tasks 320, 322, 324, 326, and 328 are grouped into one task l2 2004b.

In FIG. 20B, it would be necessary to analyze workflow K 302 sufficiently to be sure that either tasks k4,6 316,320 or tasks k5,7 318, 322 are executed, which would not necessarily be true.

Figure 21:
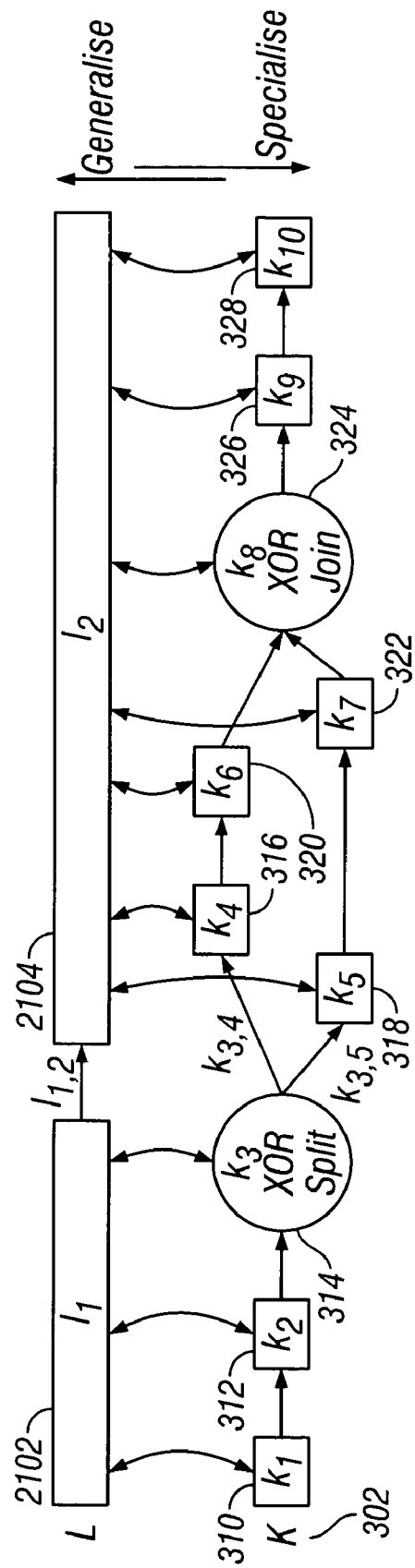

In FIG. 21, a task l1 2102 includes tasks 310, 312, and 314, while a task l2 2104 includes tasks 316, 318, 320, 322, 324, 326, and 328. In FIG. 22, a task l1 2202 includes tasks 310, 312, and 314, a task l2 2204 includes tasks 316 and 320, a task l3 2206 includes tasks 318 and 322, and a task l4 2208 includes tasks 324, 326, and 328. In FIG. 23, a task l1 2302 includes tasks 310, 312, and 314, a task l2 2304 includes tasks 316, 318, 320, and 322, and a task 2306 includes tasks 324, 326, and 328.

In FIGS. 21-23, the abstracted workflows do not guarantee that their underlying workflows will be properly executed, do not match an operation of the verticalization operator 1600, and/or violate one or more of the corresponding rules for verticalization set forth below.

One such rule that follows from the verticalization operator 1600 is that when a vertex is being specialised, the specialising vertices should act vertex-type-compliant. In other words, a set of vertices "L" that specialize a vertex (or vertices) "k" have to behave like the task type(s) of k. If k is of type AS, then L has to behave like and AND-split, which occurs when L has the identical number of outgoing arcs as k (which are all being used). Analogously, if k is of type XS, then L has to behave like an XOR-split, which occurs when it has the identical number of outgoing arcs as k (where only one is being used). Analogous consideration are applicable to the vertex-types of AND joins and XOR-joins. Activity and sub-workflow have exactly one incoming and one outgoing arc.

This consideration also applies for the operation of generalization. Here, a group of vertices L has to be formed such that it behaves like one atomic vertex k.

Figure 24:
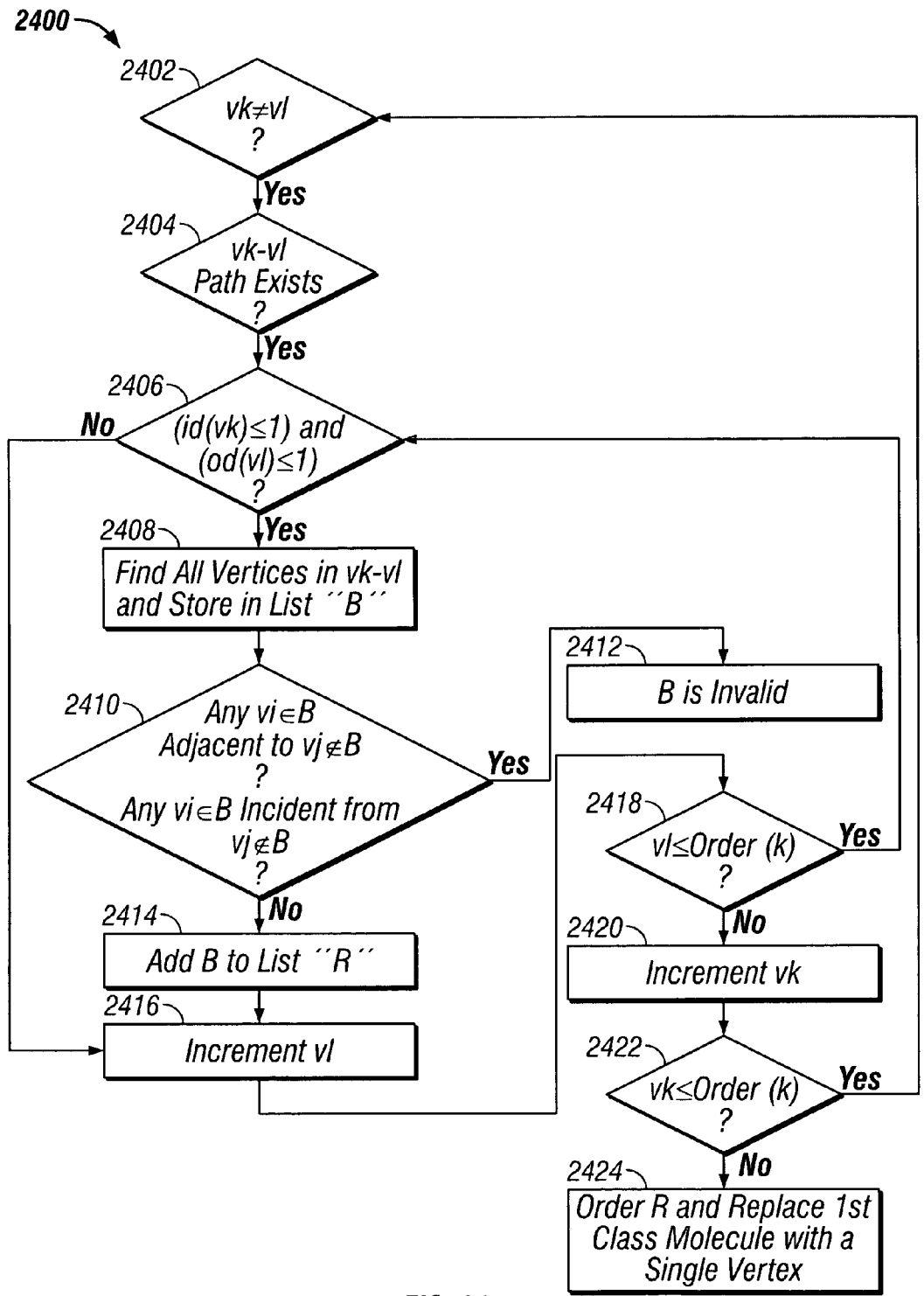
FIG. 24 is a flowchart describing an algorithm to compute v-structures.

FIG. 24 is a flowchart 2400 describing an algorithm to compute v-structures. More specifically, the algorithm (referred to as "Kivs") allows computation of all v-structures within a digraph K, thereby returning V(Bn), i.e. the set of vertices for any identified v-structure Bn. For the following considerations, $v_k$ and $v_l$ are two vertices in K.

In FIG. 24, it is first determined if $v_k$ is not equal to $v_l$, i.e., that at least two vertices are being considered (2402). If so, then it is determined whether a path between $v_k$ and $v_l$ exists (2404). If so, then it is determined whether the indegree (id) of $v_k$ is less than or equal to one, and whether the outdegree (od) of $v_l$ is less than or equal to one (2406). In other words, it is determined whether the first vertex vk of the group has no more than one incoming dependency (e.g., an activity task, but not an XOR join route task), and whether the last vertex vl has no more than on outgoing dependency (e.g., an activity task, but no an AND split route task).

If this condition is met, then all vertices in the $v_k$-$v_l$ path are determined and stored in a list "B" (2408). Afterwards, it is determined whether any vertex $v_i$ in B is adjacent to any other vertex $v_j$ not in B, and whether any vertex vi in B is incident from any other vertex vj not in B (2410). In other words, no vertex in B should have a dependency from or to another vertex not in B (other than the incoming/outgoing dependencies of $v_k$, $v_l$). If there is such a dependency, then the list B is invalid (2412). Otherwise, the list B is added to a list "R" of valid structures (if the resulting structure is atomic, it may be replaced by a single vertex).

Afterwards (or if the indegree/outdegree of $v_k$, $v_l$ was determined to be greater than one), then $v_l$ is incremented (2418). If this incrementing causes the order of $v_l$ to be less than or equal to the order of the entire digraph (workflow) k, then the above process is repeated on the new path, beginning with a checking of the indegree/outdegree of the new path (2406).

Afterwards, then $v_k$ is incremented (2420), and, if $v_k$ is less than or equal to an order of the digraph (workflow) k, then the process repeats from the beginning (2402). Otherwise, the process is finished, and the structures in list R are ordered according to their order (increasing); also, all first class molecules in R are replaced with a single vertex (2424).

Figure 25:
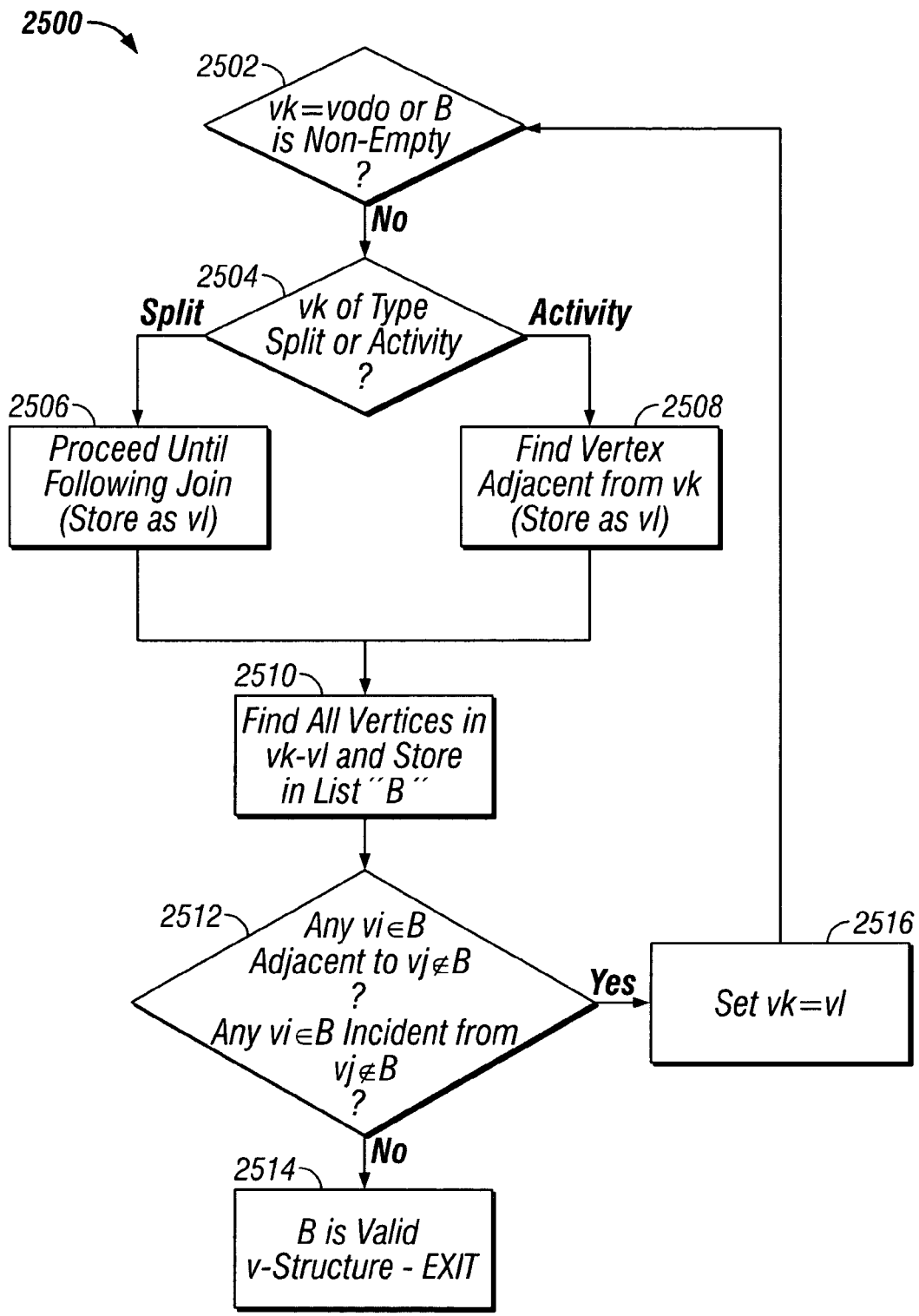
FIG. 25 is a flowchart for finding valid v-structures.

Using the above algorithm, in a sequence of length n, $[(n^2+n)/2]$ v-structures are obtained containing at least two vertices, or $[(n2-n)/2]$ v-structures including n trivial structures. the identification of v-structures will be a core functionality of a Although the above algorithm is capable of calculating all v-structures in a workflow, such a computation may overly complicated or extensive for a particular need. Therefore, FIG. 25 presents a flowchart 2500 for calculating a subset of v-structures desired by an operator. For example, an operator may interact with such an algorithm and provide information on which task (atoms) or set of tasks (molecules) should be combined into a virtual task. In such an interactive environment, it may not be necessary or desirable to compute all possible structures that can be verticalised. Instead, the operator will generally select a single task at a time that he or she thinks needs to be maintained as private. The tool would then make propositions on which adjacent atoms or molecules could be combined with the task in question. It should be understood that this approach typically reduces the computational time needed to compute required v-structures. This is due to the fact that, as referred to above, instead of computing all combinations, the tool would only propose two: to the left of the task in question and to the right.

In FIG. 25, a transposition of a matrix K is denoted as $K^T$. In $K^T$, the direction of the arcs is reversed with respect to K, i.e. if there is an arc from vertex $v_1$ to vertex $v_2$ in K, then in $K^T$, there is an arc from $v_2$ to $v_1$. This allows us the use of the same algorithm that computes along the direction of arcs in K to compute backwards with respect to K, by using $K^T$ instead. In the below discussion, the notation "L" is a placeholder for K or $K^T$, and/or is the corresponding matrix representation of a workflow/digraph L. The algorithm described in FIG. 25 is referred to hereafter as "iavs," where 'iavs' stands for 'identification of adjacent v-structures'.

In FIG. 25, $v_k$, $v_l$, and $v_{koriginal}$ are vertices in L. Also, $v_{od0}$ is a vertex in L, which has outdegree zero, i.e., $od(v_{od0})=0$, which is the final vertex in L. Calling K iavs($v_k$) will result in the closest v-structure that includes $v_k$, which follows after $v_k$. Invoking $K^T$ iavs($v_k$) results in the closest v-structure that includes $v_k$, which is before $v_k$ with respect to K. B is a simple list that is able to store the indexes of vertices in L. B is returned by the iavs algorithm.

The iavs algorithm begins with the assumptions that $v_{k(original)}=v_x$, and that B is empty, and continues until $v_k=v_{od0}$ (i.e., the last vertex is reached), or until B is non-empty. If $v_k$ is not $v_{od0}$ or B is empty (2502), then it is determined whether $v_k$ is of type split or of type activity (2504). If $v_k$ is of type split, then the algorithm proceeds in L along the direction of the arcs in L until the next vertex of type join is found, whereupon the row number for the join vertex is stored in $v_1$ (2506). If $v_k$ is of type activity, then the algorithm finds the vertex adjacent from $v_k$, whereupon the row number for the adjacent vertex is stored in $v_1$ (2508). To summarize, the algorithm finds a $v_k$-$v_1$ path in a manner dependent upon the type of vertex originally analyzed.

Next, all the vertices in the $v_{k(original)}$ path are found, and stored in a list B (2510). Then, the analysis described above is performed, in which it is checked whether any vertex $v_i$ in B is adjacent to, or incident from, a $v_j$ that is not in B (2512). If there are no such vertices, then the vertices in B are a valid v-structure, and the algorithm exits (2514). Otherwise, the vertices do not form a valid v-structure, and so the algorithm sets $v_k$=$v_1$ (2516), and returns to the beginning of the algorithm (2502).

The algorithm of flowchart 2500 may fail to identify v-structures when the chosen vertex, $v_k$, is in a purely parallel structure. For example, if a split task defines two parallel activity, tasks, which are subsequently joined by a join task, then choosing one of the activity tasks will result in no v-structures. This is because proceeding from the chosen activity vertex ($v_k$) to the next vertex sets the join task as the end vertex, $v_1$. Since a join task, by definition, has a dependency from the remaining parallel activity task, then it has a vertex not within the $v_k$-$v_1$ path (i.e., the other activity task). Checking $K^T$ in this case (i.e., proceeding along the vertices in a reverse direction) will not help find a v-structure, since a similar problem is encountered at the split task (i.e., it has an outgoing dependency to a vertex not in the $v_k$-$v_1$ path, meaning the remaining parallel activity task).

Figure 26:
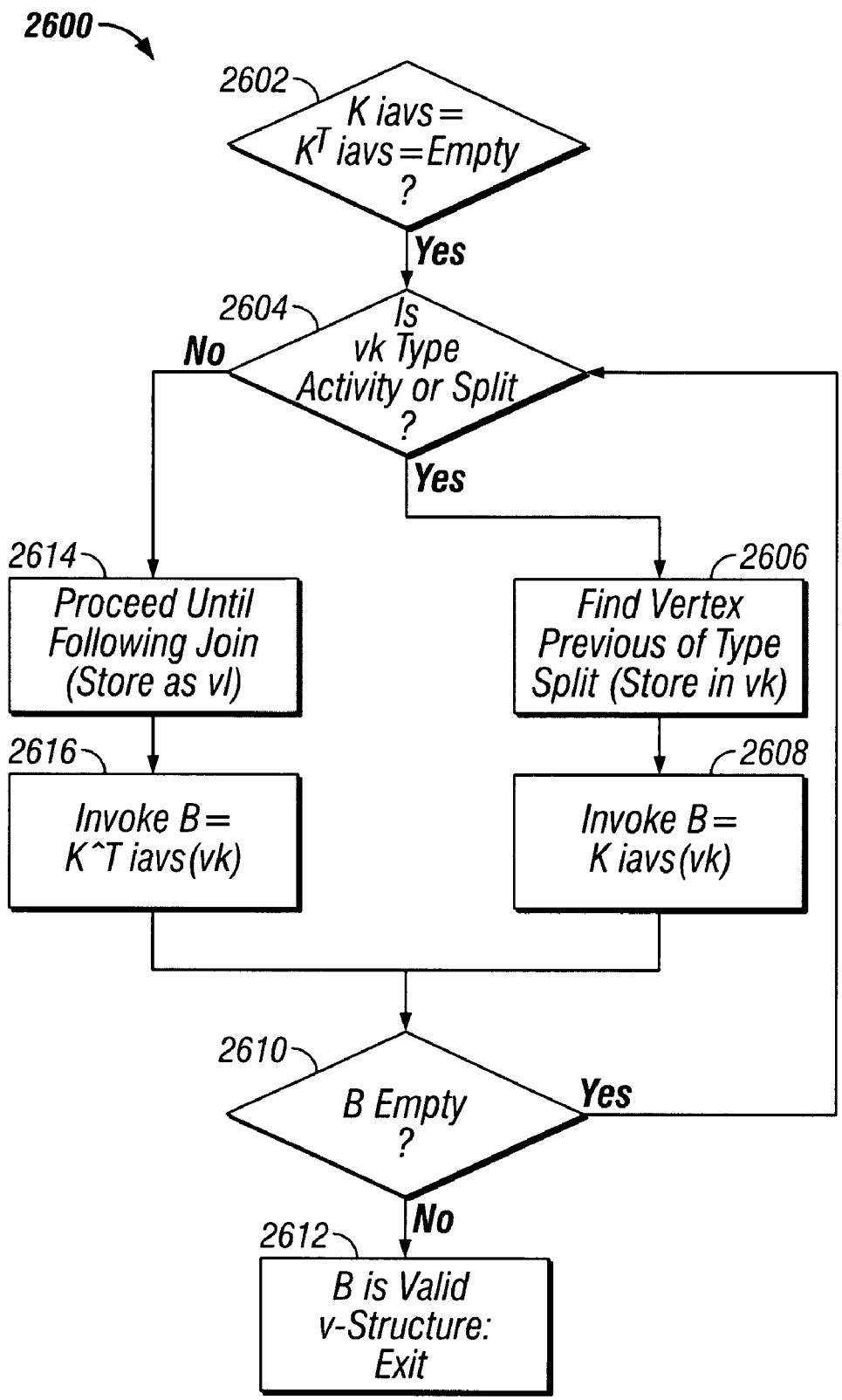
FIG. 26 is a flowchart for finding v-structures which is a back-up to the flowchart of FIG. 25.

FIG. 26 is a flowchart 2600 for finding v-structures which is a back-up to flowchart 2500 of FIG. 25. This algorithm extends the "iavs" algorithm of flowchart 2500, and so is noted as "iavs$_e$." In FIG. 26, when it is determined that K iavs($v_k$)=$K^T$ iavs($v_k$)=EMPTY (2602), then it is next determined whether $v_k$ is either (1) of type Activity or Split, or (2) neither (2604). If the task is one of activity or split, then the algorithm proceeds backwards in K until a (new) vertex of type split is found, which is then defined, and stored as, $v_k$ (2606). Then, the algorithm of flowchart 2500, iavs, is invoked for this $v_k$ (2608). If a result of this algorithm, list B, is empty (2610), then the algorithm returns to look for another activity/split task (2602). If B is found to be a valid v-structure, then the algorithm exits (2612).

If $v_k$ is neither an activity or split task, then the algorithm proceeds along K until the next following join task is found (2614). In this case, then the iavs algorithm of flowchart 2500 is invoked as B=$K^T$iavs($v_k$), i.e., the algorithm runs in a reverse direction of K (2616). Again, if a result of this algorithm, list B, is empty (2610), then the algorithm returns to look for another activity/split task (2602). If B is found to be a valid v-structure, then the algorithm exits (2612).

Figure 27A:
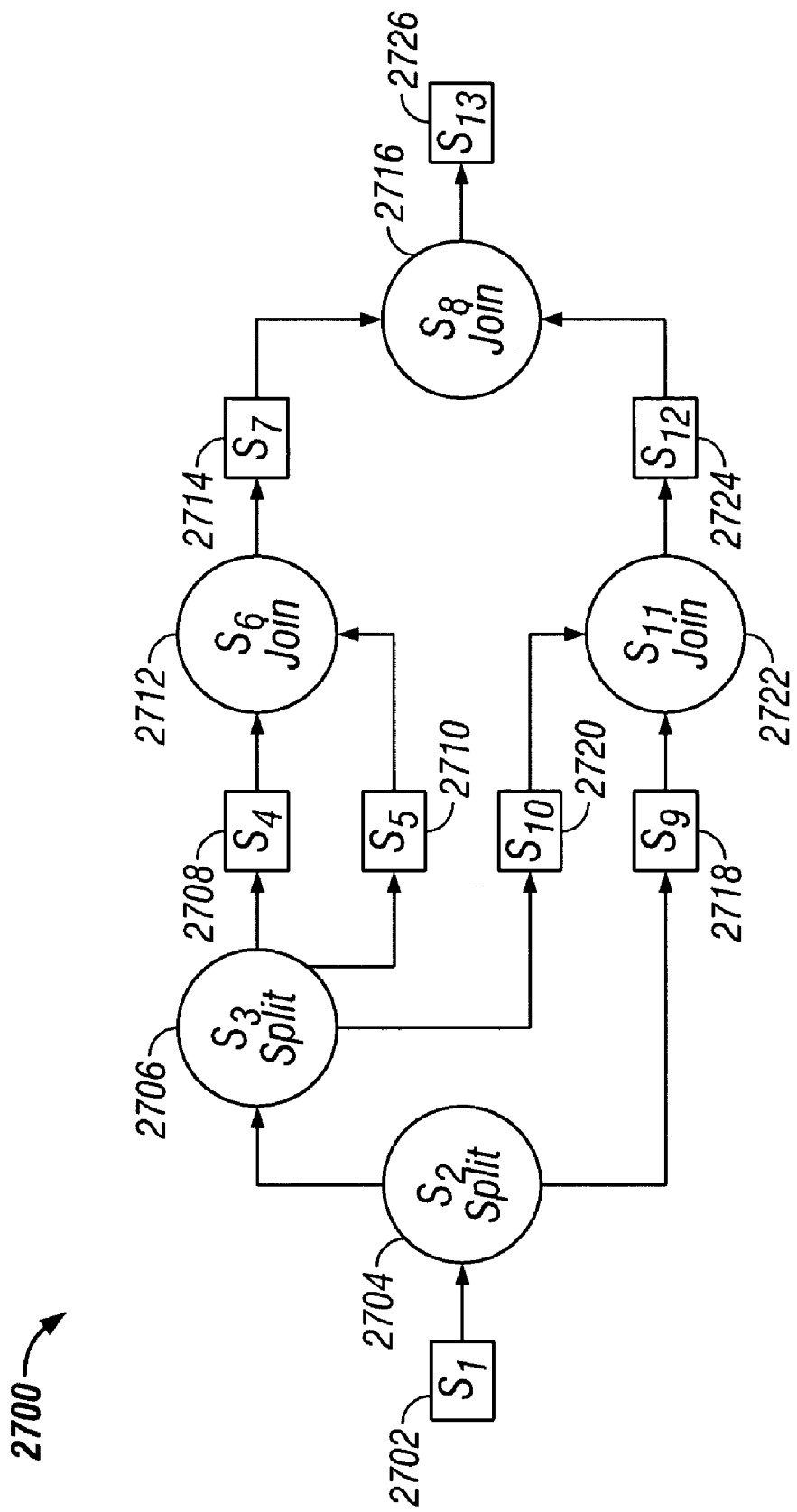
FIG. 27A is a first example of a digraph (workflow) 2700.

FIG. 27A is an first example of a digraph (workflow) 2700, and FIG. 27B is a table listing adjacent v-structures for each vertex (node) of the digraph 2700.

Digraph 2700 includes an activity task s1 2702, a split task s2 2704, a split task s3 2706, an activity task s4 2708, an activity task s5 2710, a join task s6 2712, an activity task s7 2714, a join task s8 2716, an activity task s9 2718, an activity task s10 2720, a join task s11 2722, an activity task s12 2724, and an activity task s13 2726.

The table of FIG. 27B lists all adjacent v-structures for the above-listed workflows. In this case, for example, all of tasks s2 2704-s12 2724 have only one possible v-structure, which is the structure that includes all tasks from s2 2704 to s12 2724, inclusive. This means that these tasks could be grouped together into a single abstracted workflow view task for presentation to outside parties and/or use in the above-described three-tier workflow of Section I.

Figure 28A:
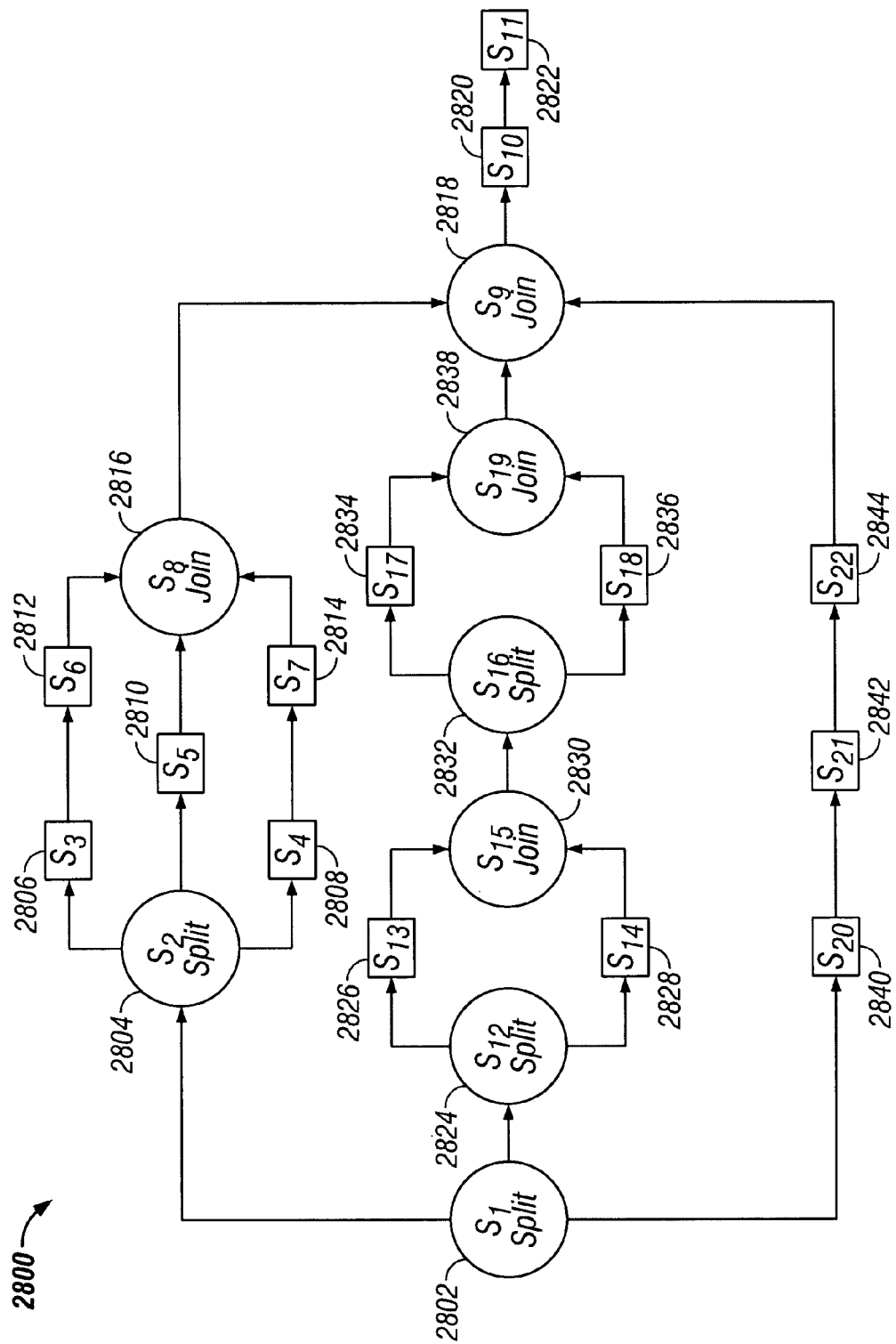
FIG. 28A is a first example of a digraph (workflow).

FIG. 28A is a first example of a digraph (workflow) 2800, and FIG. 28B is a table listing adjacent v-structures for each vertex (node) of the digraph 2800.

Digraph 2800 includes an activity task s1 2802, a split task s2 2804, an activity task s3 2806, an activity task s4 2808, an activity task s5 2810, an activity task s6 2812, an activity task s7 2814, a join task s8 2816, a join task s9 2818, an activity task s10 2820, an activity task s11 2822, a split task s12 2824, an activity task s13 2826, an activity task s14 2828, a join task s15 2830, a split task s16 2832, an activity task s17 2834, an activity task s18 2836, a join task s19 2838, an activity task s20 2840, an activity task s21 2842, and an activity task s22 2844.

The table of FIG. 28B lists all adjacent v-structures for the above-listed workflows. For example, task s21 2842 has two possible verticalizations, i.e., the grouping of task s20 2840 and task s21 2842, or the grouping of task s21 2842 and task s22 2844. Again, this means that these two task groupings could be joined into either of the two abstracted workflow view tasks for presentation to outside parties and/or use in the above-described three-tier workflow of Section I.

Figure 29:
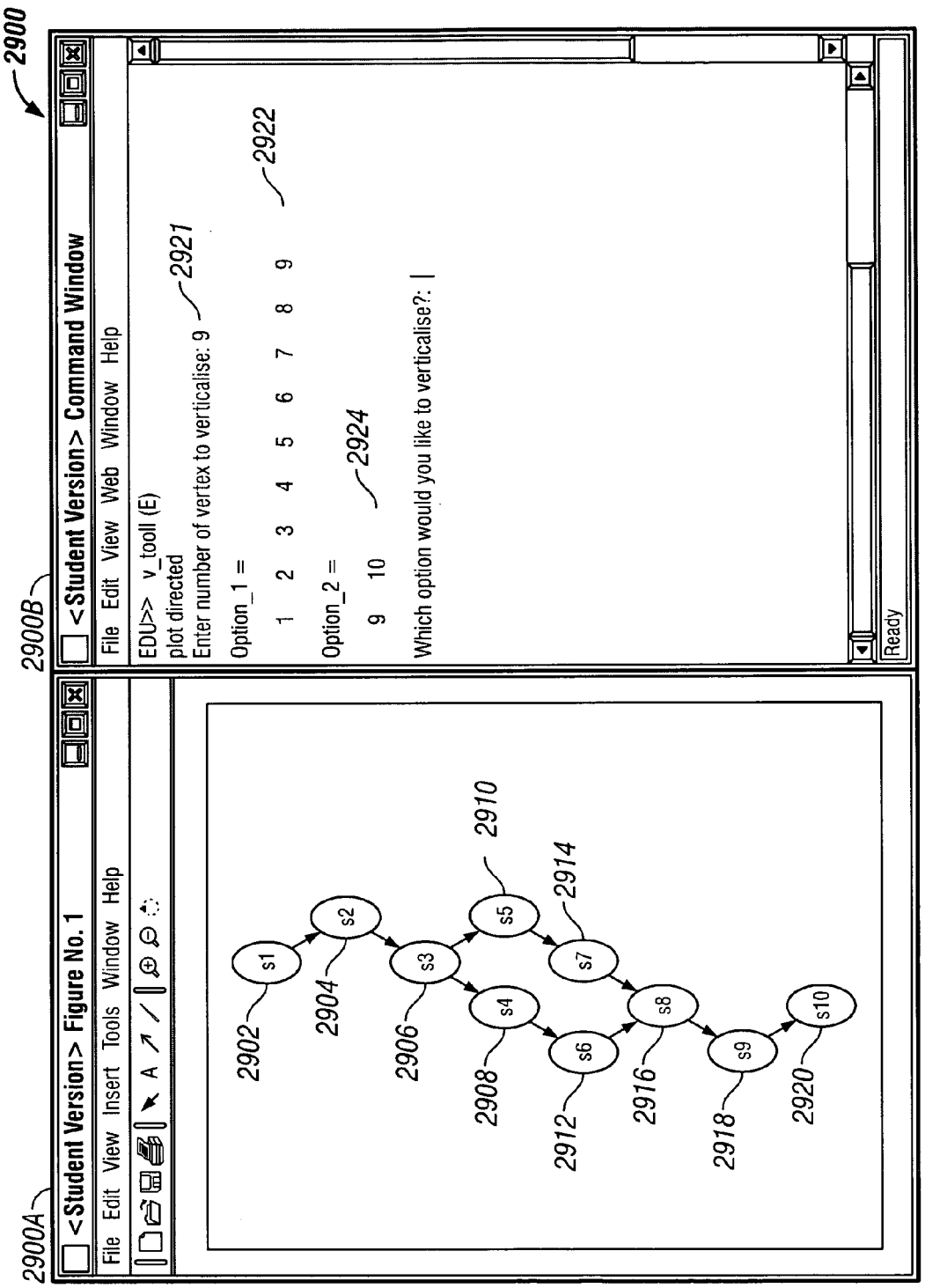
FIG. 29 is a first screenshot of a tool for identifying v-structures.

FIG. 29 is a first screenshot 2900 of a tool for identifying v-structures. FIG. 29 includes a first portion 2900A, and a second portion, 2900B. In portion 2900A, a plurality of tasks in a workflow are represented as a node s1 2902, a node s2, 2904, a node s3 2906, a node s4 2908, a node s5 2910, a node s6 2912, a node s7 2914, a node s8 2916, a node s9 2918, and a node s10 2920.

In the second portion 2900B, the tool presents a user, in section 2921, with an ability to enter a number of a vertex to verticalize, in which a user has selected vertex 9, representing node s9 2918. In section 2922, the tool presents the user with a first option for verticalization, and presents a second option in section 2924. In the first option, verticalization would result in joining all nodes from s1 2902 to s9 2918 into a workflow view node. The second option would result in joining only nodes 29 2918 and s10 2920 into a workflow view node.

Figure 30:
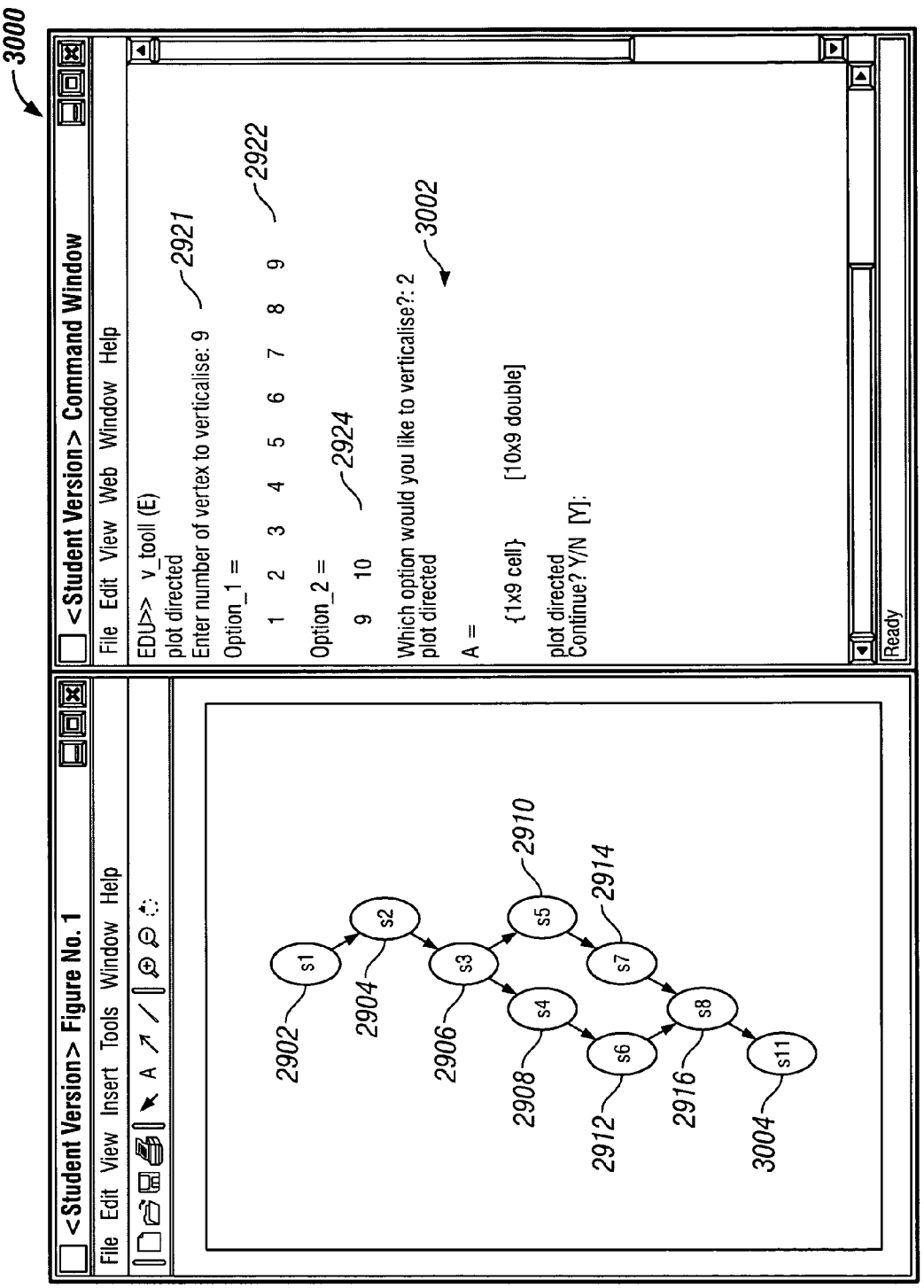
FIG. 30 is a second screenshot of a tool for identifying v-structures.

FIG. 30 is a second screenshot 3000 of a tool for identifying v-structures. In FIG. 30, the user has selected option 2 in section 3002, and the tool has responded by joining node s9 2918 and node s10 2920 into a single node s11 3004.

Figure 31:
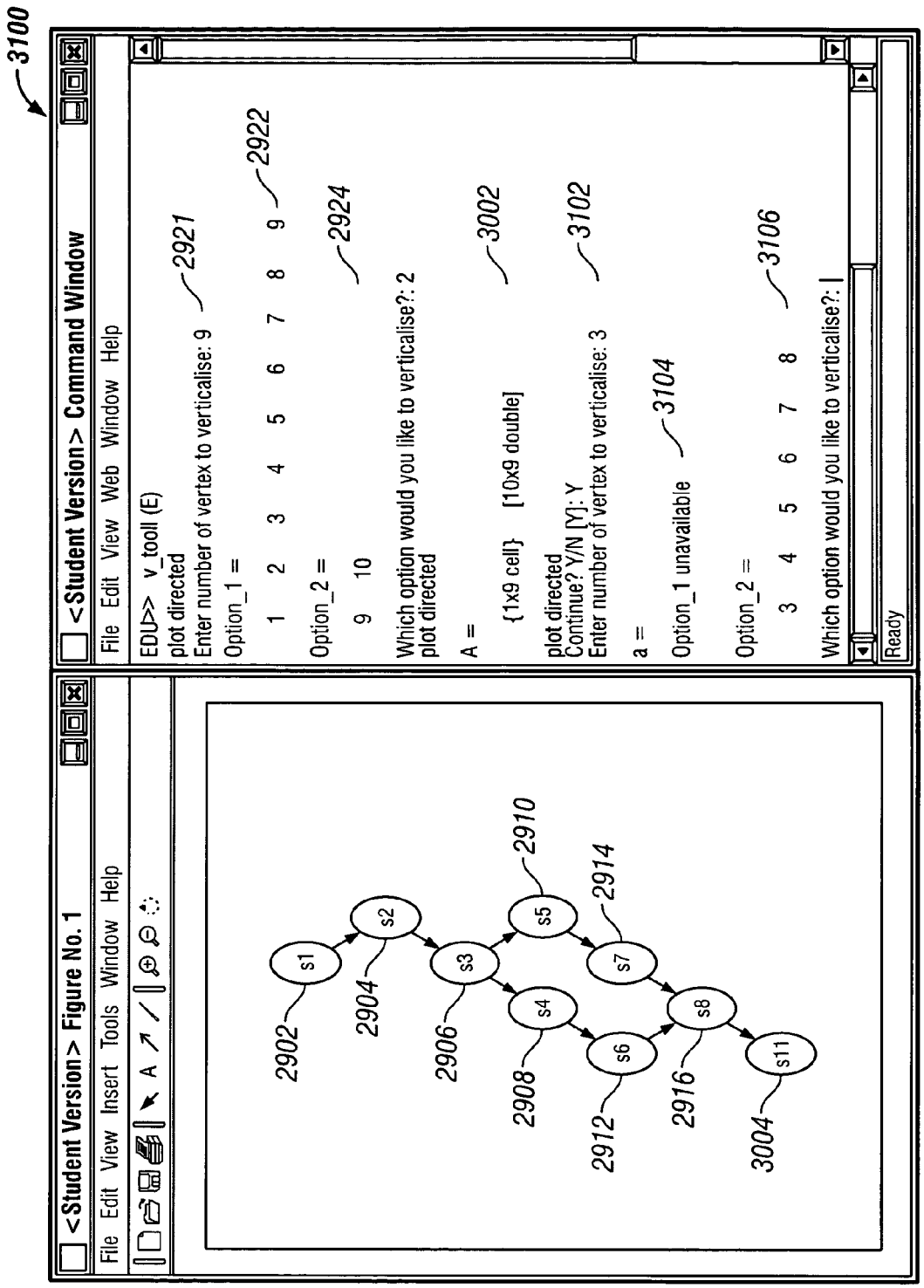
FIG. 31 is a third screenshot of a tool for identifying v-structures.

FIG. 31 is a third screenshot 3100 of a tool for identifying v-structures. In FIG. 31, in section 3102, a user has selected vertex 3, representing node s3 2906, for verticalization. In section 3104, the tool informs the user that, to the left of node s3 2906, there are no available option for verticalizing vertex 3. This is because node s3 2906 is a split task, and verticalizing this node into a workflow view without a corresponding join task would violate the rules for verticalization set forth above.

In section 3106, the tool presents the user with a second option for verticalizing node s3 2906, i.e., the inclusion of nodes between node s3 2906 and node s8 2916, inclusive.

Figure 32:
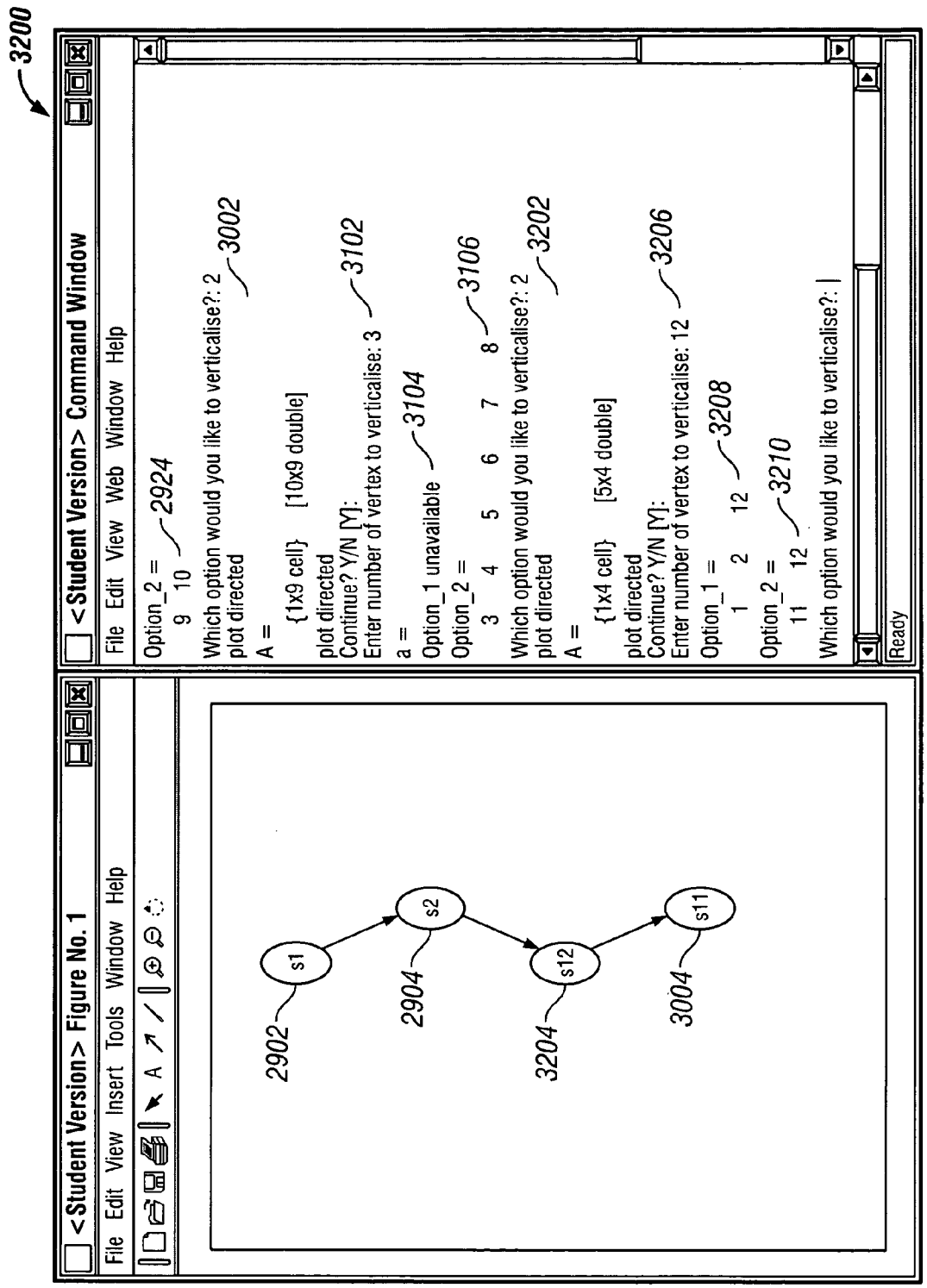
FIG. 32 is a fourth screenshot of a tool for identifying v-structures.

FIG. 32 is a fourth screenshot 3200 of a tool for identifying v-structures. In FIG. 32, the user has selected, in a section 3202, option 2 (presented in section 3106). As a result, a new node s12 3204 is included in the workflow at the left. The user then selects a new vertex in section 3206, and is presented with a first option 3208 and a second option 3210 for verticalization.

The above techniques represent different ways to alter an abstraction level of one or more tasks within a workflow.

increasing an abstraction level of a workflow can be performed by the generalization operation defined above, while the abstraction level can be decreased through the operation of specialization. An abstracted workflow can be used simply to maintain confidential information about the abstracting party, and/or can be used in conjunction with the three-tier workflow model described in Section I.

Section III

In Section I, a three-tier workflow model is described which allows collaborating parties to take their respective private workflows, generate abstracted workflow views, and carry out a collaborative workflow using the workflow view. Section II describes techniques for varying an abstraction level of a workflow, and these techniques can be used to change workflows into workflow views, and vice-versa.

Section III describes ways to join tasks from multiple workflows into a single workflow, and/or to separate a single workflow into multiple sub-workflows. These techniques can be used, for example, to form workflows and/or workflow views into a collaborative workflow for use in the three-tier workflow model of Section I, or can be used to divide a collaborative workflow into individual workflows, which can then be assigned to individual parties within the coalition for enactment.

Returning to FIG. 10, the operation of combining multiple workflows into a single workflow may be implemented using the "expansion" operation 1006, while the operation of dividing workflows into parts for, for example, assignment to multiple parties for implementation, may be practiced using the "reduction" operation 1008. The operations of expansion and reduction are discussed in more detail below.

In discussing the various techniques and operation just mentioned, the discussion below differentiates between two types of workflows: "outsourced" workflows and "distributed" workflows. These workflow types, and their differences, are discussed with respect to FIGS. 33 and 34.

FIG. 33 is a block diagram of an outsourced workflow 3300. Specifically, the workflow is enacted by a partner A 3302 and a partner B 3304, and includes a task t11 3306, t12 3308, t13 3310, t14 3312, t15 3314, t16 3316, and t17 3318. In workflow 3300, the task t12 3308 is outsourced from partner B 3304 to partner A 3302 as task t13 3310. Also, the task t14 3312 is outsourced from partner B to partner A 3302 as task t15 3314 and task t16 3316.

In short, in FIG. 33, it can be said that one or more activities or sub-workflows of an existing private workflow are implemented outside of the scope of the workflow by an external task or workflow. The existing activities or sub-workflows in the private workflow are placeholders for external activities or sub-workflows. In FIG. 33, tasks t12 3308 and t14 3312, as just explained, are proxies for partner A's tasks t13 3310, t15 3314, and t16 3316 that implement them. Tasks t12 3308 and t14 3314 communicate with partner A's implementing tasks during their lifecycle. This is transparent for the workflow management system that performs the workflow of partner B 3304, because the outsourcing acts exactly the same as a performing agent.

Outsourced workflows can be considered to be analogous to workflows and workflow views, in that a workflow outsources its tasks to the workflow view.

FIG. 34 is a block diagram of a distributed workflow 3400. Specifically, the workflow is enacted by the partner A 3302 and/or the partner B 3304, and includes a task t1 3402, t2 3404, t3 3406, t4 3408, t5 3410, and t6 3412, as shown. In FIG. 34, then, all activities or sub-workflows of a party's private workflow are implemented inside the scope of the private workflow. The existing private workflow is augmented by one or more activities or sub-workflows of an external workflow (i.e., belonging to another party). In FIG. 34, the tasks of partner A 3302 and the tasks of partner B 3304 are assumed to be pre-existing, and so they are complete in a sense that their respective tasks are linked by dependencies.

Figure 35:
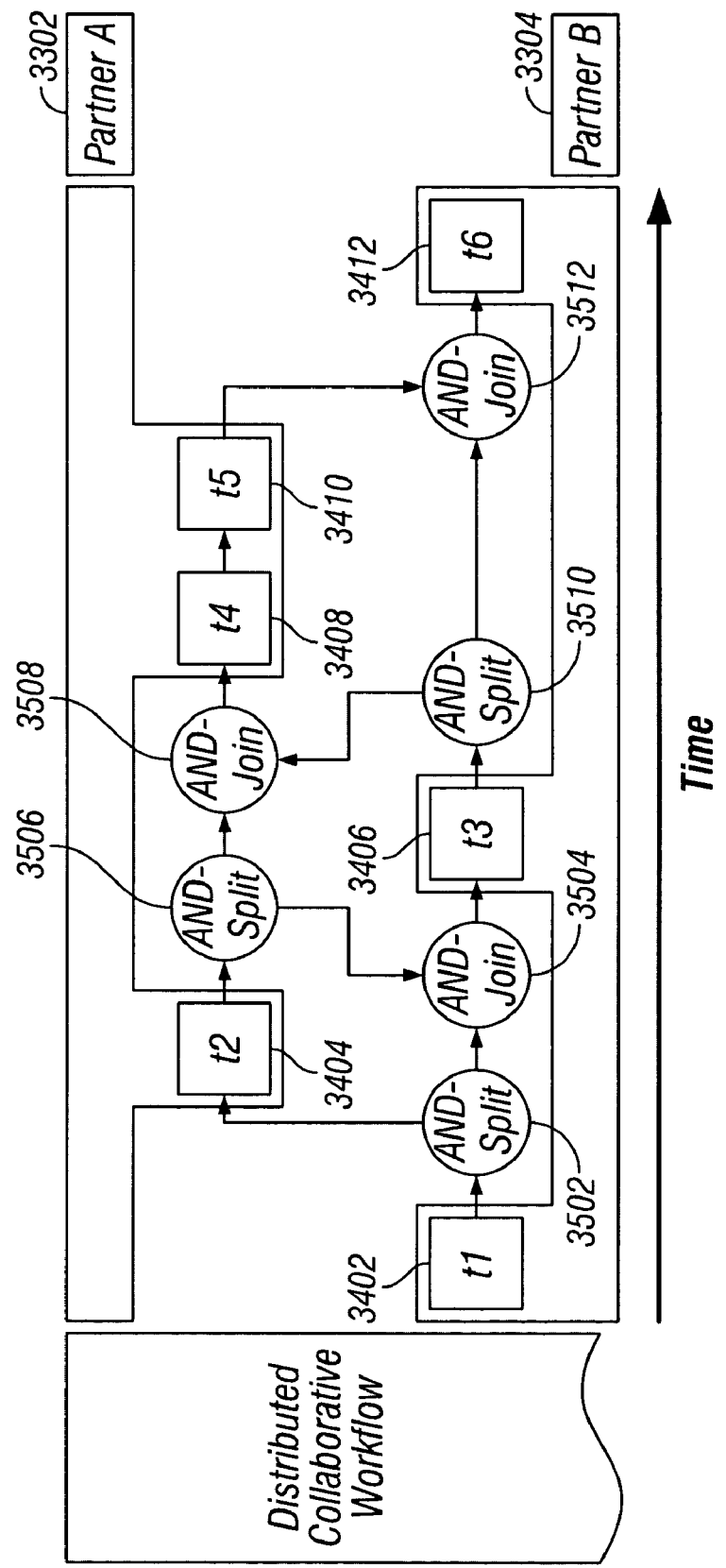
FIG. 35 is an expanded block diagram of the distributed workflow.

FIG. 35 is an expanded block diagram of the distributed workflow 3400. FIG. 35 illustrates the route tasks and/or dependencies used to ensure order preservation and coordination of the tasks of workflow 3400. Such route tasks are needed to synchronize the workflows of partner A 3302 and partner B 3304.

In FIG. 35, an AND-split task 3502 splits the path of workflow 3400, sending one flow to task t2 2404, while the other flow waits for a return at an AND join task 3504. When task t2 3404 is completed, an AND-split task 3506 splits the resultant flow into two again, sending one flow back to the AND join task 3504. Having ensured that task t2 3404 is completed in this fashion, task t3 3406 proceeds. Upon finishing, task t3 3406 outputs to an AND-split task 3510, which sends a first flow back to the AND join 3508, allowing tasks t4 3408 and t5 3410 to proceed, and sends a second flow to a final AND join task 3512, which waits until task t5 3410 is complete before allowing task t6 3412 to begin.

Thus, the various route tasks synchronize the flow of work between partner A 3302 and partner B 3304, such that each outgoing dependency requires the emitting task to add an AND-split, while each incoming dependency requires the receiving task to add an AND-join. In this way, both the synchronization (route) tasks and the dependencies between the workflows of Partner A 3302 and partner B 3402 may be managed.

Considering task t1 3402, task t3 3406, and task t6 3412 to a first workflow (i.e., associated with partner B 3304), and task t2 3404, task t4 3408, and task 3410 to be a second workflow (i.e., associated with partner A 3302), then the operation of expansion can be seen to include the process of deciding how and where to add synchronizing (route) tasks to obtain a properly-ordered collaborative workflow.

Generally speaking, then, expansion combines two or more workflows from the same level, so that one or more vertices in one is augmented by one or more vertices in the other through parallelism or sequentialism. The process of expansion requires the augmentation of the existing workflows by coordinating and synchronizing tasks, i.e. AND-splits and AND-joins, as illustrated in FIG. 35.

In FIG. 35, a sequential, or series, combination of workflow tasks is illustrated. As shown, this combination took into consideration the integrity of the involved digraphs (workflows). That is, the digraphs were not decomposed into smaller, disconnected subsets. As also shown, generally speaking, a sequential combination of vertices may helpfully utilize the introduction of an AND-split after the first vertex in the sequence, an AND join before the second vertex (not shown in Figure, because task t2 3404 is the very first vertex in the workflow of partner A 3302), an AND-split after the second vertex and an AND-join before the third vertex, and so on.

Figure 36:
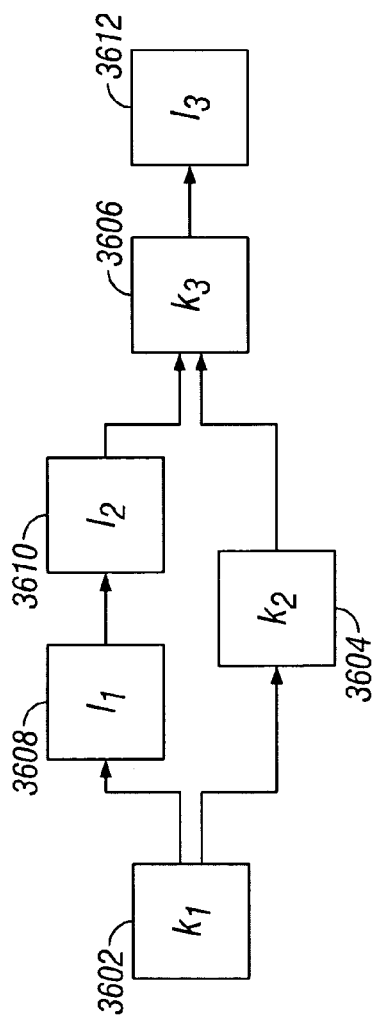
FIG. 36 is a block diagram of a parallel combination of multiple workflows.

FIG. 36 is a block diagram of a parallel combination of multiple workflows. As just discussed, FIG. 35 dealt with a sequential combination of workflows. In FIG. 36, a first digraph (workflow) K includes a task k1 3602, a task k2 3604, and a task k3 3606, and is assumed to be, by itself, a simple first, second, third sequence of tasks. A second digraph L includes a task l1 3608, a task l2 3610, and a task l3 3612, and is also assumed to be, by itself, a simple linear list of tasks. Also in FIG. 36, as shown, tasks l1 and l2, together, are in parallel with task k2.

Figure 37:
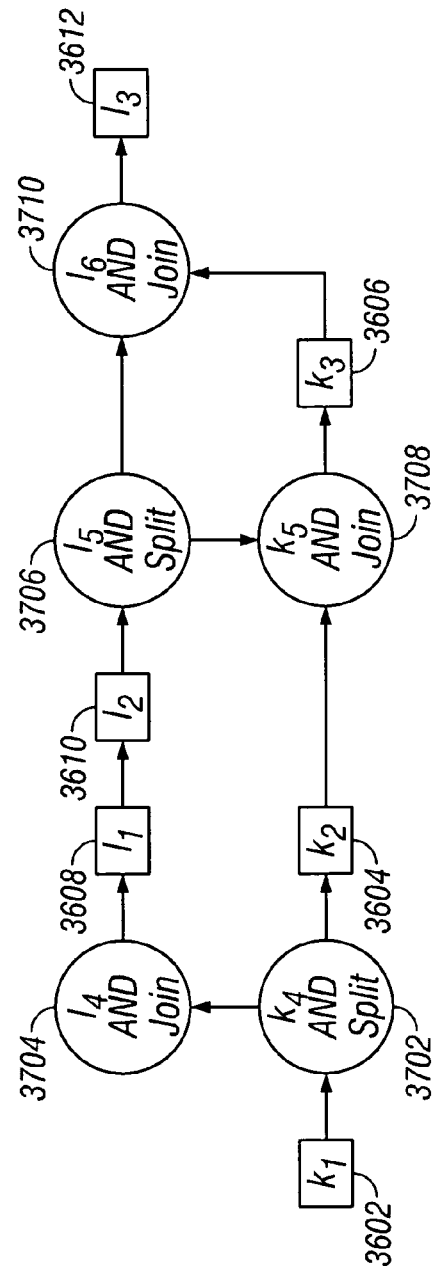
FIG. 37 is a combination workflow including synchronizing tasks.

In FIG. 37, an AND-split k4 3702 is added before the task to be parallelised in a first one of the digraphs (i.e., here, task k2 3604 in digraph K), and an AND join 14 3704 is added before (14) before the task to be parallelised in a second one of the digraphs (i.e., here, task l1 3608 in digraph L). As noted above with respect to FIG. 35, the AND join 14 3704 is not completely necessary, since there is no other tasks to be joined to task l1 3608 (it being the first task in digraph L), however, the AND join 14 3704 is shown here for completeness.

Further in FIG. 37, an AND-split l5 3706 is added after the structure (i.e., task l1 3608 and task l2 3610) to be parallelised in the second one of the digraphs (i.e., L) that does not continue the path, and an AND-join k5 3708 after the structure (i.e., task k2 3604) to be parallelised in the first one of the digraphs (i.e., K). Finally, an AND join 16 3710 is added after the task k3 3606 and before the final task of the joint digraph (workflow), task l3 2612.

In this discussion of an expansion operation, describing examples of formal techniques for performing expansion, it is assumed that combined structures in two digraphs K and L, such as the digraphs discussed with respect to FIG. 37, generally satisfy the conditions of verticaliseable structures discussed above in Section II.

The discussion of FIGS. 35 and 37 centered around sequential and parallel structures, respectively. A collaborative workflow will typically include multiple sequential and parallel structures, and so a general solution for combining workflows and maintaining an order of execution therefore requires an approach that takes into account a holistic view of structures that are adjacent, e.g. when a parallel structure is formed after a sequential structure, rather than an isolated expansion of single structures.

Figure 38:
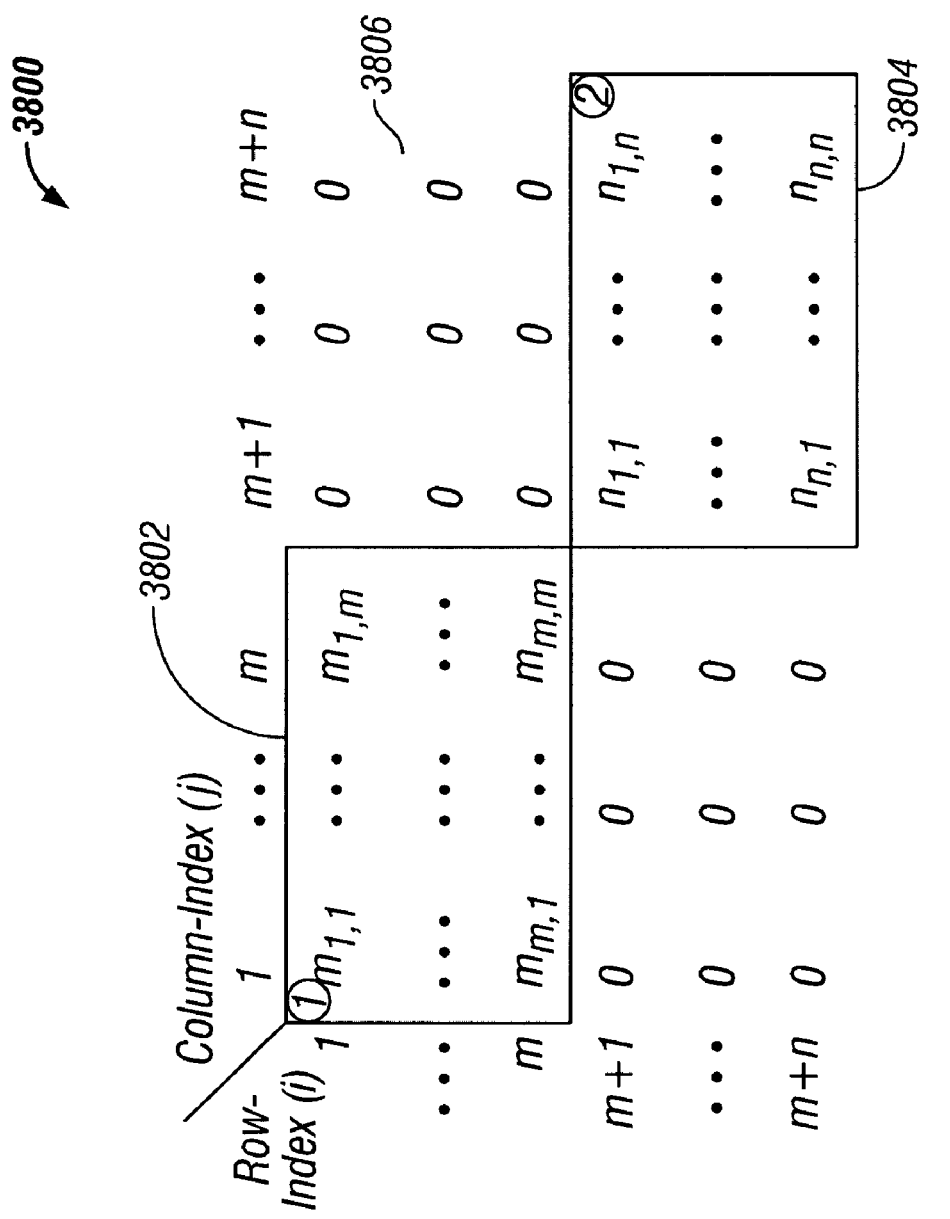
FIG. 38 is an example of a first matrix resulting from a first expansion operation.

FIG. 38 is an example of a first matrix 3800 resulting from a first expansion operation. The first expansion operation may referred to herein as the "liaise matrix operator." Using the first expansion operation, two matrices M and N, which, represent their adjacent digraphs M and N, are copied into the same, single matrix R (i.e., matrix 3800), without connecting any vertex from M to N, or vice versa. The first expansion operation is described by Eq. (15), in which M is an (m,m) matrix and N is an (n,n) matrix. R is a matrix of size (r, r) with r=m+n. If i is a row index and j is a column index, as above, and with i, j∈N+, and $1 \leq i \leq r$ and $1 \leq j \leq r$, then the first expansion operation defines the "liaison" of M by N, denoted as R=M l N as follows:

Eq. (15)
$$r_{i,j} = m_{i,j} \mid (1 \leq i \leq m) \wedge (1 \leq j \leq m) \quad (1)$$
$$n_{i-m, j-m} \mid (m < i \leq r) \wedge (m < j \leq r) \quad (2)$$
$$0 \mid \text{all other } i, j \quad (3)$$

In FIG. 38, expression (1) is a matrix portion 3802, expression (2) is a matrix portion 3804, and expression (3) is represented by remaining portions 3806 of the matrix 3800 being set to the value "0." In Eq. (15), expression (1) copies M into R, while expression (2) copies N into R.

Figure 39:
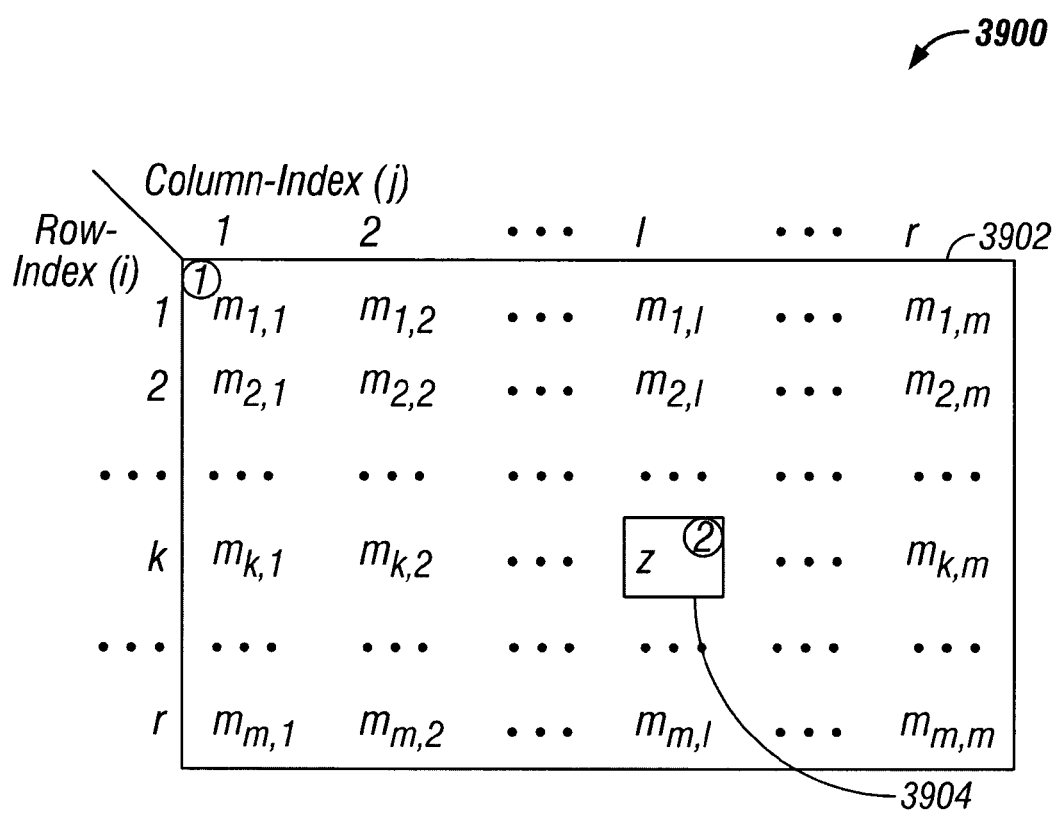

FIG. 39 is an example of a second matrix 3900 resulting from a second expansion operation. The second expansion operation may referred to herein as the "link vertices operator." Using the second expansion operation, values of the matrix R (i.e., matrix 3900) are modified to reflect the building (or removal) of arcs (i.e., dependencies) between vertices.

The second expansion operation, when adding new links, does not generally consider insertion of any additional coordinating vertices. As a result; the resulting matrix (i.e., modification of R) may represent an invalid workflow M, since regular tasks now also have to act as coordination tasks.

The second expansion operation is represented by Eq. (16), in which R is a matrix of size (r, r) with r=m, and the operation establishes or removes an arc from vertex "k" to vertex "l" in M. In the context of Eq. (16), "k" is an index of a row in M, and "l" is an index of a column in M, with k, l∈N+, $1 \leq k$ and $1 \leq m$. Also, z is a discriminator, such that z=1 expresses that an arc is established, or when z=0, that an arc is being removed.

Thus, the k,l-linking of M, denoted as R=M lv (k, l) z can be defined in Eq. (16) as:

Eq. (16)
$$r_{i,j} = m_{i,j} \mid (1 \leq i \leq m) \wedge (1 \leq j \leq m) \wedge (i \neq k) \wedge (j \neq 1) \quad (1)$$
$$z \mid (i = k) \wedge (j = 1) \quad (2)$$

In FIG. 39, expression (1) is a matrix portion 3902, and expression (2) is a matrix portion 3904. Expression (1) copies all elements of M into R, except at the index k, l, while expression (2) establishes or removes the link from k to l.

Figure 40:
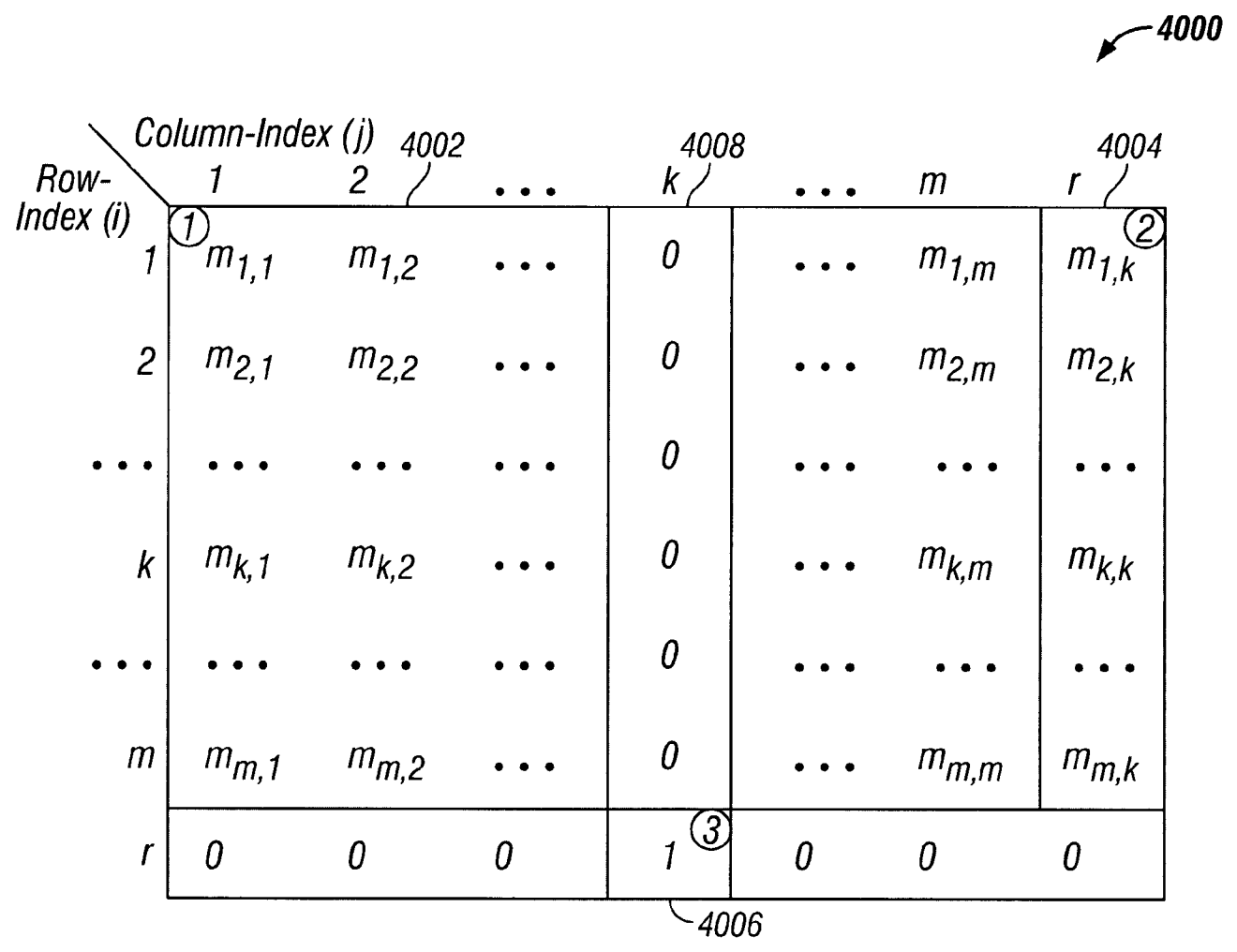

FIG. 40 is an example of a third matrix 4000 resulting from a third expansion operation. The third expansion operation may referred to herein as the "insert vertex before operator." The third expansion operation inserts a new vertex $v_n$ before a given vertex $v_g$, builds an arc from $v_n$ to $v_g$, and assigns all incoming arcs from $v_g$ to $v_n$. This third expansion operation reconciles M by adding a vertex of type AND join before every vertex of type Activity that has more than one incoming arc.

The third expansion operation is represented by Eq. (17), in which matrix R (i.e., matrix 4000) is now of size (r, r), but with r=m+1. In this context, "k" is now the index of a row in M, with k ∈ N+ and $1 \leq k \leq m$. With these notations, the "k-insertionBefore" of M, abbreviated as R=M ivb (k) is shown in Eq. (17) as:

Eq. (17)
$$r_{i,j} = m_{i,j} \mid (1 \leq i \leq m) \wedge (1 \leq j \leq m)) \wedge (j \neq k) \quad (1)$$
$$m_{i,k} \mid (1 \leq i \leq m) \wedge (j = r) \quad (2)$$
$$1 \mid (i = r) \wedge (j = k) \quad (3)$$
$$0 \mid \text{all other } i, j \quad (4)$$

In FIG. 40, expression (1) is a matrix portion 4002, expression (2) is a matrix portion 4004, expression (3) is a matrix portion 4006, and expression (4) is represented by remaining portions 4008 of the matrix 4000 being set to the value "0." In Eq. (17), expression (1) copies all elements of M into R, except for column k, while expression (2) moves the incoming arcs from $v_k$ to $v_r$. Expression (3) connects $v_r$ to $v_k$.

FIG. 41 is an example of a fourth matrix 4100 resulting from a fourth expansion operation. The fourth expansion operation may referred to herein as the "insert vertex after operator." This operation inserts a new vertex $v_n$ after a given vertex $v_g$, builds an arc from $v_g$ to $v_n$, and assigns all outgoing arcs from $v_g$ to $v_r$. In other words, the fourth expansion operation reconciles the matrix M by adding a vertex of type AND-split after every vertex of type Activity that has more than one outgoing arc.

The fourth expansion operation is represented by Eq. (18), in which matrix R (i.e., matrix 4100) is a matrix of size (r, r) with r=m+1. Here, "k" represents an index of a row in M, with k∈N+, and 1≤k≤m. With these notations, the "k-insertion-After" of M, abbreviated as R=M iva (k), is defined by Eq. (18) as Eq. (18)

$$r_{i,j} = m_{i,j} \mid (1 \leq i \leq m) \wedge (1 \leq j \leq m)) \wedge (i \neq k) \quad (1)$$

$$m_{k,j} \mid (i = r) \wedge (1 \leq j \leq m) \quad (2)$$

$$1 \mid (i = k) \wedge (j = 0) \quad (3)$$

$$0 \mid \text{all other } i, j \quad (4)$$

In FIG. 41, expression (1) is a matrix portion 4102, expression (2) is a matrix portion 4104, expression (3) is a matrix portion 4106, and expression (4) is represented by remaining portions 4108 of the matrix 4100 being set to the value "0." In Eq. (18), expression (1) copies all elements of M into R, except for row k, while expression (2) moves the outgoing arcs from $v_k$ to $v_r$, and expression (3) connects $v_k$ to $v_r$.

In the above, all four of the expansion operations may be performed electronically. Alternatively, one or more of the operations may be performed manually. For example, the first, third and fourth expansion operations may be conducted electronically, while a human operator contributes to the second expansion operation by providing input about a desired order of a (collaborative) workflow. For example, the operator may define connection rules in an abstract model, such as a coalition workflow in the above three-tier workflow model of Section I.

The following discussion provides an example of an expansion operation using the above operations. More specifically, the example is performed on the workflow(s) described above with respect to FIGS. 36 and 37, in which a first workflow K has three sequential tasks k1 3602, k2 3604, and k3 3606, and a workflow L has three sequential tasks l1 3608, l2 3610; and l3 3612. The tasks are to be joined in the manner described in FIG. 37.

In this case, a first expansion operation includes the liaise matrix operator defined above as R=KIL. In other words, K and L are joined into a new matrix R. The second expansion operation is a series of uses of the link vertices operation, lv, to modify the new matrix R. Specifically, R_=Rlv(k₁, l₁) 1, followed by R₂_=R_lv(l₂, k₃)1, followed by R₃_=R₂_lv(k₃, l₃) 1. In these operations, the tasks are linked as described, without the benefit of route tasks.

Next, the third expansion operation inserts vertices before tasks, as needed (i.e., inserts the AND-join task k5 3708 and the AND-join task l6 3710), with the operations R₄_=R₃_ivb (k₃), followed by R₅_=R₄_ivb(l₃).

Finally, the fourth expansion operation inserts vertices after tasks, as needed (i.e., inserts the AND-split task k4 3702 and the AND-split task 3706), with the operations R₆_=R₅_ iva(k₁), followed by R₇_=R₆_iva(l₂).

As discussed above, the inverse of the expansion operation is the reduction operation. Reduction allows a joined workflow to be separated into sub-parts, so that individual members of the coalition may implement them, for example, in their respective workflow views. Formally, reduction separates one or more vertices from a workflow, and re-links the dependencies that formerly referred to/from a vertex to the vertex's neighbors. In the following notation, e(K) may be considered the expansion of a workflow K, and r(K) is the reduction of K. Since the two operations are inverses of one another, then, for each expansion of K there is a reduction such that r(e(K))=K and vice versa e(r(K))=K.

The reduction operation is discussed below with reference to a matrix M of an associated digraph of order "m," which is "reduced" (decomposed) into a set of smaller digraphs $R_g$ with {g∈N+|2≤g≤m}.

The following two condition should be satisfied: first, $R_g$ is assumed to be a valid digraph, and, second, that vertices from M can be reduced into the same $R_g$ only when these vertices are connected, i.e., when there is a walk between these vertices, or when they are part of a v-structure.

Figure 42:
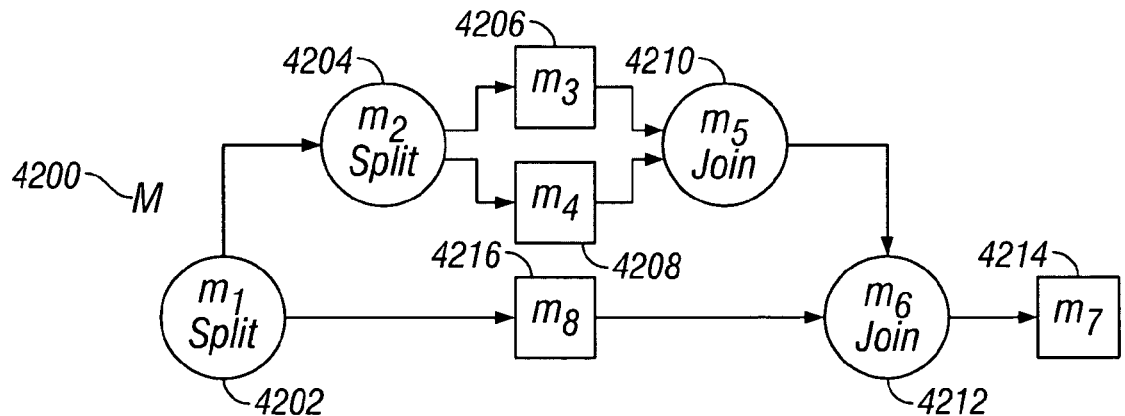
FIGS. 42A-42D are digraphs illustrating valid and invalid results of a reduction operation.

FIG. 42 is a sample digraph used to illustrate the operation of reduction. FIGS. 42A-42D are digraphs illustrating valid and invalid results of a reduction operation. In FIG. 42, a digraph M 4200 includes a split task m1 4202, a split task m2 4204, an activity task m3 4206, an activity task m4 4208, a join task m5 4210, a join task m6 4212, an activity task m7 4214, and an activity task m8 4216.

Figure 42A:
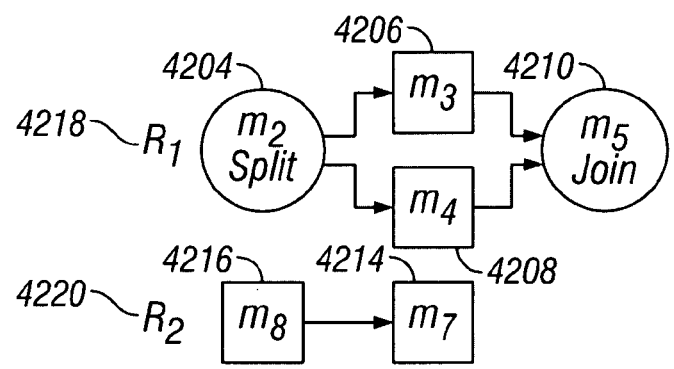

FIG. 42A illustrates a valid reduction of digraph M 4200. Reduction, as discussed in more detail below, involves the removal of route tasks that become obsolete as a result of the reduction operation. In FIG. 42A, a first reduced digraph R1 4218 includes the split task m2 4204, the activity task m3 4206, the activity task m4 4208, and the join task m5 4210, while a second reduced digraph R2 4220 includes the activity task m8 4216 and the activity task m7 4214.

Figure 42B:
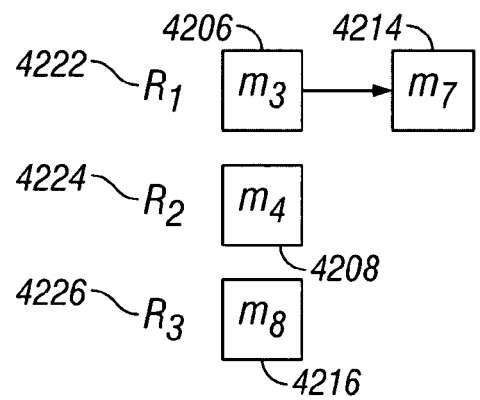

FIG. 42B illustrates a valid reduction of digraph M 4200. In FIG. 42B, a first reduced digraphs R1 4222 includes the activity task m3 4206 and the activity task m7 4214, while the second reduced digraph R2 4224 includes the activity task m4 4208, and the third reduced digraph R3 4226 includes the activity task m8 4216.

Figure 42C:
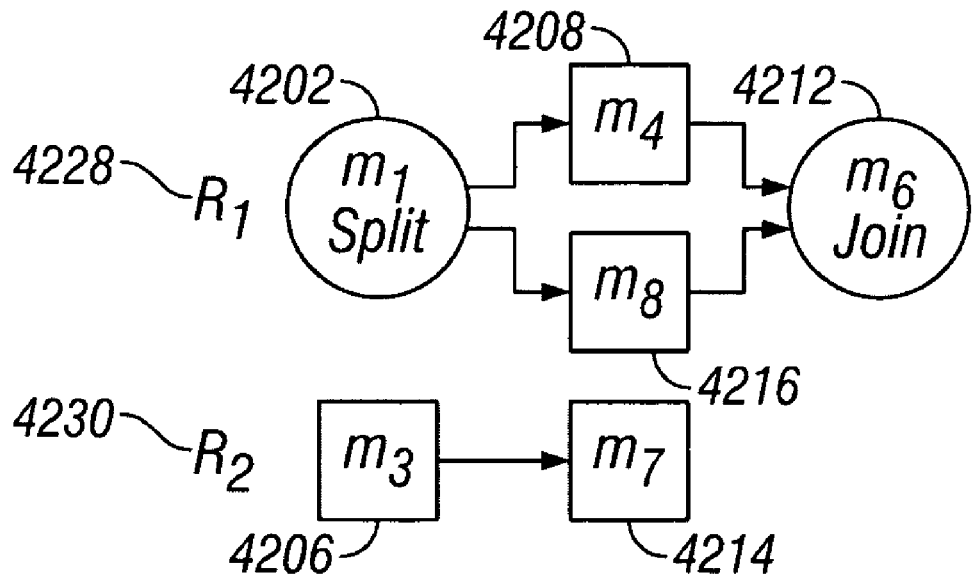

FIG. 42C illustrates a valid reduction of digraph M 4200. In FIG. 42C, a first reduced digraph R1 4228 includes the split task m1 4202, the activity task m4 4208, the activity task m8 4216, and the join task m6 4212, while the second reduced digraph R2 4230 includes the activity task m3 4206 and the activity task m7 4214.

Figure 42D:
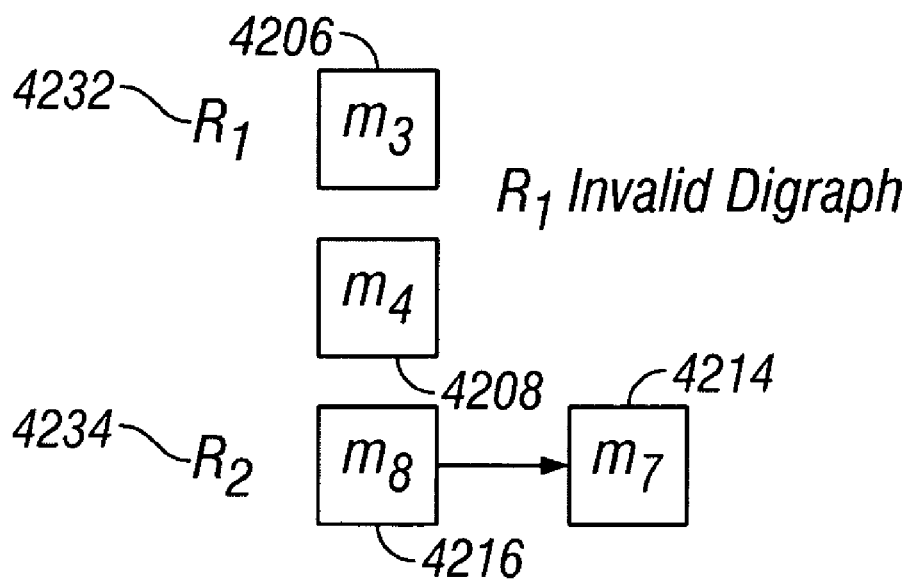

FIG. 42D illustrates an invalid reduction of digraph M 4200. In FIG. 42D, a first reduced digraph R1 4232 includes the activity task m3 4206 and the activity task m4 4208, while the second reduced digraph R2 includes the activity task m8 4216 and the activity task m7 4214.

In FIGS. 42A-42C, all reduced digraphs adhere to the two conditions set forth above; i.e., they are valid digraphs, and are either connected and/or part of a valid v-structure. In contrast, in the invalidly-reduced digraph R1 4232 of FIG. 42D, activity task m3 4206 and activity task m4 4208 violate the condition of connectivity, since there is no dependency therebetween.

FIG. 43 is a matrix 4300 that is an example of a reduction operator. Matrix 4300 is described by Eq. (19), in which M is an (m,m) matrix, and R is a matrix of size (r,r,), with r=m−1. If i is a row index and j is a column index, and assuming i, j∈N+ and 1≤i, j≤r, then the "k-reduction of M" is denoted as R=M r(k), as described in Eq. (19):

Eq. 19

$$r_{i,j} = (m_{i,j} \mid (1 \le i < k) \land (1 \le j < k)) \lor m_{k,j} \mid (m_{k,j} = 1) \land (m_{i,k} = 1) \quad (1)$$

$$(m_{i,j+l} \mid (1 \le i < k) \land (k \le j < r)) \lor m_{k,j+1} \mid (m_{k,j+1} = 1) \land (m_{i,k} = 1) \quad (2)$$

$$(m_{i+l,j} \mid (k \le i < r) \land (1 \le j < r)) \lor m_{k,j} \mid (m_{k,j} = 1) \land (m_{i+1,k} = 1) \quad (3)$$

$$(m_{i+1,j+l} \mid (k \le i < r) \land (k \le j < r)) \lor m_{k,j+1} \mid (m_{k,j+1} = 1) \land (m_{i+1,k} = 1) \quad (4)$$

In FIG. 43, expression (1) is a matrix portion 4302, expression (2) is a matrix portion 4304, expression (3) is a matrix portion 4306, and expression (4) is a matrix portion 4308. Expressions (1) to (4) copy elements from M into R, omitting the elements from row and column k in M. An OR-combination with $m_{k,j}$ ($m_{k,j}$ respectively, not shown in FIG. 43) connects the arcs that were adjacent to vertex $v_k$ in M to the neighbors of $v_k$. The logic in the above operation is such that when $m_{i,k}=1$, then this means that $v_i$ precedes $v_k$. Similarly, when $m_{k,j}=1$, then this means that $v_j$ follows $v_k$.

By then setting $m_{i,j}=m_{i,k}=m_{k,j}=m_{k,j}=1$ in R, this connects $v_i$ to $v_j$, which is performed in Eq. (19) under consideration of the respective ranges of the indexes i and j.

Thus, the approach of Eq. (19) is to connect all arcs that are adjacent to the vertex $v_k$ to the neighbors of $v_k$, and then delete $v_k$ and its connecting arcs from M. To obtain the various reduction digraphs Rx from M (e.g., see FIG. 42) the operation of reduction is repeatedly applied to M, in order to delete all vertices that are considered to not be elements of Rx.

Applying Eq. (19) to FIG. 42A above, for example, digraph R1 4218 is computed as $R_1$=Mr(1) r(8) r(6) r(7), while R2 4220 is computed as $R_2$=Mr(1) r(2) r(3) r(4) r(5) r(6). In FIG. 42B, digraph R1 4222 is computed as $R_1$=Mr(1) r(2) r(4) r(5) r(6) r(8), while R2 4224 is computed as $R_2$=Mr(1) r(2) r(3) r(5) r(6) r(7) r(8), and R3 4226 is computed as $R_3$=Mr(1) r(2) r(3) r(4) r(5) r(6) r(7).

In conclusion, Section III above presents a variety of techniques to combine multiple workflows into a single workflow, as well as techniques to extract multiple workflows from a single workflow. The techniques can be used, for example, to combine workflows from multiple partners wishing to work together. More specifically, the techniques can be used in the three-tier workflow model of Section I, to combine a plurality of workflow views of partners into a single collaborative workflow, and to divide the collaborative workflows into sub-subworkflows, for assignment to members of the coalition.

Section IV

Section I above describes a three-tier workflow model for collaborative workflows. Sections II and III describe techniques which, among other uses, are useful for implementing the three-tier workflow model of FIG. 1. Section IV presents a description of why these models and techniques are useful and/or necessary in implementing collaborative workflows, as well as a taxonomy for describing collaborative workflows.

In considering collaborative workflows, it is possible to conclude that such workflows include only simple nested interactions. For example, workflow A starts workflow B; workflow A waits until B completes, and then commences its own operation.

A second hypothesis is that collaborative business process interactions may be as complex as interactions within a single workflow. For example, workflow A may interact with workflow B (and vice versa) during multiple occasions, and/or perhaps a third or more workflows are involved. The second hypothesis is assumed in Sections I, II, and III above.

In considering this hypothesis, various market models are described below. For example, Electronic Marketplaces, or E-Marketplaces, are increasingly the medium of choice when businesses interact with each other, with their partners and customers. Unlike classical peer-to-peer trade between businesses, E-Marketplaces act as mediators between trading partners. Vertical marketplaces bring together domain-specific demand and supply, while horizontal E-Marketplaces span multiple domains, thus offering a wider spectrum of goods, although usually not as specific.

One thing to consider about collaborative workflows is their interaction granularity. Generally, simple, coarse-grained interactions will have a simple realisation, while complex, fine-grained interactions require a closer look and (possibly) a more sophisticated solution.

Figure 44:
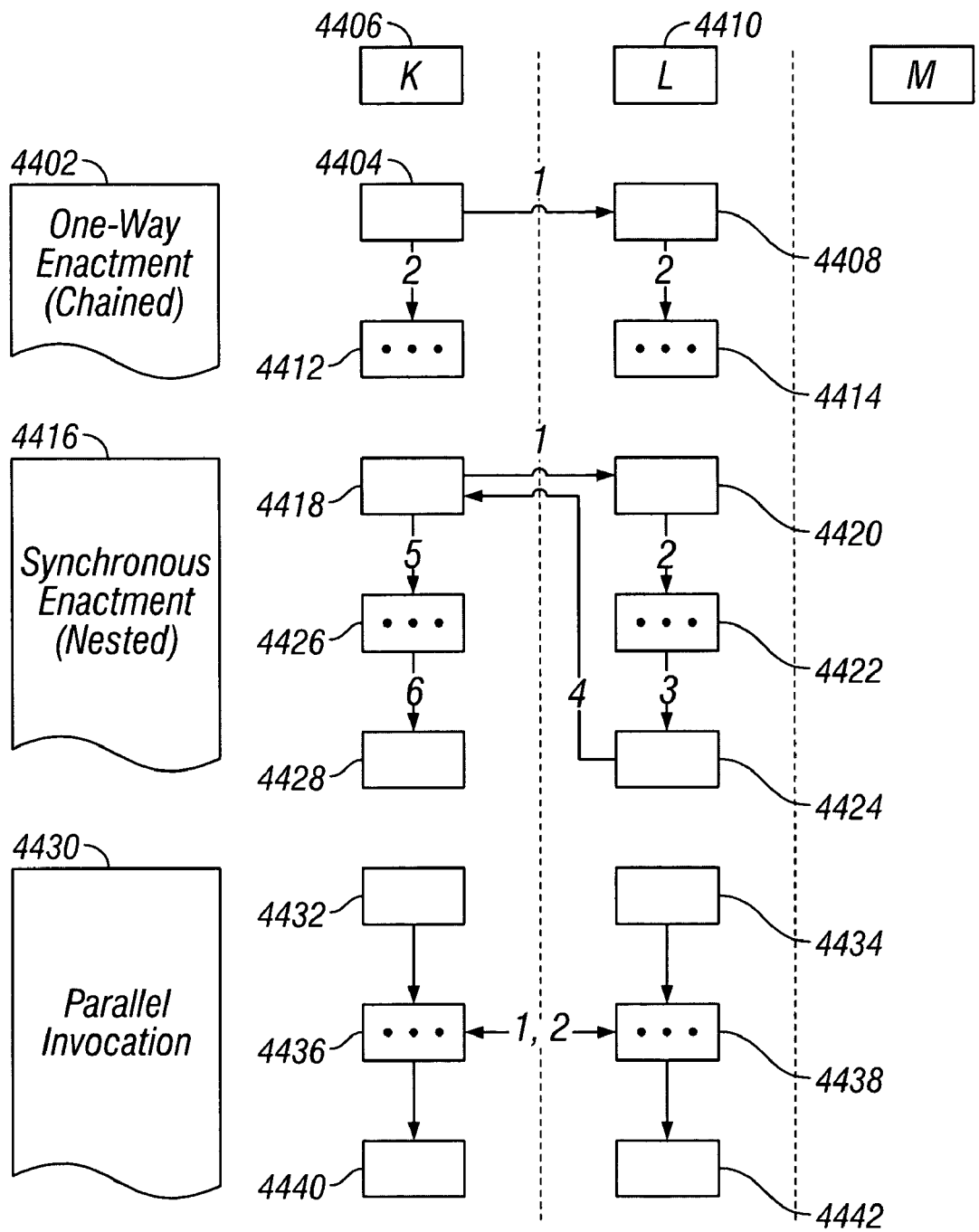
FIG. 44 is a block diagram of three aspects of workflow interoperability.

FIG. 44 is a block diagram of three aspects of workflow interoperability. In FIG. 44, a first workflow aspect is a chained enactment 4402, in which a workflow instance 4404 of workflow K 4406 enacted on workflow Engine A triggers the creation and enactment of a workflow instance 4408 of workflow L 4410 on Workflow Engine B, and, once enacted, both workflow instances carry on their operation (i.e., enact a task 4412 and a task 4414) without further synchronisation.

A second workflow aspect is a synchronous enactment 4416, in which a workflow instance 4418 triggers the creation and enactment of a workflow instance 4420, and then waits for its completion/termination (e.g., completion of a task 4422 and a task 4424) before it resumes its own operation (i.e., finishes a task 4426 and a task 4428).

A third workflow aspect is a parallel invocation 4430, in which two workflow engines simultaneously execute workflow instances 4432 and 4434 of workflows 4406 and 4410, respectively. The workflow definitions specify a point (i.e., tasks 4436 and 4438) at which the workflow instances rendezvous. In other words, one workflow engine waits for the other to achieve the rendezvous point. There is interchange of information between the workflow engines at this point, and then the workflows continue in tasks 4440 and 4442.

These three aspects of workflow interoperability cane be distinguished according to their requirement(s) to enact new workflow instances, as is the case in the chained enactment 4402 and the nested enactment 4412, or to invoke existing workflow instances as in the case of the parallel invocation 4430.

Another categorization is according to the return control flow. That is, while the chained enactment 4402 generally includes only a uni-directional communication; the nested enactment 4416 and the parallel invocation 4430 are bi-directional, and therefore include a return control flow to the invoker.

From these interoperability aspects, the parallel-synchronised model is of particular interest, because it requires a mechanism of identifying the communication partner (which is a workflow instance) without creating it.

Further details regarding a taxonomy of collaborative workflows include the following terminology. First, the term enactment is used to mean that a new workflow instance is created from an existing workflow schema, while the term invocation refers to communication with an existing workflow instance. The differentiation is significant, as the first requires information about an existing workflow schema, while the latter requires precise information on which particular instance out of a possibly large set of instances that have been instantiated from a workflow schema is the information recipient.

A request-to-task ratio ($r_t$) quantifies how many request are necessary to commence a task. Thus, $_{rt}$ is defined as: $r_t=(n_r/n_t)$, with $n_r$ being the number of requests and $n_t$ the number of tasks. There may be one request to perform a task ($r_t=1$), or multiple requests ($r_t>1$). For $r_t<1$, a task is executed without request, i.e. in the case of an automatically scheduled tasks. Thus, $r_t$ can be considered a message correlation indicator for task execution.

If a request is followed by a response then this is considered a two-way communication (request with response). If the request is not followed by a response, then this is one-way communication (request without response). These expressions do not express when the response occurs, i.e. immediately or in the far future.

Interdependency is considered from the perspective of a task in a workflow. In a synchronous communication, the sending task waits for the receiving task to return with a result before it commences operation, which is called task-synchronous. In asynchronous communication, in contrast, the sending task continues its operation while the receiving task operates, which is called task-asynchronous. In the context of workflows, once a workflow communicates with another workflow and receives a response for which it has to wait at some point in time, then this is considered as workflow-synchronous communication. If the workflow does not receive a response, or it does not have to wait for it, then this is considered a workflow-asynchronous communication.

With respect to ownership of messages, when a request from requester A to receiver B is followed by a response from B to A, then B acts on its own behalf. B is considered the owner of the response, and acts on its own behalf. If, however B replies to A through C, then B delegates its response to C. Then, C is a delegate of the response. The distinction is relevant, as C has to have some knowledge about A without having had prior interaction.

A request-to-response ratio ($r_r$) quantifies a number of requests in relation to the responses that result from this request. This parameter is defined as $r_r=(n_r/n_s)$, with $n_r$ being the number of requests, and $n_s$ being the number of responses. For $r_r=1$, one request is followed by one response. For $r_r<1$, one request is followed by multiple responses. For $r_r>1$, multiple request are followed by one response. In both of the latter cases, the multiple messages will typically be correlated, possibly across multiple sending or receiving tasks. Not correlating them may result in multiple execution of the following task. When no response is received, $r_r$ is not defined.

The above terminology is used below in various examples, referring to workflow instances K, L, and M. In a first example, an invocation from K to L is followed by a response from L to K. This interdependency is task-synchronous; L is the owner of the response to K and $r_t=1$ and $r_r=1$.

In a second example, K invokes L synchronously. L invokes M asynchronously, and L and M reply back to K. Thus, L delegated its response to M, while preserving the right to act on its own behalf. The request-to-response ratio is therefore $r_r=\frac{1}{2}$.

In a third example, the chained pattern of interoperability 4402 can be expressed as: task-asynchronous enactment, $r_t=1$, request without response.

In a fourth example, the nested pattern of interoperability 4416 can be expressed as: enactment, task-synchronous (sender), task-asynchronous(receiver), $r_t=1$, request with response, on-own-behalf, $r_r=1$.

In a fifth example, the parallel-synchronized pattern of interoperability 4430 can be expressed as: task-synchronous invocation, $r_t=1$, request with response, on-own-behalf, and $r_r=1$.

The structures of these interoperability aspects can be modeled by directed graphs, as discussed above in Sections II and III.

Figure 45:
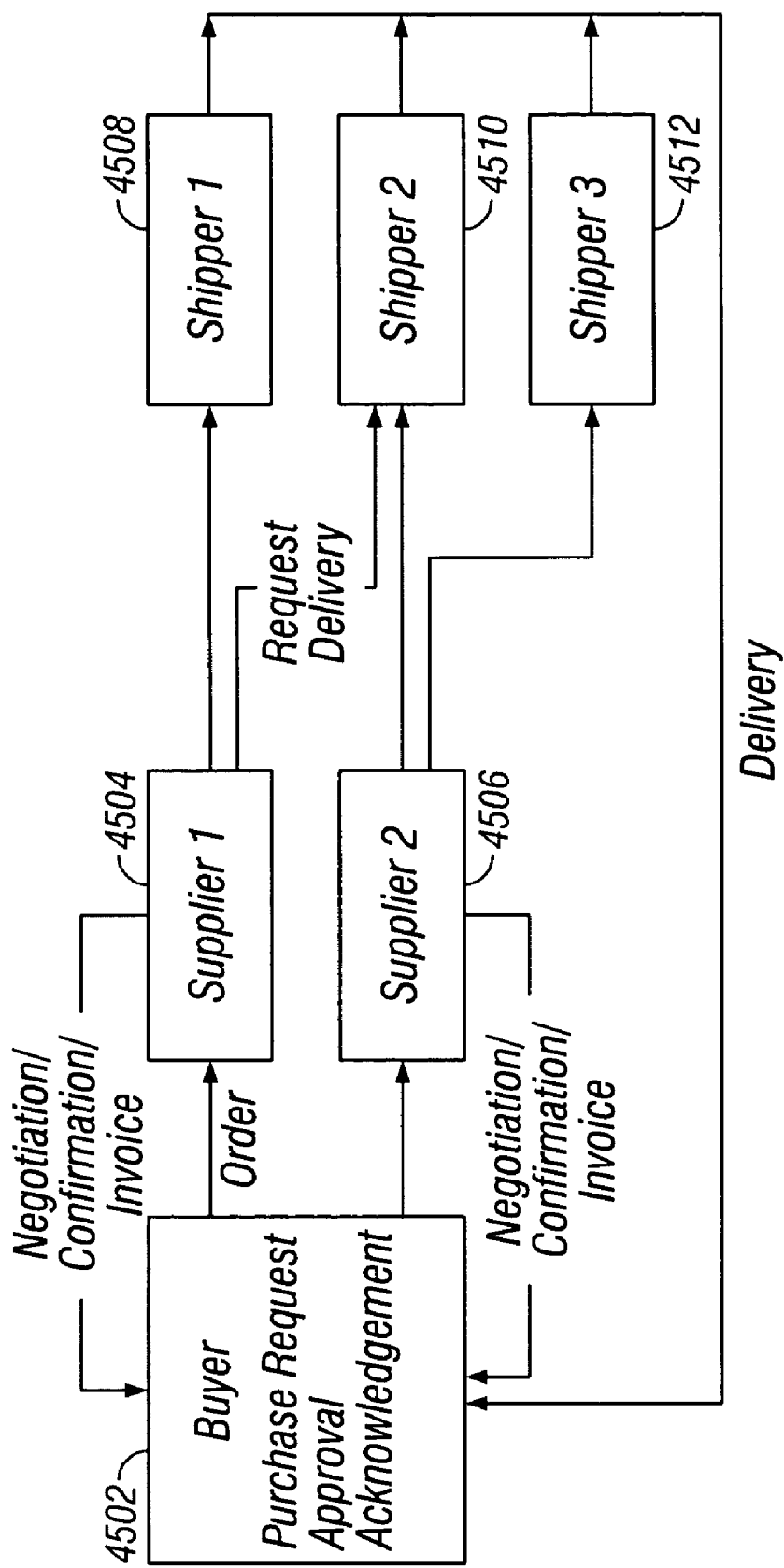
FIG. 45 is a block diagram of a corporate procurement process (CPP).

FIG. 45 is a block diagram of a corporate procurement process (CPP). In FIG. 45, it is assumed that a Buyer 4502 wants to buy a number of different goods. A first supplier 4504 and a second supplier 4506 are available to supply the goods, and a first shipper 4508, a second shipper 4510, and a third shipper 4512 are available to ship the goods from one or both of the suppliers 4504 and 4506 to the buyer 4502.

Figure 46:
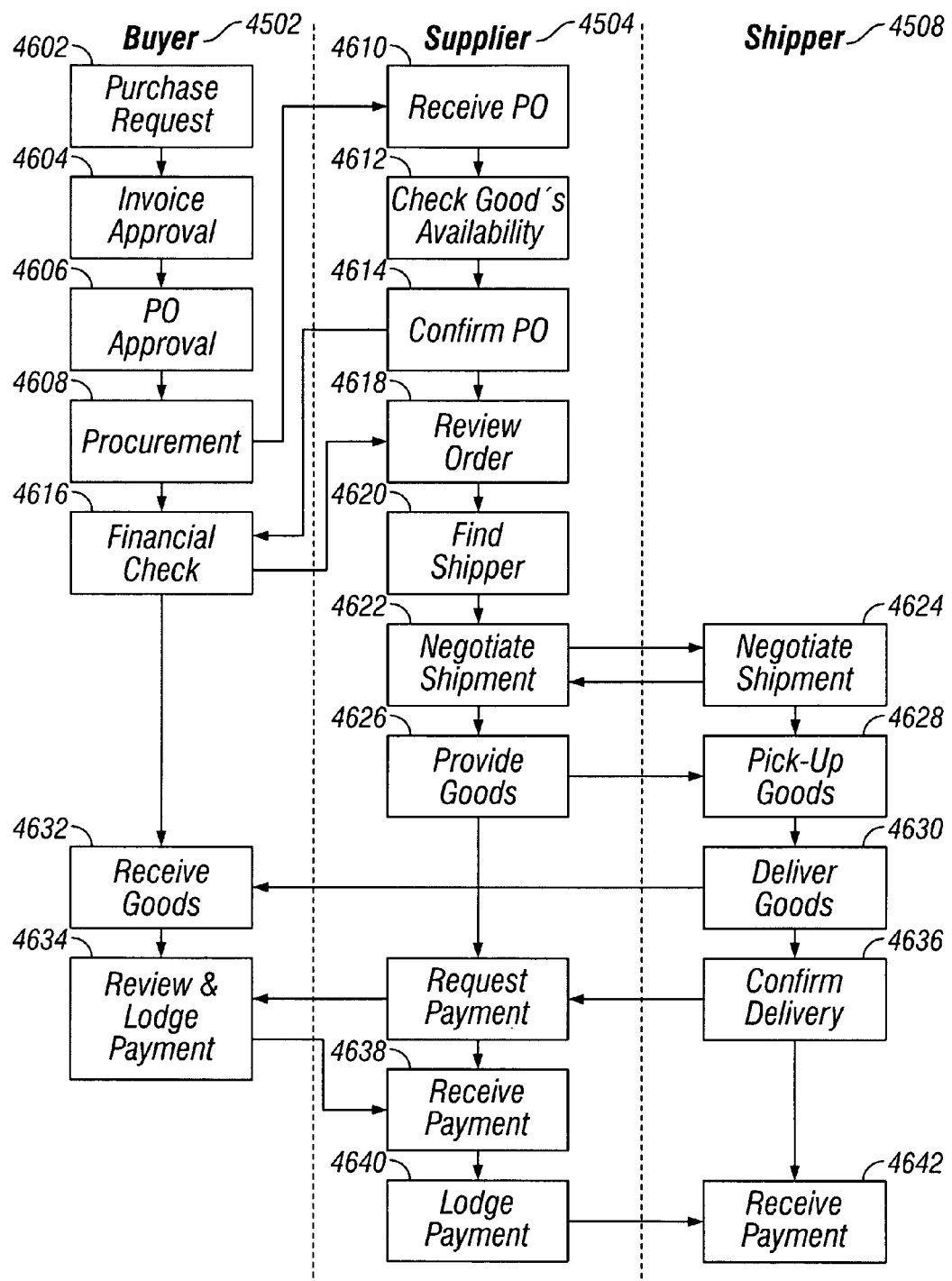
FIG. 46 is a block diagram of a collaborative workflow.

FIG. 46 is a block diagram of a collaborative workflow. In FIG. 46, the buyer 4502, the first supplier 4504, and the first shipper 4508 are interacting to transport a good from the supplier 4504 to the buyer 4502.

In FIG. 46, a user inside the Buyer 4502 queries a marketplace for goods of their need. Specifically, the user requests a purchase (Purchase Request 4602) through a procurement application that checks the procurement policies at the Buyer 4502, identifies the supplier 4504 and finally approves or disapproves the procurement request (Invoice Approval 4604). Upon confirmation, an operator approves the actual purchase order (PO Approval 4606), and the process of procurement begins (Procurement 4608)

Next, the supplier 4504 receives the purchase order (Receive PO 4610), checks availability of the ordered good (Check Good's Availability 4612), and confirms the purchase order (Confirm PO). The supplier 4504 then receives a financial check from the buyer 4502 (Financial check 4616), and reviews a current status of the order internally (ReviewOrder 4618).

The supplier 4504 searches for a transportation service in the marketplace (Find Shipper 4620), based on the local availability (time/date/place), the volume and weight of the goods to be transported and other service parameters. When the Supplier 4504 has found shipper 4508, he requests the shipment service and negotiates the shipment details with him (Negotiate Shipment 4622, 2624). In this case, supplier provides the goods (provide goods 4626), and shipper 4508 picks up the goods from the supplier's warehouse (Pick-up Goods 4628) and delivers them to the Buyer (Deliver Goods 4630, Receive Goods 4632).

At this point, the buyer 4502 reviews the order and pays (Review & Lodge Payment 4634), while the shipper 4508 confirms delivery to the supplier 4504 (Confirm Delivery 4636). Finally, the supplier 4504 receives the payment from the buyer 4502 (Receive Payment 4638), provides payment to the shipper 4508 (Lodge Payment 4640), and the shipper 4508 receives payment (Receive payment 4642).

FIG. 46 demonstrates how the procurement process of a buyer can be extended to span multiple companies, i.e. buyer 4502, supplier 4504 and 4506, shipper 4508, 4510, and 4512. Each of the participants has their internal business process that are of different complexity, which means that the internal business process of the buyer 4502 is fairly complex to the business process of the shipper 4504 for example. Both the buyer 4502 and the suppliers 4504, 4506 need to find services during the execution of the overall procurement business process; i.e., the buyer 4502 needs to find suppliers 4505, 4506, and the suppliers 4504, 4506 need to find shippers 4508, 4510, 4512. The buyer 4502 is a service consumer, suppliers 4504, 4506 are service consumers and providers; and shippers 4508, 4510, 4512 are service providers.

It should be understood that the large number of potential exceptions to the above-described process implies that collaborative workflows should be interactive and flexible. For example, the first supplier 4504 may not have a particular good available, and the process may have to change the supplier and re-check availability. Also, the delivery of a good may be delayed, so that a new merge location for delivery that is close to the buyer 4502 may be necessary. As another example, the assembly of the good may be delayed due to a defect in material, so that the buyer 4502 may have to request a change, e.g. another good, changed delivery date, or new delivery address. As a final example, transportation of the good may be constrained by delay of truck due to weather or traffic, or there may be delays because of missing documents.

Table 7 sets forth interoperability aspects of the scenario of FIG. 45.

TABLE 7

| Aspects of Interoperability | Control Flow |
| --- | --- |
| Buyer$_{Procurement}$ <br> Supplier$_{Check\ Good's\ Availability}$ <br> Supplier$_{ConfirmPO}$ <br> Buyer$_{FinancialCheck}$ | Enactment, $r_i = 1$, request with response asynchronous, on-own-behalf, $r_r = 1$ |
| Buyer$_{FinancialCheck}$ <br> Supplier$_{Review\ Order}$ <br> Shipper$_{Deliver\ Goods}$ <br> Buyer$_{Receive\ Goods}$ | Invocation, $r_1 = 1$, request with delegated response, task-asynchronous (Buyer$_{Financial\ Check}$), $r_r = 1$ |
| Buyer$_{Procurement}$ <br> Supplier$_{Review\ Order}$ <br> Shipper$_{Deliver\ Goods}$ <br> Buyer$_{Receive\ Goods}$ <br> Shipper$_{Confirm\ Delivery}$ <br> Supplier$_{Request\ Payment}$ <br> Buyer$_{Review\&Lodge\ Payment}$ | Invocation, $r_1 = 1$, request with on-own behalf and delegated responses, task-asynchronous (Buyer$_{Financial\ Check}$), $r_r = 1:2$ |
| Supplier$_{Negotiate\ Shipment}$ <br> Shipper$_{Negotiate\ Shipment}$ | Enactment, $r_i = 1$, task-asynchronous with response, on-own-behalf $r_r = 1$ |
| Supplier$_{Provide\ Goods}$ <br> Shipper$_{Provide\ Goods}$ <br> Shipper$_{Confirm\ Delivery}$ <br> Supplier$_{Request\ Payment}$ | Invocation, $r_i = 1$, task-asynchronous with response, on-own-behalf $r_r = 1$ |
| Buyer$_{Review\&Lodge\ Payment}$ <br> Seller$_{Receive\ Payment}$ | Enactment, $r_i = 1$, task-asynchronous without response |
| Supplier$_{Lodge\ Payment}$ <br> Shipper$_{Receive\ Payment}$ | Enactment, $r_i = 1$, task-asynchronous request without response |

Section V

As discussed above, workflows from one or more entities may be abstracted into a set of workflow views (i.e., virtual workflows), and these workflow views may be implemented, for example, in collaboration with corresponding workflow views of other entities. With respect to a particular one of the entities, however, both of the workflow and associated workflow view may be executed within, or in association with, a workflow engine such as the workflow engine 410 of FIG. 4.

That is, the workflow engine 410, as discussed above, performs its duties of, for example, ensuring an order and timing of task execution for both the (actual) tasks of the workflow and the (virtual) view tasks of the workflow view. More specifically, such an executing workflow engine supports the concurrent execution of the tasks and view tasks, while being aware of the dependencies therebetween. This awareness is useful in, for example, enabling communication and synchronization between the tasks and view tasks.

Figure 47:
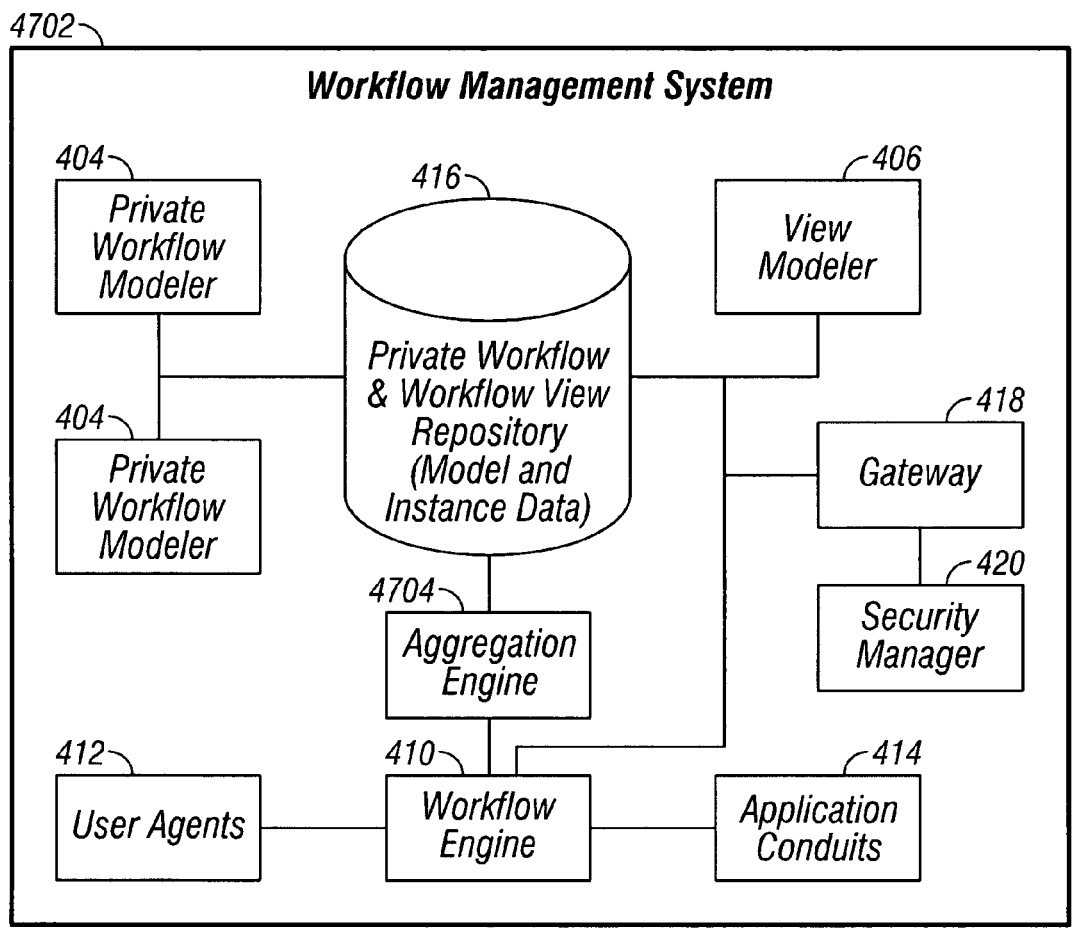
FIG. 47 is a block diagram of a workflow management system.

FIG. 47 is a block diagram of a workflow management system 4702. The workflow management system 4702 is similar in many respects to the workflow management system 402 of FIG. 4. The workflow management system 4702, however, additionally includes an aggregation engine 4704, which is operable to compile a workflow and its associated workflow view into an aggregated workflow to be executed by the workflow engine 410.

Operations of the aggregation engine 4704 are discussed below with reference to various figures discussed herein. For example, as discussed above, FIG. 2 illustrates a specific example of an implementation of a three-tier workflow model, in which the workflow K 206 of the company B 202 is associated with the workflow view L 208 of the company 202. The workflow view L 208 is operating in collaboration with the workflow view P 212 of company A 204 (itself associated with the workflow O 210 of the company A 204).

In FIG. 2, the view task "production planning" 218 hides tasks "plan production" 214 and "approval" 216, so that the company A 204 may only interact with view task "production planning" 218 (i.e., interactions between company A 204 and the workflow K 206 are constrained in this sense). Nonetheless, company A 204 is assured of an awareness of a current state of task(s) "plan production"214 and task "approval" 216, e.g., that they are being executed. More specifically, as described above with reference to FIGS. 5-7, a correlation between an execution state of view task "production planning" 218 relative to task "plan production" 214 and task "approval" 216 is maintained through the use of state dependencies such as those set forth in Table 1, using, for example, the Petri-Net representations of FIGS. 5-7. Such state dependencies guard against, for example, view task "production planning" 218 being in a state "running" while task "plan production"214 is actually in a state "aborted."

Although such state dependencies ensure that states of view tasks correspond to states of associated tasks, they do not necessarily ensure that a workflow view will be executed in a workflow engine in full synchronization with its associated workflow. For example, for the workflow view L 208 to interact with the workflow view P 212, routing tasks are included within the two workflow views. It is possible that such routing tasks may upset synchronization between the workflow view L 208 and its associated workflow K 206.

For example, the workflow view L 208 includes the routing task "notification" 220 and the routing task "check response" 230, while the workflow view P includes the routing tasks "response" 228 and "request to assemble" 258. These tasks 220, 228, 230, and 258 are essentially an AND-split task, an AND-split task, an AND join task, and an AND join task, respectively (as shown in FIG. 3, and discussed in more detail below). The tasks 220, 228, 230, and 258 may be added as part of an expansion operation such as described above in Section III.

The routing tasks 220 and 230, however, do not have strict state dependencies with an associated task within the workflow K 206. As a result, the workflow view L 208 and the workflow K 206 may not remain fully synchronized. For example, there is the possibility that, during execution of the workflow view L 208 and the workflow K 206, the routing task "XOR split" 234 may begin before the workflow view (routing) task 230 has been completed. In the production processes of FIG. 2, this malfunction may mean that production of widgets begins (in tasks 236/238 or tasks 240/242)

before verification of a need for such widgets on the part of the company A 204 is made. Of course, such a situation could result in a meaningful loss of profit and/or wasteful use of resources with respect to company B 202.

Figure 48:
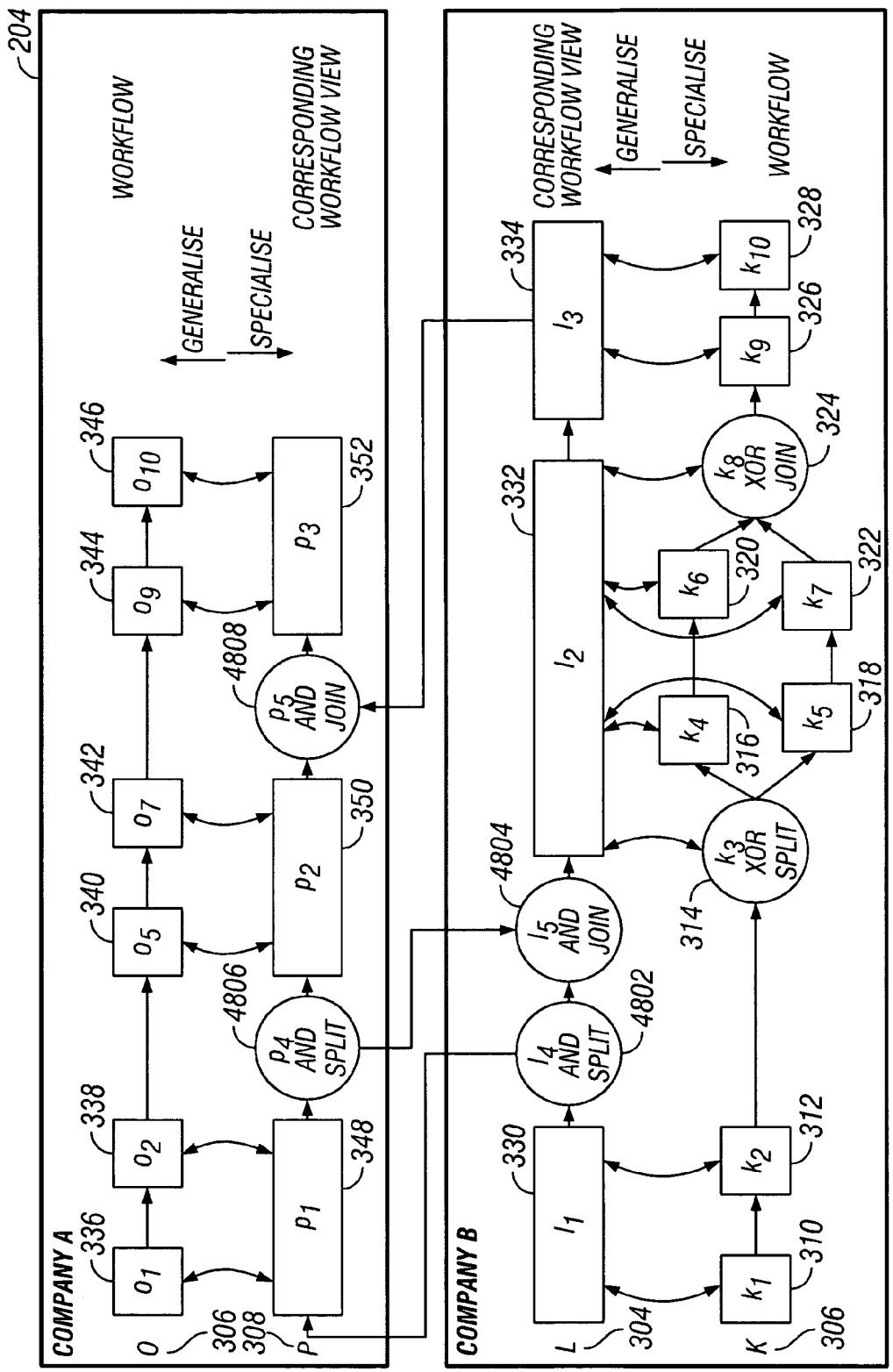
FIG. 48 is an illustration of a more generic example of the three-tiered workflow model of FIG. 2.

FIG. 48 is an illustration of a more generic example of the three-tiered workflow model of FIG. 2. More specifically, FIG. 47 illustrates the various production and routing tasks discussed above with respect to the workflows and workflow views of FIG. 2, but represents these tasks abstractly. In this regard, FIG. 47 is similar to FIG. 3, which, as explained above with respect to FIG. 3, includes an abstracted version of the workflow K 206, referred to as the workflow K 302, as well as an abstracted version of the workflow view L 208, referred to as the workflow view L 304.

In FIG. 3, the coalition workflow 354 is illustrated which incorporates any routing tasks added to the workflow view L 304 for collaborating with the workflow view P 308. However, in FIG. 48, routing tasks 220 and 230 of FIG. 2 are explicitly illustrated in their abstract forms as an AND-split task l4 4802 and an AND join task l5 4804, respectively. Similarly, routing tasks 228 and 258 are explicitly illustrated in their abstract forms as an AND split task p4 4806 and an AND join task p5 4808, respectively.

Figure 49:
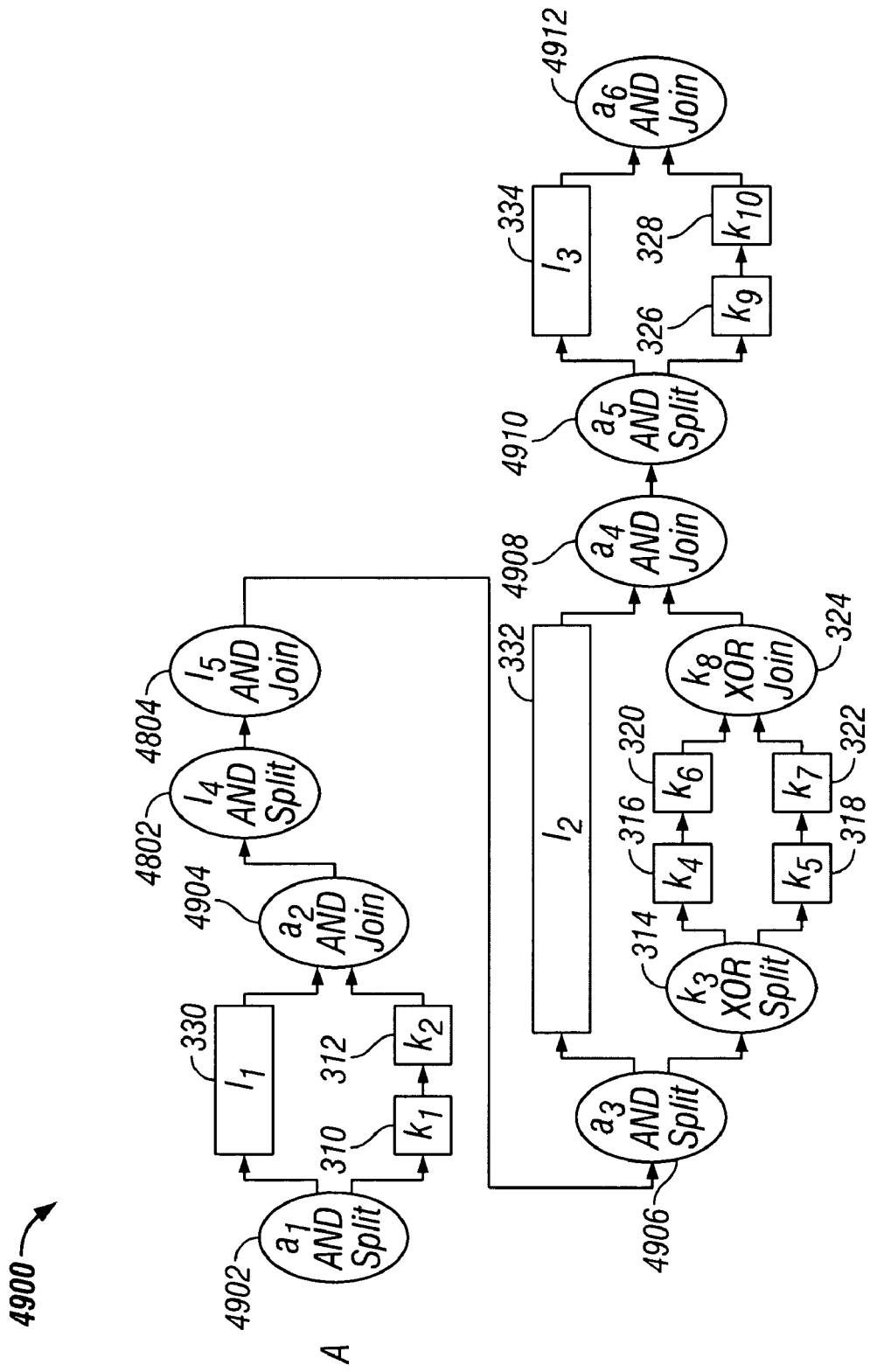
FIG. 49 is an illustration of an aggregate workflow.

FIG. 49 is an illustration of an aggregate workflow 4900. The aggregate workflow 4900, is designed to ensure that a workflow and its associated workflow view are executed in synchronization with one another. More specifically, the aggregate workflow 4900 is compiled from a workflow and its associated workflow view by the aggregation engine 4704, and is operable to support concurrent execution of the workflow and the workflow view within the workflow engine 410.

In the aggregate workflow 4900, an aggregating routing task a1 4902 is included, along with a corresponding aggregating routing task a2 4904. The aggregating routing tasks a1 4902 and a2 4904 bound the workflow view task l1 330 and its associated workflow tasks k1 310 and k2 312. As a result, the workflow view task l1 330 may not start before the task k1 310, and the aggregate workflow may not proceed beyond the aggregating routing task a2 4904 until both the workflow view task l1 330 and the workflow task k2 312 have completed.

Similarly, an aggregating routing task a3 4906 and an aggregating routing task a4 4908 are included which bound the workflow view task l2 332, as well as all of its associated workflow tasks k3 314, k4 316, k5 318, k6 320, k7 322, and k8 324. Finally, an aggregating routing task a5 4910 and an associated aggregating routing task a6 4912 are included which bound the workflow view task l3 334 and its associated workflow tasks k9 326 and k10 328.

Thus, the aggregate workflow 4900 prevents the potential problem discussed above, i.e., the possibility that the workflow task k3 314 will begin before the routing task 4804 (representing, for example, the routing task 230 of FIG. 2) has ended. This is because, as should be clear from FIG. 49, the routing task l5 4804 and the workflow task k3 314 are now arranged with respect to one another in a serial or consecutive fashion, rather than in a parallel fashion. That is, a beginning of the workflow task k3 314 is strictly dependent upon an ending of the routing task l5 4804.

Moreover, the aggregate workflow 4900 may be easily executed by the workflow engine 410. That is, the workflow engine 410 need not be modified to enact the aggregate workflow 4900. As a result, the workflow engine 410 may be considered to be a conventional workflow engine, apart from the ability to maintain an awareness of (e.g., state) relationships between workflow view tasks and their corresponding workflow tasks, as described herein and indicated by, for example, the curved lines shown in FIGS. 2, 3, and 48 (not shown in FIG. 49 for the sake of clarity).

This awareness on the part of the workflow engine 410 manifests, for example, in actions by the workflow engine associated with: receiving a request to alter a state of a workflow task, altering the state of the workflow task, and altering a state of a corresponding workflow view task accordingly (or, conversely, receiving a request to alter a state of a workflow view task, altering the state of the workflow view task, and altering a state of a corresponding workflow task accordingly). These actions are similar to, and/or in accordance with, the rules and actions associated with state changes discussed above.

Figure 50:
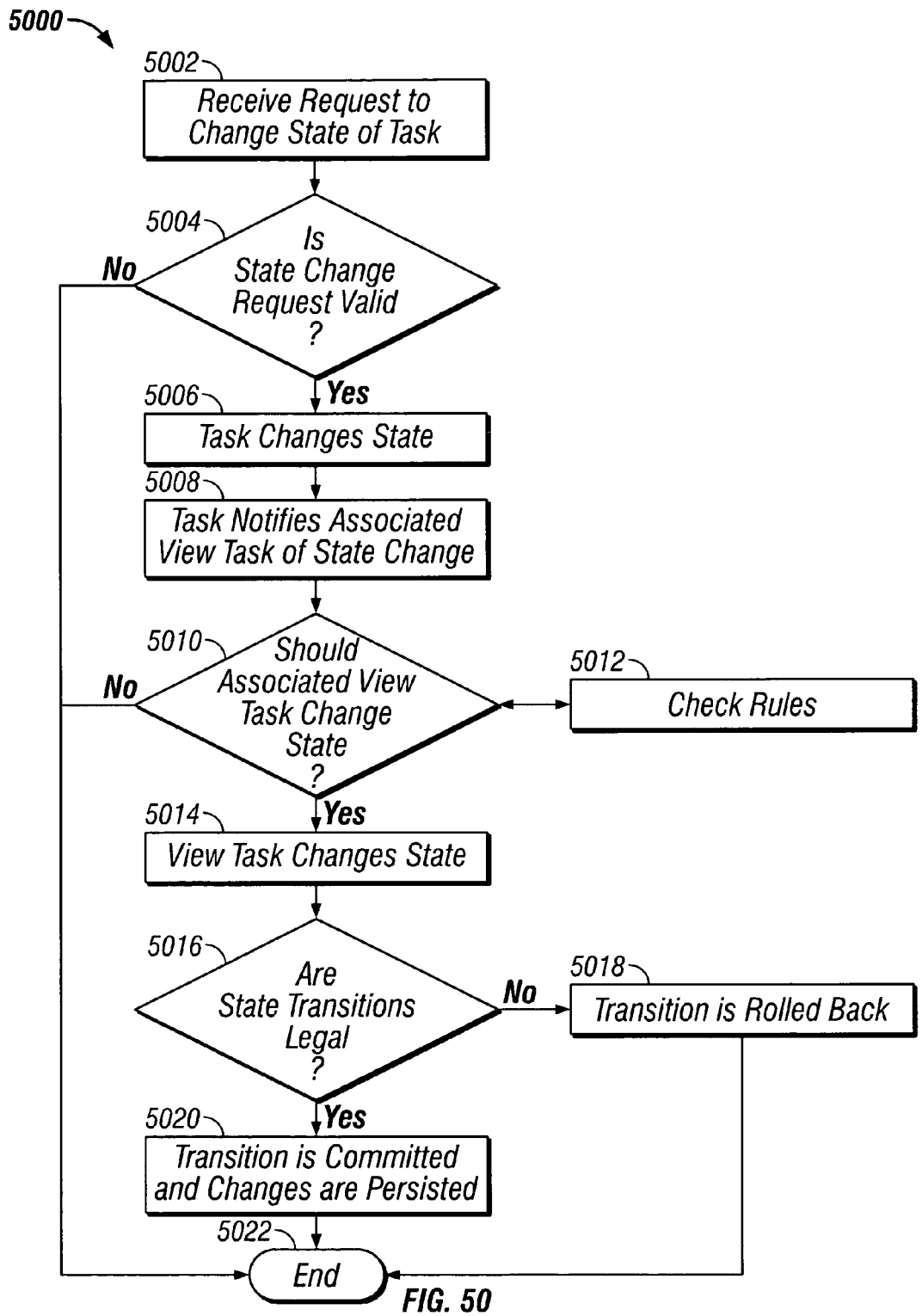
FIG. 50 is a flowchart illustrating techniques for changing a state of a task within a workflow.

FIG. 50 is a flowchart 5000 illustrating techniques for changing a state of a task within an actual workflow. That is, FIG. 50 corresponds to the situation just described, in which a workflow task receives a state change request and the workflow engine 410 must respond accordingly.

In FIG. 50, then, the workflow engine 410 receives a request to change a state of a workflow task (5002). The workflow engine 410 determines whether the request is valid (5004) (as illustrated in FIG. 5); if so, then the workflow engine 410 changes the state of the workflow task (5006). The workflow task then notifies its associated workflow view task of the state change (5008).

The workflow view task then evaluates whether its state should change, in response to the state change of the workflow task (5010). This determination is made by, for example, checking the rules specified by Table 1 above (5012). If so, then the workflow view task changes its state (5014).

If the state transition of either the workflow task or the workflow view task is not legal (5016), then the illegal state transition is rolled back (5018). Otherwise, the transition is committed and changes are persisted in the workflow engine 410 (5020), and the status change request ends (5022). In case of an illegal transition, or if the original state change request was invalid (5004), then the status change request also ends (5022). Once the status change request ends, the workflow engine 410 may proceed with execution of the aggregate workflow 4900.

Figure 51:
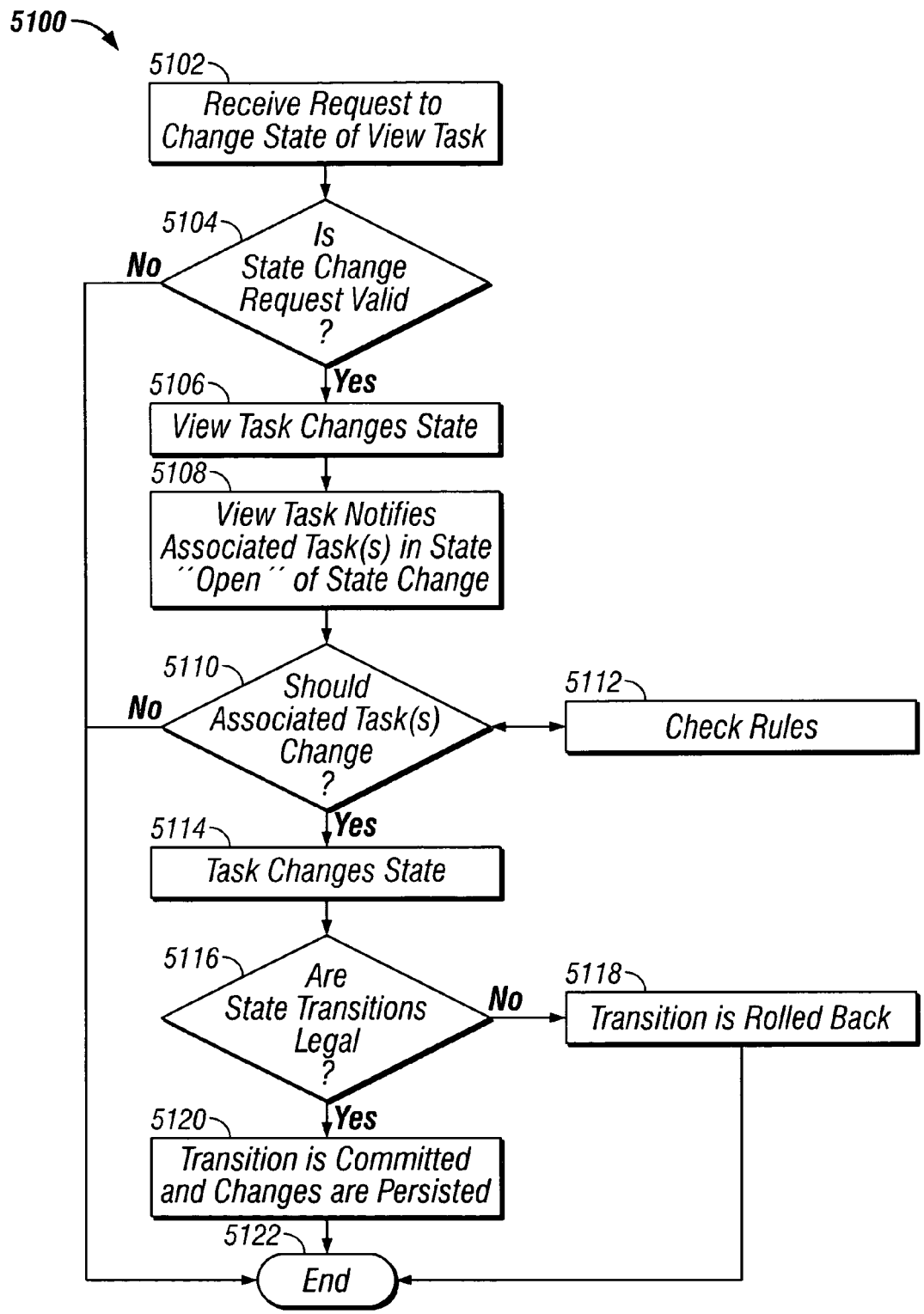
FIG. 51 is a flowchart illustrating techniques for changing a state of a workflow view task within a workflow view.

FIG. 51 is a flowchart 5100 illustrating techniques for changing a state of a workflow view task within a workflow view. That is, FIG. 51 corresponds to the situation described above, in which a workflow view task receives a state change request and the workflow engine 410 must respond accordingly.

In FIG. 51, then, the workflow engine 410 receives a request to change a state of a workflow view task (5102): The workflow engine 410 determines whether the request is valid (5104); if so, then the workflow engine 410 changes the state of the workflow view task (5106). The workflow view task then notifies its associated workflow task(s) that are in the state "open" of the state change (5108).

The workflow task then evaluates whether its state should change, in response to the state change of the workflow view task (5110). This determination is made by, for example, checking the rules specified by Table 1 above (5112). If so, then the workflow task changes its state (5114).

If the state transition of either the workflow view task or the workflow task is not legal (5116), then the illegal state transition is rolled back (5118). Otherwise, the transition is committed and changes are persisted in the workflow engine 410 (5120), and the status change request ends (5122). In case of an illegal transition, or if the original state change request was invalid (5104), then the status change request also ends (5122). Once the status change request ends (5122), the workflow engine 410 may proceed with execution of the aggregate workflow 4900.

Figure 52:
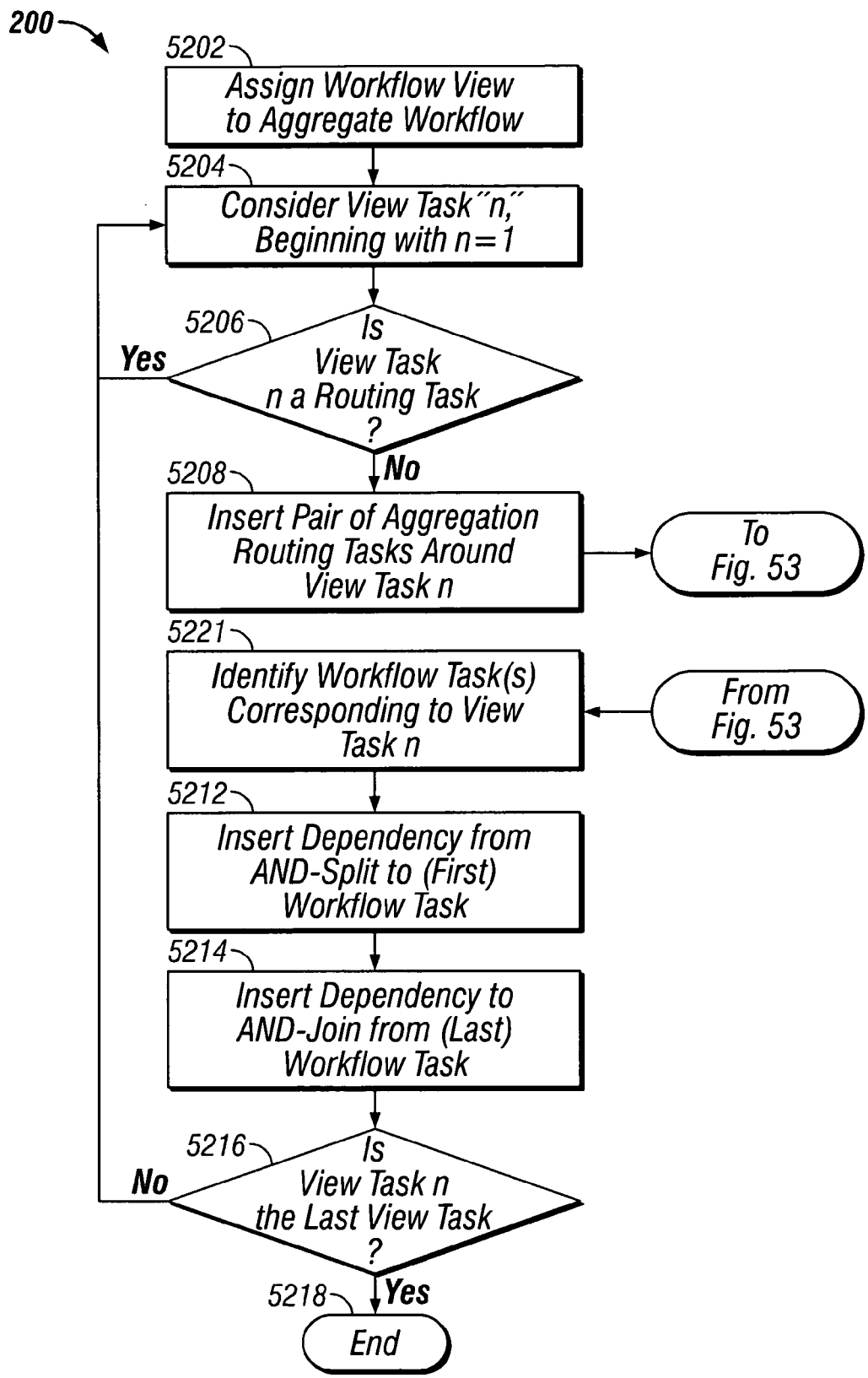
FIG. 52 is a flowchart for aggregating a workflow view and a workflow into an aggregated workflow.

FIG. 52 is a flowchart 5200 for aggregating a workflow view and a workflow into an aggregated workflow. In FIG. 52, a workflow view such as the workflow view L 304 of FIGS. 3 and 48, including the routing tasks 4802 and 4804 corresponding to the routing tasks 220 and 230 of the example workflow view L 208 of FIG. 2, is assigned to a workflow K (302 to form an aggregate workflow such as the aggregate workflow 4900 (5202). Next, a first workflow view task "n" within the workflow view is considered (5204), e.g., the workflow view task l1 330.

If the workflow view task n is a routing task (5206), then the next consecutive workflow view task n+1 is considered (5204). If the workflow view task is not a routing task (5206), then aggregation routing tasks are added to the aggregate workflow, bounding the workflow view task n being considered (5208). A more detailed procedure for adding the aggregation routing tasks is discussed below with respect to FIG. 53. Such aggregation routing tasks correspond to, for example, the aggregation routing tasks 4902 and 4904 of FIG. 49, which are an AND-split and an AND-join, respectively.

Once the aggregation routing tasks have been added with respect to a particular workflow view task n, then workflow task(s) corresponding to the workflow view task n are identified (5210). For example, if the workflow view task n corresponds to the workflow view task l1 330, then the corresponding workflow tasks are the workflow task k1 310 and k2 312.

A dependency is then added from a first one of the aggregation routing tasks, e.g., from the AND-split 4902, to the identified workflow task(s) (5212; i.e., to a first one of the identified workflow tasks). In the example of FIG. 49, this operation corresponds to adding the dependency from the AND-split aggregation routing task 4902 to the workflow task k1 310.

Similarly, a dependency is then added to a second one of the aggregation routing tasks, e.g., to the AND-join 4904, from the identified workflow task(s) (5214; i.e., from a last one of the identified workflow tasks). In the example of FIG. 49, this operation corresponds, to adding the dependency to the AND join aggregation routing task 4904 from the workflow task k1 312.

If the workflow view task n is not the last view task in the workflow view (5216), then the next consecutive workflow view task n+1 is considered (5204). Otherwise, if the workflow view task n is the final workflow view task in the workflow view being considered, then the process ends.

Figure 53:
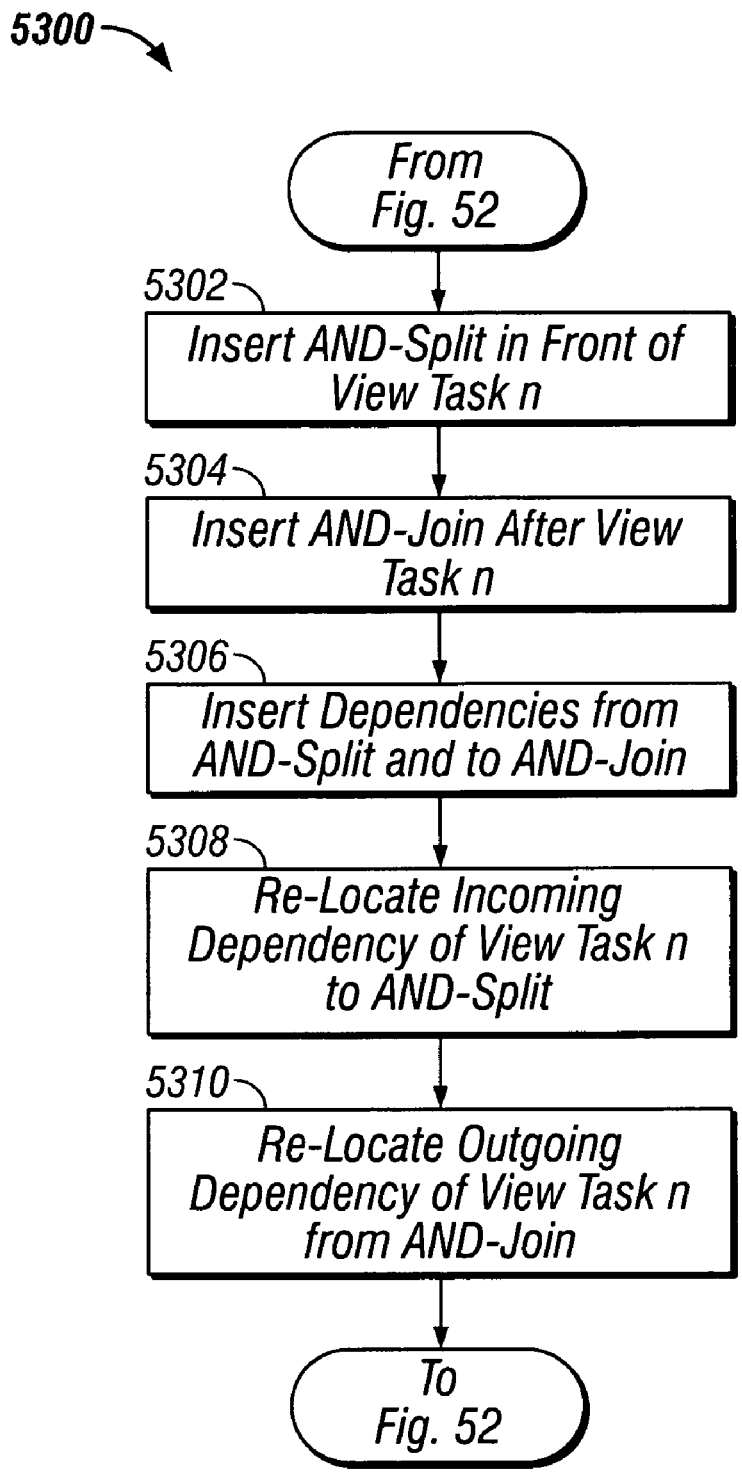
FIG. 53 is a flowchart for inserting aggregation routing tasks into the aggregate workflow of FIG. 52.

FIG. 53 is a flowchart 5300 for inserting aggregation routing tasks into the aggregate workflow of FIG. 52. That is, FIG. 53 describes the operation of inserting a pair of aggregation routing tasks around a particular workflow view task (5208) in more detail.

In FIG. 53, an AND-split (aggregation) routing task is added in front of the workflow view task n (5302). Then, an AND join (aggregation) routing task is added after the workflow view task n (5304). These routing tasks correspond to, for example, the AND-split aggregation routing task 4902 and the AND join aggregation routing task 4904 of aggregate workflow 4900.

Next, dependencies are inserted from the AND-split routing task to the workflow view task, and from the workflow view task to the AND join routing task (5306). A previously incoming dependency to the workflow view task n is re-located to the AND-split routing task (5308). Finally, a previously outgoing dependency from the workflow view task n is re-located to the AND join routing task (5310). Having inserted the aggregation routing tasks in the manner just described, the operation of identifying workflow task(s) corresponding to the workflow view task n may be commenced (5210 in FIG. 52).

By performing the operations of FIGS. 52 and 53 for each workflow view task within a workflow view, an aggregate workflow is compiled by the aggregation engine 4704, so that a workflow and its associated workflow view may be concurrently executed within the workflow engine 410. Of course, it should be understood that the aggregation engine 4704 may be included within, as well as apart from, the workflow engine 410, and is shown as a separate element within FIG. 47 merely for the sake of illustration.

By compiling an aggregate workflow in the manner(s) described above, a conventional workflow engine may be conveniently and reliably used as the workflow engine 410, with relatively minor modifications. Operations of the workflow and its corresponding workflow view are reliably maintained, both internally and with respect to one another. Finally, the process(es) for aggregating the workflow and workflow view into an aggregate workflow, examples of which are described above, are straight-forward and are easily and reliably performed by the aggregation engine 4704.

In conclusion, Section I describes a three-tier workflow model and architecture, in which a coalition of entities having private workflows may'together implement collaborative workflows, even when the private workflows are heterogeneous in nature and existing before the desired collaborative workflow. In this model, an intermediate level referred to as "workflow views" represent abstracted versions of the private workflows, and thereby maintain the confidential nature of the private workflows. The workflow views also help maintain synchronization between the private workflows and the collaborative workflow, and allow different "views" of the private workflows to be presented to different partners within the coalition.

Section II describes techniques for altering abstraction levels of workflows. Such techniques can be used for various purposes, such as maintaining a privacy level of a workflow while demonstrating the workflow to outside parties. The techniques may also be used to implement the three-tier workflow model of Section I, i.e., may be used to transfer between workflows and workflow views.

Section III describes techniques for joining multiple workflows into a combined workflow, and for decomposing a combined workflow into a plurality of subsets of the workflow, while maintaining a necessary order of execution of the workflow(s). These techniques may be used anytime that two or more entities wish to utilize their respective workflows as part of a collaboration. More particularly, for example, the techniques may be used in the context of the three-tier workflow model of Section I, i.e., may be used to combine the workflow views of various companies into a single collaborative workflow.

Section IV describes examples of situations in which collaborative process may be useful, as well as terminology for describing collaborative workflows in a useful manner.

Section V describes techniques for concurrently executing workflows and their associated workflow views in the context of an aggregate workflow. More specifically, a workflow and its associated workflow view are compiled into a single workflow. Tasks of the workflow and workflow view, rather than being executed in parallel, are executed in more of a serial, consecutive fashion within the single, aggregate workflow. As a result, the aggregate workflow ensures that a workflow view does not proceed faster or slower than its associated workflow, even with respect to routing tasks added to the workflow view that are not necessarily, tied to a corresponding task within the workflow. In this way, a workflow engine may easily and reliably execute the workflow and workflow view in synchronization with one another, while still maintaining the state dependencies therebetween that are described above in, for example, Sections I and II.

A number of implementations have been described. Nevertheless, it will be understood that various modifications may be made. Accordingly, other implementations are within the scope of the following claims.

What is claimed is:

1. A method of building a combined workflow comprising:
   storing a first private workflow and a second private workflow in a non-transitory computer-readable storage medium coupled to one or more computer processors and having instructions tangibly stored thereon which, when executed by the one or more computer processors, cause the one or more computer processors to perform operations, the first private workflow being associated with only a first party and including a confidential first plurality of actual tasks, and the second private workflow being associated with only a second party and including a confidential second plurality of actual tasks;
   accessing the first and second private workflows from the computer-readable storage medium;
   accepting the first private workflow into a first tier of a multi-tiered workflow mode representing the first private workflow as a first matrix in which the first plurality of tasks are each represented as first vertices;
   accepting the second private workflow into the first tier of the multi-tiered workflow mode;
   representing the second private workflow as a second matrix in which each of the second plurality of tasks are represented as second vertices;
   abstracting by the one or more computer processors, the first private workflow and the second private workflow in a second tier of the multi-tiered model to provide respective first and second abstracted, non-confidential views of the first and second private workflows to the second party and the first party, respectively, the first abstracted view including a first plurality of groupings of the first plurality of tasks, and the second abstracted view including a second plurality of groupings of the second plurality of tasks;
   defining first state dependencies between the first plurality of actual tasks of the first private workflow and the first abstracted view, and second state dependencies between the second plurality of actual tasks of the second private workflow and the second abstracted view, the first and second state dependencies assuring that the respective first and second abstracted views accurately represent states of the corresponding first and second pluralities of actual tasks;
   defining control flow dependencies between the first abstracted view and the second abstracted view, the first and second control flow dependencies expressing interaction of the first and second private workflows;
   ordering the first plurality of groupings and the second plurality of groupings from the first and second, different private workflows into a single combined workflow in a third tier of the multi-tiered workflow model, the combined workflow being shared by the first party and the second party and having a task order that, when executed, provides a result of a business collaboration between the first party and the second party;
   adding ordering tasks to the combined workflow, the ordering tasks being operable to implement the order of the combined workflow and thereby achieve the result; and
   logging interactions between the first party and the second party during execution of the combined workflow, wherein abstracting the first private workflow and the second private workflow further comprises:
   receiving a first user input selecting one of the first plurality of actual tasks that the user intends to be maintained as confidential,
   when the selected actual task comprises a type SPLIT task, traversing the first workflow in two directions to find two type JOIN tasks, one task in each direction,
   when the selected actual task comprises a type ACTIVITY task, traversing the first workflow in two directions to find two adjacent tasks, one task in each direction,
   when the selected actual task comprises neither a type SPLIT task or a type ACTIVITY task, traversing the first workflow in a first to direction to find a type JOIN task, and traversing the first workflow from the type JOIN task in a second direction to find a type SPLIT task,
   identifying a respective path from the selected actual task to each of the type JOIN tasks, to each of the adjacent tasks, or to the type JOIN task and the type SPLIT task,
   providing one or more of the paths as possible user selections, receiving a second user input selecting one of the paths, the selected path including at least the selected one of the first plurality of actual tasks, and abstracting the selected path in the first workflow view.

2. The method of claim 1 wherein adding ordering tasks comprises forming a sequential flow which interleaves implementation of the first plurality of tasks and the second plurality of tasks.

3. The method of claim 1 wherein adding ordering tasks comprises forming a parallel flow of a first task within the first plurality of tasks and a second task within the second plurality of tasks.

4. The method of claim 1 wherein adding ordering tasks comprises adding at least one of conjunctive splitting and joining tasks which specify the task order.

5. The method of claim 1 wherein adding ordering tasks comprises adding at least one of alternative splitting and joining tasks which specify the task order.

6. The method of claim 1 wherein adding ordering tasks comprises
   adding a first splitting task which designates that a first task within the first private workflow is followed by a first following task and a second following task.

7. The method of claim 6 wherein adding ordering tasks comprises
   adding the first following task as a second task within the second private workflow.

8. The method of claim 6 wherein adding ordering tasks comprises
   adding the first following task as a first joining task, the first joining task designating a second task within the second private workflow as following the first joining task and the first splitting task.

9. The method of claim 8 wherein adding ordering tasks comprises
   adding a second splitting task following the second task within the second private workflow, the second splitting task designating that the second task is followed by a third following task and a fourth following task.

10. The method of claim 9 wherein adding ordering tasks comprises adding the third following task as the second following task, the second following task being a second joining task within the first private workflow that designates that a third task within the first private workflow follows the second following task.

11. The method of claim 10 wherein adding ordering tasks comprises adding the fourth following task as a third joining task within the second private workflow, the third joining task designating that a fourth task within the second private workflow follows the third joining task and the third task within the first private workflow.

12. The method of claim 11 wherein a second ordering task is a joining task which designates a fourth task within the second private workflow, the fourth task following the second task within the combined workflow.

13. The method of claim 9 wherein adding ordering tasks comprises:
adding a third task within the first private workflow as the second following task;
adding a second joining task within the first private workflow as the third following task,
the second joining task designating that a fourth task within the first private workflow follows the third following task.

14. The method of claim 1 wherein ordering the first plurality of tasks comprises inputting the task order from an operator.

15. The method of claim 1 wherein adding ordering tasks comprises:
inserting the first matrix and the second matrix into a third matrix;
modifying a selected value within the third matrix, thereby reflecting a construction or
removal of a selected dependency between two vertices within the first plurality of tasks, consistent with the task order;
adding a fourth vertex before a first of the two vertices, the fourth vertex having a first chosen value reflecting a first new dependency between the fourth vertex and the first of the two vertices; and
adding a fifth vertex after the first of the two vertices, the fifth vertex having a second chosen value reflecting a second new dependency between the fifth vertex and the first of the two vertices.

16. The method of claim 1 further comprising selecting a subset of the combined workflow for execution by the first party.

17. The method of claim 16 wherein selecting a subset comprises determining that the subset includes a third plurality of tasks, each consecutive pair of the third plurality of tasks connected by a dependency.

18. The method of claim 16 wherein selecting a subset comprises determining that a last task within the third plurality of tasks precedes at most one subsequent task within the combined workflow.

19. The method of claim 18 wherein selecting a subset further comprises determining that no internal task within the third plurality of tasks, exclusive of the last task, immediately precedes an external task that is not included within the third plurality of tasks.

20. The method of claim 18 wherein selecting a subset further comprises determining that no internal task within the third plurality of tasks, exclusive of a first task of the third plurality of tasks, immediately succeeds an external task that is not included within the third plurality of tasks.

21. A non-transitory computer-readable medium tangibly encoded with a computer program comprising instructions that, when executed, operate to cause one or more computer processors to perform operations comprising:

accepting a first private workflow into a first tier of a multi-tiered workflow model, the first private workflow comprising a confidential first plurality of actual tasks implemented by a first party;
representing the first private workflow as a first matrix in which the first plurality of actual tasks are each represented as first vertices;
accepting a different, second private workflow into the first tier of the multi-tiered workflow model, the second private workflow comprising a confidential second plurality of actual tasks implemented by a second party;
representing the second private workflow as a second matrix in which each of the second plurality of actual tasks are represented as second vertices;
abstracting the first workflow and the second private workflow in a second tier of the multi-tiered model to provide respective first and second abstracted, non-confidential views of the first and second private workflows to the second party and the first party, respectively, the first abstracted view including a first plurality of groupings of the first plurality of actual tasks, and the second abstracted view including a second plurality of groupings of the second plurality of actual tasks;
defining first state dependencies between the first plurality of actual tasks of the first private workflow and the first abstracted view, and second state dependencies between the second plurality of actual tasks of the second private workflow and the second abstracted view, the first and second state dependencies assuring that the respective first and second abstracted views accurately represent states of the corresponding first and second pluralities of actual tasks;
defining control flow dependencies between the first abstracted view and the second abstracted view, the first and second control flow dependencies expressing interaction of the first and second private workflows;
ordering the first plurality of groupings and the second plurality of groupings from the first and second, different private workflows into a single combined workflow in a third tier of the multi-tiered workflow model, the combined workflow being shared by the first party and the second party and having a task order that, when executed, provides a result of a business collaboration between the first party and the second party;
and adding ordering tasks to the combined workflow, the ordering tasks being operable to implement the order of the combined workflow and thereby achieve the result,
wherein abstracting the first private workflow and the second private workflow further comprises:
receiving a first user input selecting one of the first plurality of actual tasks that the user intends to be maintained as confidential,
when the selected actual task comprises a type SPLIT task, traversing the first workflow in two directions to find two type JOIN tasks, one task in each direction,
when the selected actual task comprises a type ACTIVITY task, traversing the first workflow in two directions to find two adjacent tasks, one task in each direction,
when the selected actual task comprises neither a type SPLIT task or a type ACTIVITY task, traversing the first workflow in a first to direction to find a type JOIN task, and traversing the first workflow from the type JOIN task in a second direction to find a type SPLIT task,
identifying a respective path from the selected actual task to each of the type JOIN tasks, to each of the adjacent tasks, or to the type JOIN task and the type SPLIT task, providing one or more of the paths as possible user selections, receiving a second user input selecting one of the paths, the selected path including at least the selected one of the first plurality of actual tasks, and abstracting the selected path in the first workflow view.

22. A system comprising:

one or more computer processors computers; and a non-transitory computer-readable medium coupled to the one or more computer processors and having instructions tangibly stored thereon which, when executed by the one or more computer processors computers, cause the one or more computer processors to perform operations comprising:

accepting a first private workflow into a first tier of a multi-tiered workflow model, the first private workflow comprising a confidential first plurality of actual tasks implemented by a first party, representing the first private workflow as a first matrix in which the first plurality of actual tasks are each represented as first vertices, accepting a different, second private workflow into the first tier of the multi-tiered workflow model, the second private workflow comprising a confidential second plurality of actual tasks implemented by a second party, representing the second private workflow as a second matrix in which each of the second plurality of actual tasks are represented as second vertices, abstracting the first workflow and the second private workflow in a second tier of the multi-tiered model to provide respective first and second abstracted, non-confidential views of the first and second private workflows to the second party and the first party, respectively, the first abstracted view including a first plurality of groupings of the first plurality of actual tasks, and the second abstracted view including a second plurality of groupings of the second plurality of actual tasks, defining first state dependencies between the first plurality of actual tasks of the first private workflow and the first abstracted view, and second state dependencies between the second plurality of actual tasks of the second private workflow and the second abstracted view, the first and second state dependencies assuring that the respective first and second abstracted views accurately represent states of the corresponding first and second pluralities of actual tasks;

defining control flow dependencies between the first abstracted view and the second abstracted view, the first and second control flow dependencies expressing interaction of the first and second private workflows;

ordering the first plurality of groupings and the second plurality of groupings from the first and second, different private workflows into a single combined workflow in a third tier of the multi-tiered workflow model, the combined workflow being shared by the first party and the second party and having a task order that, when executed, provides a desired result of a business collaboration between the first party and the second party, and adding ordering tasks to the combined workflow, the ordering tasks being operable to implement the order of the combined workflow and thereby achieve the result, wherein abstracting the first private workflow and the second private workflow further comprises:

receiving a first user input selecting one of the first plurality of actual tasks that the user intends to be maintained as confidential, when the selected actual task comprises a type SPLIT task, traversing the first workflow in two directions to find two type JOIN tasks, one task in each direction, when the selected actual task comprises a type ACTIVITY task, traversing the first workflow in two directions to find two adjacent tasks, one task in each direction, when the selected actual task comprises neither a type SPLIT task or a type ACTIVITY task, traversing the first workflow in a first to direction to find a type JOIN task, and traversing the first workflow from the type JOIN task in a second direction to find a type SPLIT task, identifying a respective path from the selected actual task to each of the type JOIN tasks, to each of the adjacent tasks, or to the type JOIN task and the type SPLIT task, providing one or more of the paths as possible user selections, receiving a second user input selecting one of the paths, the selected path including at least the selected one of the first plurality of actual tasks, and abstracting the selected path in the first workflow view.

* * * * *